US012422415B2

(12) United States Patent
Swift et al.

(10) Patent No.: US 12,422,415 B2
(45) Date of Patent: Sep. 23, 2025

(54) ANALYTICAL METHODS OF ASSESSING CYTISINE PURITY

(71) Applicant: Achieve Life Sciences, Inc., Bothell, WA (US)

(72) Inventors: Curtis Swift, Stockton (GB); Katie Williams, Seaham (GB); Nigel Richardson, Stevenage (GB); Marco Delgado, Cucks (GB)

(73) Assignee: Achieve Life Sciences, Inc.

( * ) Notice: Subject to any disclaimer, the term of this patent is extended or adjusted under 35 U.S.C. 154(b) by 515 days.

(21) Appl. No.: 17/939,218

(22) Filed: Sep. 7, 2022

(65) Prior Publication Data

US 2023/0090994 A1    Mar. 23, 2023

Related U.S. Application Data

(60) Provisional application No. 63/241,829, filed on Sep. 8, 2021.

(51) Int. Cl.
*G01N 30/34* (2006.01)
*G01N 30/24* (2006.01)
*G01N 30/72* (2006.01)
*G01N 30/02* (2006.01)
*G01N 30/04* (2006.01)

(52) U.S. Cl.
CPC ........... *G01N 30/34* (2013.01); *G01N 30/24* (2013.01); *G01N 30/72* (2013.01); *G01N 2030/027* (2013.01); *G01N 2030/042* (2013.01)

(58) Field of Classification Search
CPC ........ G01N 30/34; G01N 30/24; G01N 30/72; G01N 2030/027; G01N 2030/042
See application file for complete search history.

(56) References Cited

U.S. PATENT DOCUMENTS

| 2004/0106603 | A1 | 6/2004 | Coe et al. |
|---|---|---|---|
| 2013/0331421 | A1 | 12/2013 | Jain |
| 2016/0235732 | A1* | 8/2016 | Quik ............... A61K 9/0053 |
| 2020/0361938 | A1* | 11/2020 | Metodiev ............ A61K 36/48 |
| 2021/0077473 | A1* | 3/2021 | Jacobs ................ A61K 31/439 |

OTHER PUBLICATIONS

Pietsch et al. (Simultaneous determination of thirteen plant alkaloids in a human specimen by SPE and HPLC, J. Sep. Sci. 2008, 31, 2410-2416) (Year: 2008).*
Bartusik-Aebisher et al. (Applications of Cytisine Extraction and Detection in Biological Materials for Clinical Medicine, Acta Poloniae Pharmaceutica n Drug Research, vol. 76 No. 5 pp. 797n804, 2019) (Year: 2019).*
Rouden et al. ((−)-Cytisine and Derivatives: Synthesis, Reactivity, and Applications, Chem. Rev. 2014, 11 4, 712-778) (Year: 2014).*
International Search Report and Written Opinion mailed Dec. 8, 2022 for PCT/US2022/042699, 11 pages.

* cited by examiner

*Primary Examiner* — Youngsul Jeong
(74) *Attorney, Agent, or Firm* — Sheppard, Mullin, Richter &Hampton LLP

(57) ABSTRACT

Methods of assessing purity of cytisine using gradient chromatography at multiple wavelengths is provided herein.

17 Claims, 38 Drawing Sheets

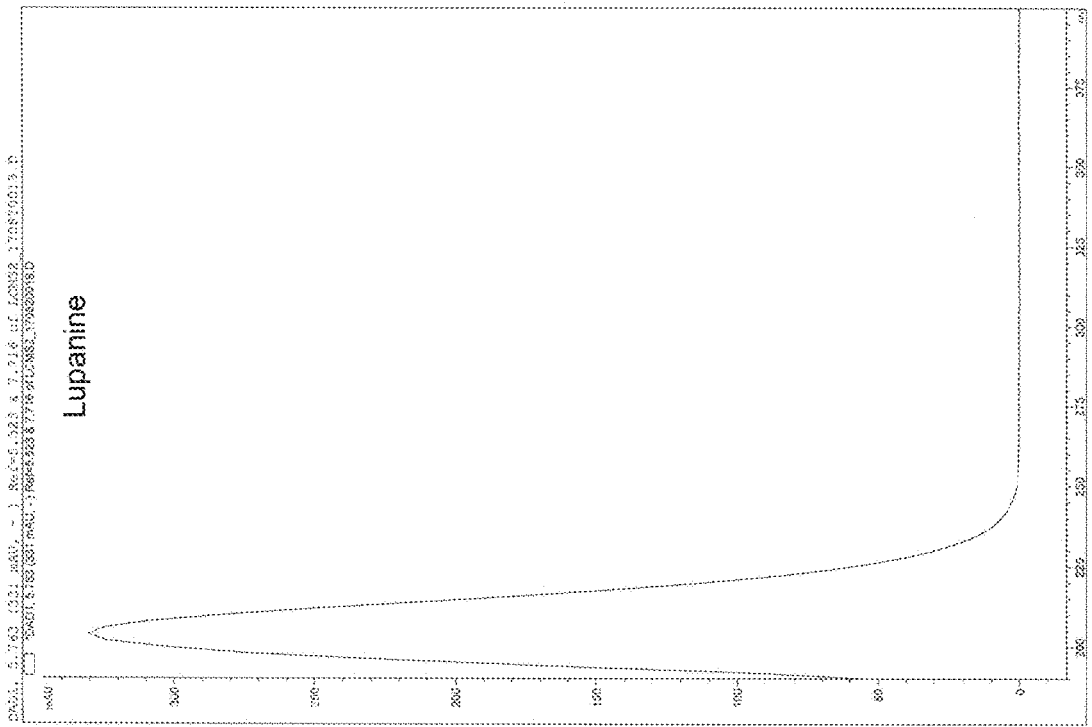

ANALYTICAL METHODS OF ASSESSING CYTISINE PURITY

PRIORITY CLAIM

This application claims priority to U.S. Provisional Patent Application No. 63/241,829, filed on Sep. 8, 2021, the entire contents of which is incorporated herein by reference.

BACKGROUND

Nicotine is an addictive substance that is rapidly absorbed during cigarette smoking. The drug distributes quickly and is thought to interact with neuronal nicotinic acetylcholine receptors (nAChRs) in the central nervous system (CNS). Nicotine addiction results, at least in part, from this interaction. Although many smokers attempt to cease smoking, few succeed without pharmacological supportive treatment.

Tobacco smoking contributes to some 7 million premature deaths each year worldwide. Smoking is highly addictive, with more than 95% of unaided attempts at cessation failing to last 6 months. It has been estimated that for every year a person continues smoking beyond his or her mid-30s, that person loses 3 months of life expectancy. The World Health Organization's Framework Convention on Tobacco Control identifies evidence-based approaches to promote smoking cessation, which include mass-media campaigns, tax increases on tobacco, and help for smokers wanting to stop.

(−)-Cytisine (cytisinicline; commonly referred to simply as cytisine) is a plant-based alkaloid isolated from seeds of *Cytisus laburnum* L. (Golden chain) and other plants. References herein to cytisine refer to (−)-cytisine, cytisinicline.

Cytisine's mechanism of action has assisted basic pharmacologists in understanding the complex pharmacology of the various subtypes of the nicotinic acetylcholine receptor. These studies have shown that both nicotine and cytisine bind strongly and preferentially to alpha4, beta2 ($\alpha_4\beta_2$) receptors that mediate the release of dopamine in the shell of the nucleus accumbens and elsewhere. This receptor subtype has been implicated in the development and maintenance of nicotine dependence and was the primary target for drugs such as varenicline.

A need exists for nicotine addiction treatments with patient-friendly regimens that are less costly, more effective, have an improved safety profile, and/or can more successfully treat individuals who have failed to quit nicotine using the known treatments.

SUMMARY

Methods for assessing the purity of cytisine are provided.

In some aspects, the present disclosure provides a chromatographic method of assessing purity of cytisine, the method comprising (a) introducing a cytisine sample to a column comprising a stationary phase including stearic acid (C18) and having a length of 150 mm, an inner diameter of 4.6 mm, and a particle size of 2.5 μm, wherein the cytisine sample comprises one or more impurities; (b) applying a first mobile phase having a pH of about 10 to the column such that cytisine and the one or more impurities are retained on said column; (c) eluting cytisine and the one or more impurities by applying a second mobile phase having a pH of about 10 to said column; (d) detecting cytisine and the one or more impurities.

In certain embodiments, cytisine and the one or more impurities are directed to a mass spectrometer for detection in step (d). In some embodiments, the first and second mobile phases are compatible for injection into a mass spectrometer. In certain embodiments, the first and second mobile phases comprise volatile components.

In some embodiments, the first and second mobile phases comprise a buffer that is compatible for injection into a mass spectrometer. In some embodiments, the first mobile phase comprises a 10 mM boric acid buffer and acetonitrile in a ratio of about 95 to about 5. In certain embodiments, the second mobile phase comprises a 10 mM boric acid buffer and acetonitrile in a ratio of about 5 to about 95.

In some embodiments, the one or more impurities are selected from the group consisting of N-formylcytisine, N-methylcytisine, angustifoline, lupanine, anagyrine, and sparteine. In yet another embodiment, cytisine is separated from each of N-formylcytisine, N-methylcytisine, angustifoline, lupanine, anagyrine, sparteine, and ammodendrine. In some embodiments, each of N-formylcytisine, N-methylcytisine, angustifoline, lupanine, anagyrine, sparteine, and ammodendrine are separated from cytisine and each other.

In another embodiment, the first mobile phase is applied to the column for at least about 2 minutes. In some embodiments, the second mobile phase is applied to the column for about 20 minutes to about 24.5 minutes.

In some embodiments, detecting cytisine and the one or more impurities comprises UV/Vis absorbance detection at one or more wavelengths. In some embodiments, the one or more wavelengths are 200 nm and 308 nm. In yet another embodiment, cytisine is detected at a wavelength of about 308 nm. In certain embodiments, the one or more impurities are selected from the group consisting of N-formylcytisine, N-methylcytisine, and anagyrine and the one or more impurities are detected at a wavelength of 308 nm. In another embodiment, the one or more impurities are angustifoline, lupanine, or both and the one or more impurities are detected at a wavelength of 200 nm.

BRIEF DESCRIPTION OF THE DRAWINGS

FIGS. 3A-3G are exemplary absorption spectra of cytisine (FIG. 3A) and known impurities including N-formylcytisine (FIG. 3B), N-methylcytisine (FIG. 3C), lupanine (FIG. 3D), angustifoline (FIG. 3E), anagyrine (FIG. 3F), and sparteine (FIG. 3G) in accordance with embodiments of the present disclosure.

DETAILED DESCRIPTION

Figure 1:
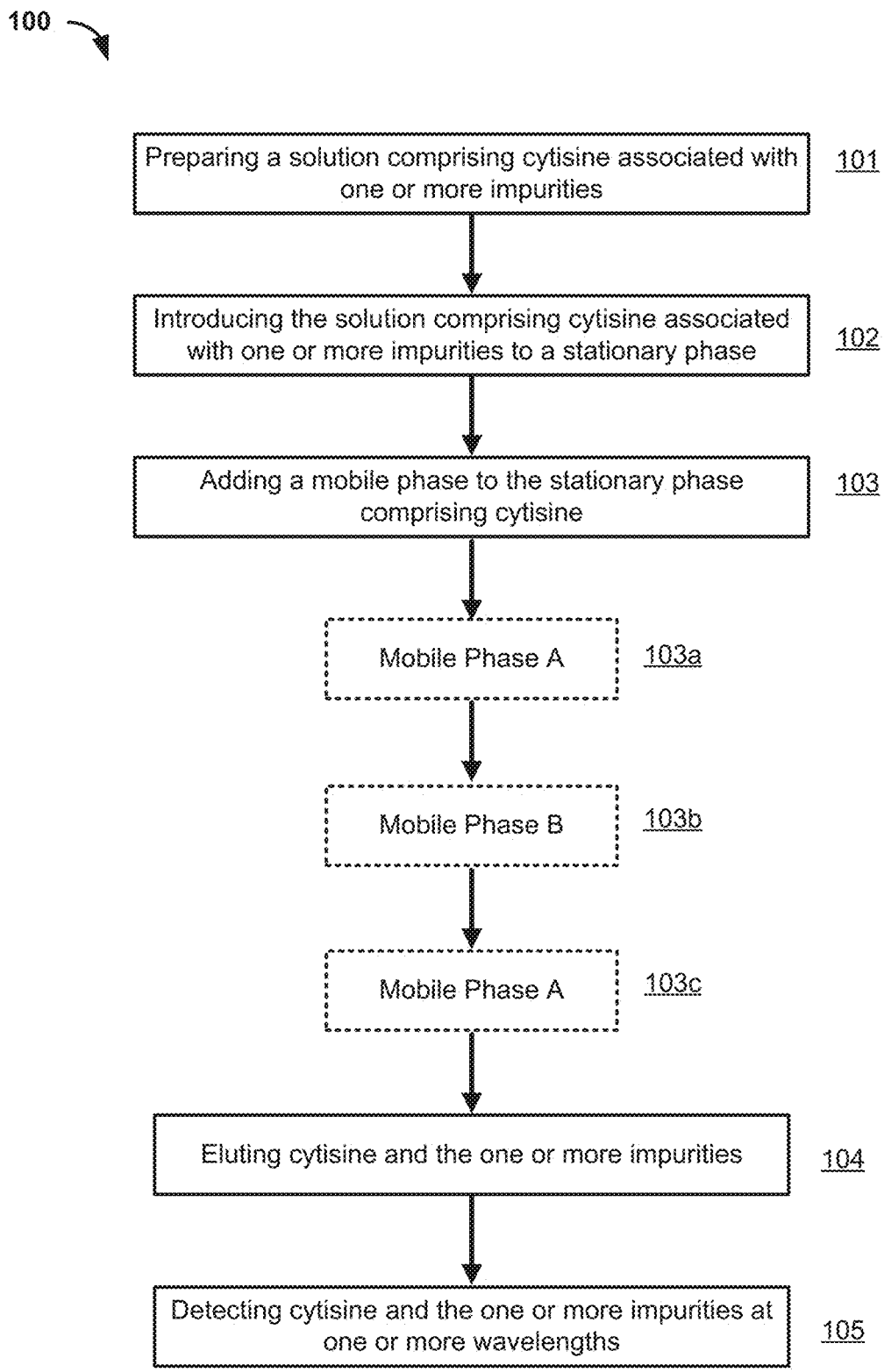
FIG. 1 is a flowchart showing an example process 100 for assessing the purity of cytisine in accordance with embodiments of the present disclosure.

The present disclosure relates to a method to quantitively determine the purity of cytisine. The method particularly involves the use of chromatography to resolve cytisine and known impurities. Cytisine is frequently associated with the following impurities: N-formylcytisine, N-methylcytisine, angustifoline, lupanine, anagyrine, and sparteine, and co-elution of these impurities with cytisine in chromatographic separation procedures has presented challenges for assessing cytisine purity. Provided herein is a gradient HPLC method with the ability to resolve cytisine and the related impurities at multiple wavelengths.

The methods provided herein allow for the separation of cytisine and known impurities by utilizing basic mobile phases (e.g., pH 10) in combination with a stationary phase (e.g., C18; 150×4.6 mm, 2.5 μm particle size), wherein the mobile phases are compatible with analytical techniques such as mass spectrometry, e.g., the mobile phases are suitable for injection into a mass spectrometer. The methods provided herein are selective to cytisine and known impurities, providing superior separation as compared to previous analytical techniques used to assess the purity of cytisine.

While the present disclosure is capable of being embodied in various forms, the description below of several embodiments is made with the understanding that the present disclosure is to be considered as an exemplification of the invention and is not intended to limit the invention to the specific embodiments illustrated. Headings are provided for convenience only and are not to be construed to limit the invention in any manner. Embodiments illustrated under any heading may be combined with embodiments illustrated under any other heading.

Definitions

The numerical values used in the various quantitative values specified in this application, unless expressly indicated otherwise, are stated as approximations as though the minimum and maximum values within the stated ranges were both preceded by the word "about." It is to be understood, although not always explicitly stated, that all numerical designations are preceded by the term "about." It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth. It also is to be understood, although not always explicitly stated, that the reagents described herein are merely exemplary and that equivalents of such are known in the art.

The term "about," as used herein when referring to a measurable value such as an amount or concentration and the like, is meant to encompass variations of 20%, 10%, 5%, 1%, 0.5%, or even 0.1% of the specified amount.

The terms "mass spectrometry" and "MS" as used herein refer to methods of filtering, detecting, and measuring ions based on their mass-to-charge ratio, or "m/z." In general, one or more molecules of interest are ionized, and the ions are subsequently introduced into a mass spectrographic instrument where, due to a combination of magnetic and electric fields, the ions follow a path in space that is dependent upon mass ("m") and charge ("z").

Also, the disclosure of ranges is intended as a continuous range, including every value between the minimum and maximum values recited, as well as any ranges that can be formed by such values. Also disclosed herein are any and all ratios (and ranges of any such ratios) that can be formed by dividing a disclosed numeric value into any other disclosed numeric value. Accordingly, the skilled person will appreciate that many such ratios, ranges, and ranges of ratios can be unambiguously derived from the numerical values presented herein and, in all instances, such ratios, ranges, and ranges of ratios represent various embodiments of the present disclosure.

Methods

The present disclosure provides methods for assessing purity of cytisine. In some aspects, the present disclosure provides methods for improving the resolution of cytisine and one or more impurities using chromatography. Impurities often associated with cytisine include N-formylcytisine, N-methylcytisine, angustifoline, lupanine, anagyrine, and sparteine. To determine cytisine purity, chromatographic methods need to achieve optimal resolution of cytisine from the known impurities.

In some embodiments, the chromatographic methods disclosed herein include high-performance liquid chromatography (HPLC). In some embodiments, the methods include reverse-phase high-performance liquid chromatography (RP-HPLC).

FIG. 1 is a flowchart illustrating an example process 100 capable of achieving optimal resolution of cytisine and one or more impurities. At step 101, the process 100 begins with preparing a solution comprising a sample of cytisine, wherein the sample includes one or more impurities associated with cytisine. In some embodiments, the one or more impurities include N-formylcytisine, N-methylcytisine, angustifoline, lupanine, anagyrine, and/or sparteine.

In some embodiments, the sample of cytisine is prepared in a solution having the same composition of Mobile Phase A, where Mobile Phase A is an initial solution added to the process 100 at step 103a. In some embodiments, the solution comprises an aqueous component and an organic component. In some embodiments, the solution is a basic solution (e.g., pH 10) comprising volatile components. In some embodiments, the solution is a two-component system comprising only one aqueous component and only one organic component. In some embodiments, the aqueous component comprises a buffer, wherein the buffer is compatible with mass spectrometric analysis. In some embodiments, the aqueous component comprises a boric acid buffer and the organic component comprises acetonitrile, where the aqueous component and the organic component are present in a ratio of 95:5, 97:3, or 96:4. In some embodiments, the sample of cytisine is added to a solution comprising an aqueous component and an organic component, wherein the aqueous component is a boric acid buffer and the organic component is acetonitrile, and wherein a ratio of the aqueous component to the organic compound is 95:5 and the pH of the solution is about 10. In some embodiments, the solution comprises a 10 mM boric acid buffer and acetonitrile in a ratio of about 95 to about 5 at a pH of 10.

In some embodiments, a pH of the solution is about 8 to about 10. For example, in some embodiments, a pH of the solution is about 8, about 9, or about 10. In some embodiments, a pH of the solution is about 10. In some embodiments, the pH of the boric acid buffer is adjusted by addition of ammonium hydroxide.

In some embodiments, a concentration of boric acid in the solution and/or in the aqueous component of the solution is about 5 mM to about 30 mM. For example, in some embodiments, a concentration of boric acid in the solution and/or in the aqueous component of the solution is about 5 mM, about 10 mM, about 15 mM, about 20 mM, about 25 mM, or about 30 mM. In some embodiments, a concentration of boric acid in the solution and/or the aqueous component of the solution is about 10 mM.

In some embodiments, the organic component of the solution comprises acetonitrile. In some embodiments, the organic component of the solution comprises acetonitrile and methanol. In some embodiments, the organic component of the solution comprises 95%, by volume, acetonitrile and 5%, by volume, methanol of a total volume of the organic component of the solution. In some embodiments, the organic component of the solution comprises no organic solvent other than acetonitrile. In some embodiments, the organic component of the solution comprises no methanol.

The process 100 can continue to step 102 where the solution comprising a sample of cytisine is introduced to a column comprising a stationary phase. In some embodiments, the stationary phase is housed in a separation column, which serves as a separation channel or chromatographic column. In some embodiments, the stationary phase is a hydrophobic stationary phase. In some embodiments, the stationary phase is a C18 stationary phase. In some embodiments, the stationary phase is a C18 stationary phase in a column having a length of 150 mm, an inner diameter of 4.6 mm, and packed with particles having an average size 3.0 μm (C18, 150×4.6 mm, 3.0 μm). In another embodiment, the stationary phase is a C18 stationary phase in a column having a length of 150 mm, an inner diameter of 4.6 mm, and packed with particles having an average size 2.7 μm (C18, 150×4.6 mm, 2.7 μm). In yet another embodiment, the stationary phase is a C18 stationary phase in a column having a length of 150 mm, an inner diameter of 4.6 mm, and packed with particles having an average size 3.5 μm (C18, 150×4.6 mm, 3.5 μm). In one embodiment, the stationary phase is a C18 stationary phase in a column having a length of 150 mm, an inner diameter of 4.6 mm, and packed with particles having an average size 2.5 μm (C18, 150×4.6 mm, 2.5 μm).

The process 100 can continue to step 103 where a mobile phase is passed through the column and the mobile phase is deliberately changed over the course of step 103 (e.g., gradient phase chromatography). In some embodiments, the mobile phase comprises an aqueous component and an organic component to elute cytisine and the one or more impurities, wherein a ratio of the aqueous component to the organic component changes to provide a mobile phase gradient. In some embodiments, the mobile phase is changed during step 103 to influence the retention of cytisine and the known impurities, providing optimal resolution of cytisine and the known impurities.

In certain embodiments, the one or more mobile phases are compatible with analytical techniques such as mass spectrometry, e.g., the one or more mobile phases are suitable for injection into a mass spectrometer. The mobile phases can be compatible with analytical techniques such as mass spectrometry because the mobile phases comprise volatile components. In some embodiments, the mobile phase is substantially free of "non-volatile components." The term "non-volatile components," used herein, refers to components present in the one or more mobile phases which are substantially non-volatile under conditions used for removing mobile phase solvents when interfacing a liquid chromatography system with a mass spectrometer.

In some embodiments, the step 103 includes a first step 103a where a first mobile phase ("Mobile Phase A") is introduced to the column. In some embodiments, Mobile Phase A is a solution comprising an aqueous component and an organic component. In some embodiments, the solution is a basic solution (e.g., pH 10) comprising volatile components. In some embodiments, Mobile Phase A is a two-component system comprising only one aqueous component and only one organic component. In some embodiments, the aqueous component comprises a buffer, wherein the buffer is compatible with mass spectrometric analysis. In some embodiments, the aqueous component comprises a boric acid buffer and the organic component comprises acetonitrile, where the aqueous component and the organic component are present in a ratio of 95:5, 97:3, or 96:4. In some embodiments, Mobile Phase A comprises an aqueous component and an organic component, wherein the aqueous component is a boric acid buffer and the organic component is acetonitrile, and wherein a ratio of the aqueous component to the organic compound is 95:5 and the pH of Mobile Phase A is about 10. In some embodiments, Mobile Phase A comprises a 10 mM boric acid buffer and acetonitrile in a ratio of about 95 to about 5 at a pH of 10.

In some embodiments, a pH of Mobile Phase A is about 8 to about 10. For example, in some embodiments, a pH of Mobile Phase A is about 8, about 9, or about 10. In some embodiments, a pH of Mobile Phase A is about 10. In some embodiments, the pH of the boric acid buffer is adjusted by addition of ammonium hydroxide.

In some embodiments, a concentration of boric acid in Mobile Phase A and/or in the aqueous component of Mobile Phase A is about 5 mM to about 30 mM. For example, in some embodiments, a concentration of boric acid in Mobile Phase A and/or in the aqueous component of Mobile Phase A is about 5 mM, about 10 mM, about 15 mM, about 20 mM, about 25 mM, or about 30 mM. In some embodiments, a concentration of boric acid in Mobile Phase A and/or in the aqueous component of Mobile Phase A is about 10 mM.

In some embodiments, the organic component of Mobile Phase A comprises acetonitrile. In some embodiments, the organic component of Mobile Phase A comprises acetonitrile and methanol. In some embodiments, the organic component of Mobile Phase A comprises 95%, by volume, acetonitrile and 5%, by volume, methanol of a total volume of the organic component of Mobile Phase A. In some embodiments, the organic component of Mobile Phase A comprises no organic solvent other than acetonitrile. In some embodiments, the organic component of Mobile Phase A comprises no methanol.

In some embodiments, at the first step 103a, Mobile Phase A is passed through the column for at least about 2 minutes. For example, in some embodiments, Mobile Phase A is passed through the column for at least about 2 minutes, at least about 3 minutes, at least about 4 minutes, at least about 5 minutes, at least about 6 minutes, at least about 7 minutes, at least about 8 minutes, or more. In some embodiments, passing Mobile Phase A through the column for at least about 2 minutes can increase the retention of cytisine to the stationary phase, thereby allowing selective separation of cytisine from the one or more impurities and increasing the overall resolution of cytisine and the one or more impurities. In some embodiments, passing Mobile Phase A through the column for at least about 2 minutes can increase the retention of cytisine, N-formylcytisine, and/or N-methylcytisine to the stationary phase, thereby affording optimal resolution from other impurities (e.g., angustifoline, lupanine, and anagyrine) and from each other.

In some embodiments, the step 103 includes a second step 103b where a second mobile phase ("Mobile Phase B") is introduced to the column. In some embodiments, Mobile Phase B is a solution comprising an aqueous component and an organic component. In some embodiments, the solution is a basic solution (e.g., pH 10) comprising volatile components. In some embodiments, Mobile Phase B is a two-component system comprising only one aqueous component and only one organic component. In some embodiments, the aqueous component comprises a buffer, wherein the buffer is compatible with mass spectrometric analysis. In some embodiments, the aqueous component comprises a boric acid buffer and the organic component comprises acetonitrile, where the aqueous component and the organic component are present in a ratio of 5:95, 3:97, or 4:96. In some embodiments, Mobile Phase B comprises an aqueous component and an organic component, wherein the aqueous component is a boric acid buffer and the organic component is acetonitrile, and wherein a ratio of the aqueous component to the organic compound is 5:95 and the pH of Mobile Phase B is about 10. In some embodiments, Mobile Phase B comprises a 10 mM boric acid buffer and acetonitrile in a ratio of about 5 to about 95 at a pH of 10.

In some embodiments, the pH of Mobile Phase B is about 8 to about 10. For example, in some embodiments, the pH of Mobile Phase B is about 8, about 9, or about 10. In some embodiments, the pH of Mobile Phase B is about 10. In some embodiments, the pH of the boric acid buffer is adjusted by addition of ammonium hydroxide.

In some embodiments, a concentration of boric acid in Mobile Phase B and/or in the aqueous component of Mobile Phase B is about 5 mM to about 30 mM. For example, in some embodiments, a concentration of boric acid in Mobile Phase B and/or in the aqueous component of Mobile Phase B is about 5 mM, about 10 mM, about 15 mM, about 20 mM, about 25 mM, or about 30 mM. In some embodiments, a concentration of boric acid in Mobile Phase B and/or in the aqueous component of Mobile Phase B is about 10 mM.

In some embodiments, the organic component of Mobile Phase B comprises acetonitrile. In some embodiments, the organic component of Mobile Phase B comprises acetonitrile and methanol. In some embodiments, the organic component of Mobile Phase B comprises 95%, by volume, acetonitrile and 5%, by volume, methanol of a total volume of the organic component of Mobile Phase B. In some embodiments, the organic component of Mobile Phase B comprises no other organic solvent other than acetonitrile. In some embodiments, the organic component of Mobile Phase B comprises no methanol.

In some embodiments, at the second step 103b, Mobile Phase B is passed through the column for at least about 20 minutes. In some embodiments, Mobile Phase B is passed through the column for about 20 minutes to about 24.5 minutes. In some embodiments, upon passing Mobile Phase B through the column for at least about 20 minutes to about 24.5 minutes, cytisine and each of the one or more impurities are eluted from the column at different times.

In some embodiments, the step 103 includes a third step 103c where Mobile Phase A is reintroduced to the column to ensure elution of cytisine and each of the one or more impurities. In some embodiments, Mobile Phase A is reintroduced into and passes through the column for at least about 0.5 minutes.

The process 100 can continue to step 104 where cytisine and each of the one or more impurities are eluted from the column, wherein cytisine and each of the one or more impurities are eluted from the column at different times so as to afford complete separation of cytisine and each of the one or more impurities. In some embodiments, cytisine is separated from each of the one or more impurities. In some embodiments, cytisine is separated from one or more of N-formylcytisine, N-methylcytisine, angustifoline, lupanine, anagyrine, and/or sparteine. In some embodiments, cytisine is separated from N-formylcytisine. In some embodiments, cytisine is separated from N-methylcytisine. In yet another embodiment, cytisine is separated from angustifoline. In some embodiments, cytisine is separated from lupanine. In some embodiments, cytisine is separated from anagyrine. In some embodiments, cytisine is separated from sparteine.

In some embodiments, each of the one or more impurities are separated not only from cytisine, but also from each other. In some embodiments, N-formylcytisine is separated from one or more of cytisine, N-methylcytisine, angustifoline, lupanine, anagyrine, and/or sparteine. In some embodiments, N-methylcytisine is separated from one or more of cytisine, N-formylcytisine, angustifoline, lupanine, anagyrine, and/or sparteine. In some embodiments, angustifoline is separated from one or more of cytisine, N-formylcytisine, N-methylcytisine, lupanine, anagyrine, and/or sparteine. In some embodiments, lupanine is separated from one or more of cytisine, N-formylcytisine, N-methylcytisine, angustifoline, anagyrine, and/or sparteine. In some embodiments, anagyrine is separated from one or more of cytisine, N-formylcytisine, N-methylcytisine, angustifoline, lupanine, and/or sparteine. In some embodiments, sparteine is separated from one or more of cytisine, N-formylcytisine, N-methylcytisine, angustifoline, lupanine, and/or anagyrine.

The process 100 can continue to step 105 where cytisine and the one or more impurities are detected. In some embodiments, the process 100 includes detecting cytisine and the one or more impurities when cytisine and the one or more impurities are eluted from the column by a detector.

In some embodiments, the one or mobile phases are compatible with detection techniques such as mass spectrometric analysis. In some embodiments, the one or more mobile phases are compatible with methods of sample injection into a mass spectrometer. In some embodiments, an aqueous component of the one or more mobile phase comprises a buffer compatible with mass spectrometric analysis. In some embodiments, the one or more mobile phases are compatible with direct injection into a mass spectrometer because the one or more mobile phases comprise volatile components (e.g., the organic phase and/or the aqueous phase are volatile). In some embodiments, the buffer (e.g., boric acid buffer) is a volatile buffer compatible for mass spectrometric analysis.

In some embodiments, the methods comprise directing cytisine and the one or more impurities to a mass spectrometer for detection. In some embodiments, cytisine and the one or more impurities (comprised within the one or more mobile phases) are injected into a mass spectrometer after elution from the column. In some embodiments, analysis of the cytisine and the one or more impurities after elution from the column provides a "direct" method of analyzing the purity of cytisine.

In some embodiments, the detection technique is mass spectrometric analysis. Methods for analyzing effluents using mass spectrometry are well-known in the art. Any type of mass spectrometry which is capable of directly analyzing the components present in a solution may be employed including, for example, electrospray mass spectrometry (ES-MS), atmospheric pressure chemical ionization (APCI), membrane introduction mass spectrometry (MIMS), continuous flow fast atom bombardment (cf-FAB), thermospray techniques, particle beam, moving belt interfaces, and the like.

In some embodiments, the mass spectrometric analysis can include "tandem mass spectrometry," or "MS/MS," to enhance the detection resolution. In this technique, a first, or parent, ion generated from a molecule of interest can be filtered in an MS instrument, and this parent ion can be subsequently fragmented to yield one or more second, or daughter, ions that are then analyzed in a second MS procedure. By careful selection of parent ions, only ions produced by certain analytes are passed to the fragmentation chamber, where collision with atoms of an inert gas produces these daughter ions. Because both the parent and daughter ions are produced in a reproducible fashion under a given set of ionization/fragmentation conditions, the MS/MS technique can provide an extremely powerful analytical tool. For example, the combination of filtration/fragmentation can be used to eliminate interfering substances, and can be particularly useful in complex samples, such as biological samples.

In other embodiments, any of a variety of standard HPLC detectors can be used for the detection of the analyte upon elution from the analytical column. In this case, the elution of a compound from the column is detected as a peak in a chromatogram. The retention time of the peak is used to identify the compound, and the peak height (or area) is proportional to the amount of the compound in the sample. The "retention time" is the time required for an analyte to pass through a chromatographic system and is measured from the time of injection to the time of detection. Ideally, each analyte of interest will have a characteristic retention time. An appropriate detector exhibits good sensitivity, good stability, reproducibility, linear response over a few orders of magnitude, short response time, and ease of operation. Such detectors include, but are not limited to, UV/V is absorbance detectors, photodiodearray detectors, fluorescence detectors, refractive index detectors, and conductivity detectors.

In some embodiments, UV/Vis absorbance detectors comprising a scanning spectrophotometer with grating optics can be used. The independent or combined use of a Deuterium source (UV range, 190-360 nm) with a Tungsten source (visible range, 360-800 nm) provides a simple means of detecting absorbing species as they emerge from the column.

In some embodiments, the detector is a variable wavelength detector. Cytisine and the one or more impurities have different maximum absorbances via UV/Vis detection and a variable wavelength detector can maximize the sensitivity of the process by using multiple wavelengths to capture cytisine and the one or more impurities in a single chromatogram. In some embodiments, cytisine and the one or more impurities are detected at a wavelength of about 308 nm and about 200 nm.

In some embodiments, cytisine is detected at a wavelength of about 308 nm. In some embodiments, cytisine is detected at a wavelength of about 230 nm.

In some embodiments, N-formylcytisine is detected at a wavelength of about 308 nm. In some embodiments, N-methylcytisine is detected at a wavelength of about 308 nm. In some embodiments, anagyrine is detected at a wavelength of about 308 nm.

In some embodiments, angustifoline is detected at a wavelength of about 200 nm. In some embodiments, lupanine is detected at a wavelength of about 200 nm. In some embodiments, cytisine is detected at a wavelength of about 200 nm. In some embodiments, N-formylcytisine is detected at a wavelength of about 200 nm. In some embodiments, N-methylcytisine is detected at a wavelength of about 200 nm. In some embodiments, anagyrine is detected at a wavelength of about 200 nm.

In some embodiments, cytisine and the one or more impurities are sequentially eluted from the column in the following order: N-formylcytisine, cytisine, N-methylcytisine, and anagyrine as detected at a wavelength of 308 nm. In yet another embodiment, cytisine and the one or more impurities are sequentially eluted from the column in the following order: N-formylcytisine, cytisine, N-methylcytisine, angustifoline, lupanine, and anagyrine as detected at a wavelength of 200 nm.

In some embodiments, a retention time (the measure of time taken for a solute, e.g., cytisine, to pass through the column) of cytisine and the one or more impurities is different so as to afford resolution of cytisine from the one or more impurities. In some embodiments, the retention times of the one or more impurities are different from each other and cytisine so as to afford resolution of the one or more impurities from each other and cytisine.

In some embodiments, cytisine has a retention time of about 6.5 minutes. In some embodiments, N-formylcytisine has a retention time of about 5.5 minutes. In some embodiments, N-methylcytisine has a retention time of about 8.2 minutes. In some embodiments, anagyrine has a retention time of about 10.9 minutes. In some embodiments, angustifoline has a retention time of about 10 minutes. In some embodiments, lupanine has a retention time of about 10.2 minutes.

In some embodiments, cytisine has a relative retention time of about 1 minute. In some embodiments, N-formylcytisine has a relative retention time of about 0.8 minutes. In some embodiments, N-methylcytisine has a relative retention time of about 1.3 minutes. In some embodiments, anagyrine has a relative retention time of about 1.7 minutes. In some embodiments, angustifoline has a relative retention time of about 1.53 minutes. In some embodiments, lupanine has a relative retention time of about 1.56 minutes.

As can be appreciated from the disclosure above, the present invention has a wide variety of applications. The invention is further illustrated by the following examples, which are only illustrative and are not intended to limit the definition and scope of the invention in any way.

Example: Analytical Method for Assessing Purity of Cytisine

The aim of this study was to develop an analytical HPLC method for assessing cytisine purity. Provided below is a summary of the parameters screened as well as a summary of finalized system parameters optimized for the HPLC method.

One of the challenges associated with developing HPLC methods for assessing cytisine purity is the ability to resolve cytisine from known impurities including: N-formylcytisine, N-methylcytisine, angustifoline, lupanine, anagyrine/thermopsine (enantiomers), and sparteine (Table 1).

TABLE 1

Structure of Cytisine and Related Impurities

| Name | Formula | Mol. Wt | Structure |
|---|---|---|---|
| Cytisine | $C_{11}H_{14}N_2O$ | 190.24 | |
| N-Formylcytisine | $C_{12}H_{14}N_2O_2$ | 218.25 | |
| N-Methylcytisine | $C_{12}H_{16}N_2O$ | 204.268 | |
| Lupanine | $C_{15}H_{24}N_2O$ | 248.36 | |

TABLE 1-continued

Structure of Cytisine and Related Impurities

| Name | Formula | Mol. Wt | Structure |
|---|---|---|---|
| Angustifoline | $C_{14}H_{22}N_2O$ | 234.34 | |
| Anagyrine | $C_{15}H_{20}N_2O$ | 244.33 | |
| Sparteine | $C_{15}H_{26}N_2$ | 234.38 | |

Figure 2A:
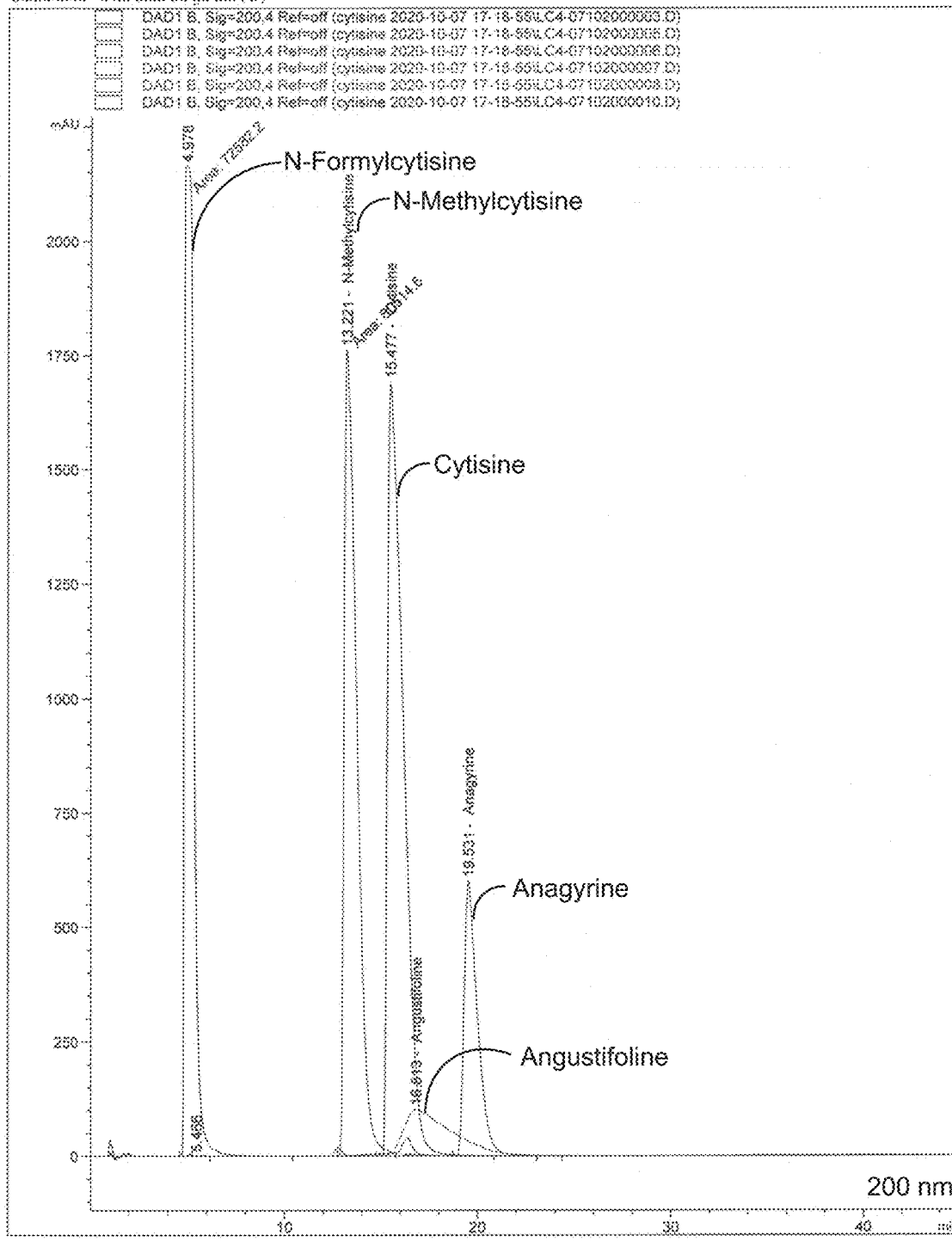
FIGS. 2A-2B are exemplary chromatographs of high-performance liquid chromatography (HPLC) isocratic methods that failed to separate cytisine and one or more impurities detected at a wavelength of 200 nm (FIG. 2A) and at a wavelength of 310 nm (FIG. 2B) in accordance with embodiments of the present disclosure.
Figure 2B:
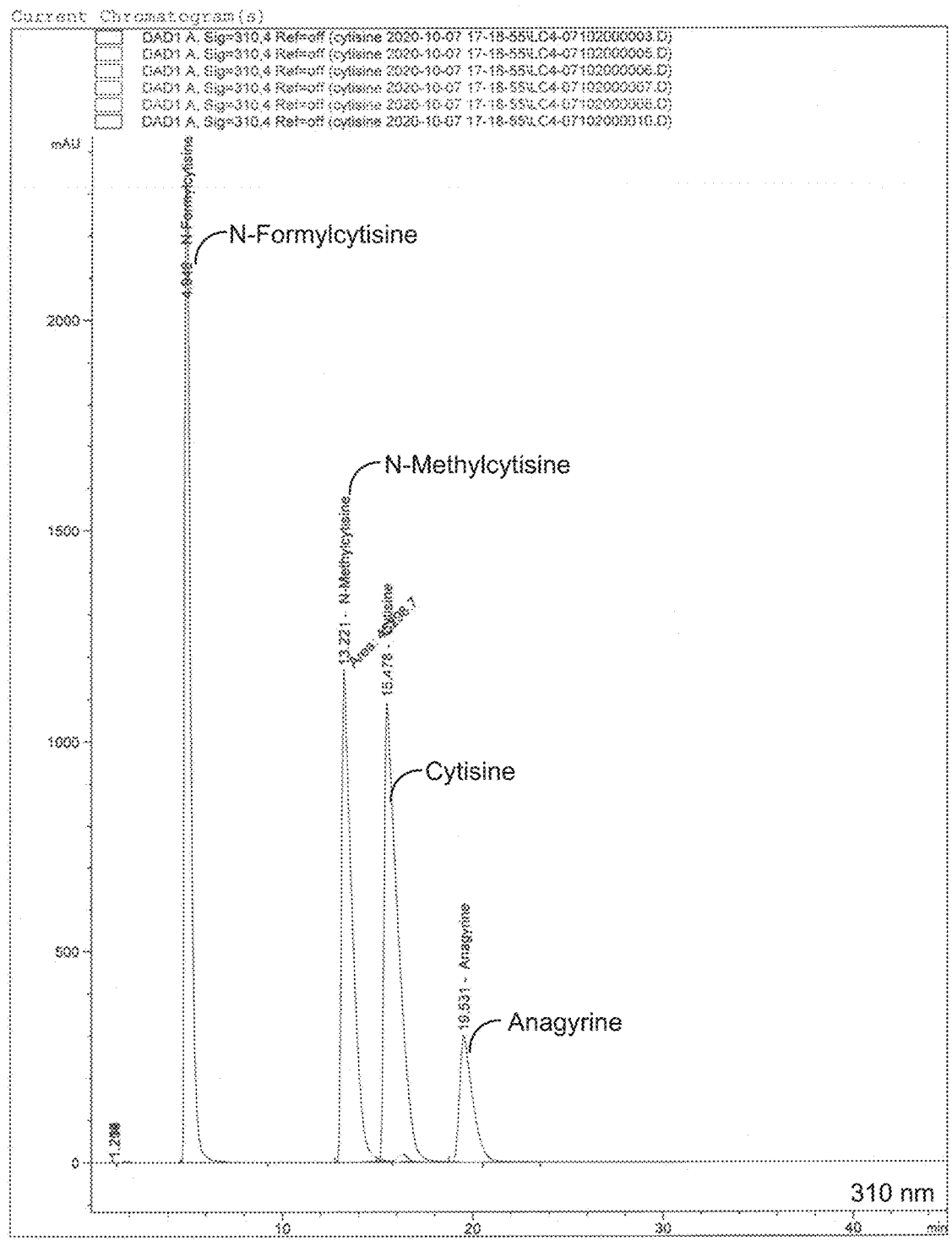
Figure 3B:
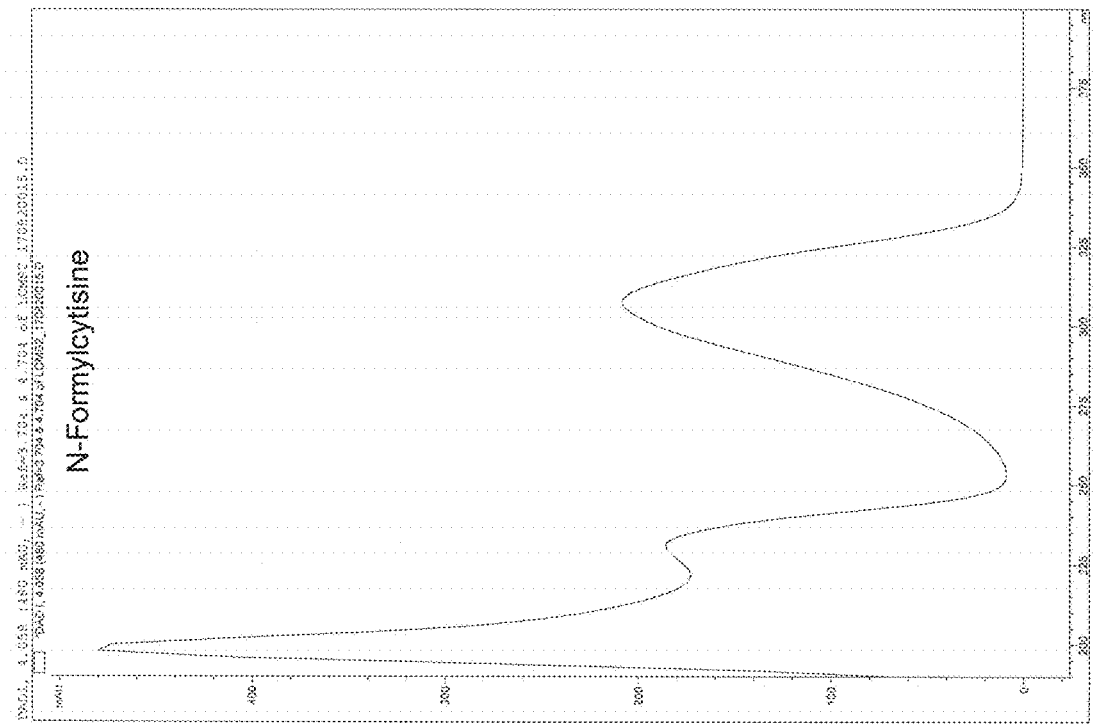
Figure 3A:
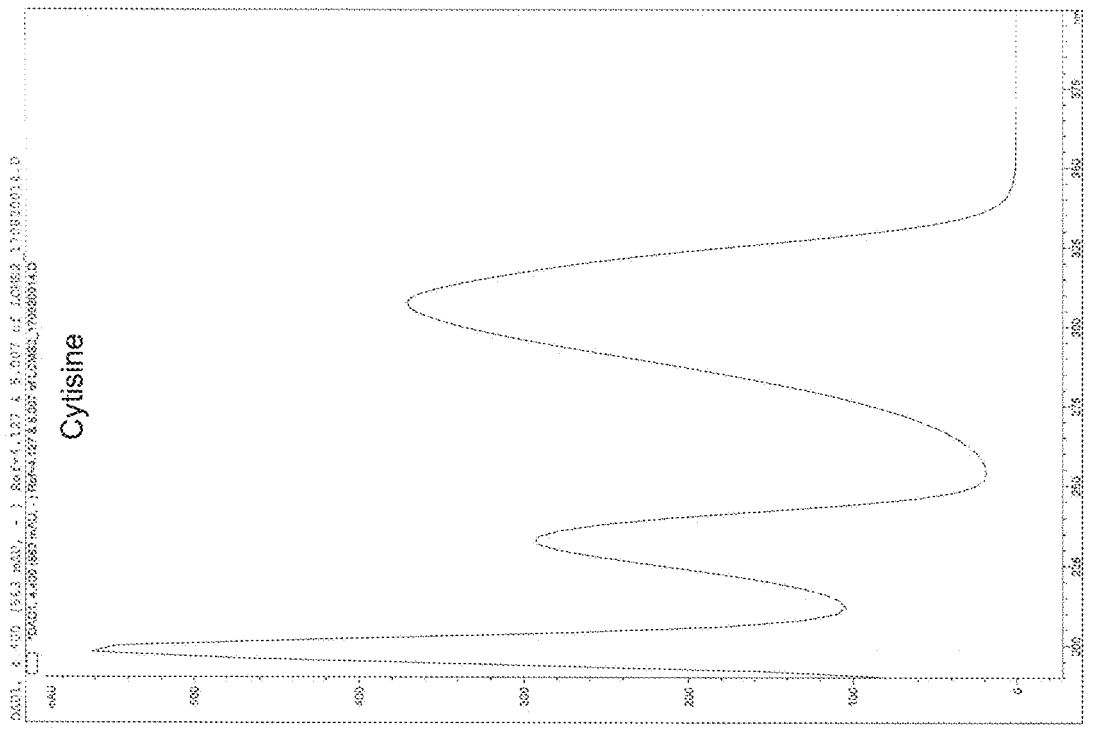
Figure 3F:
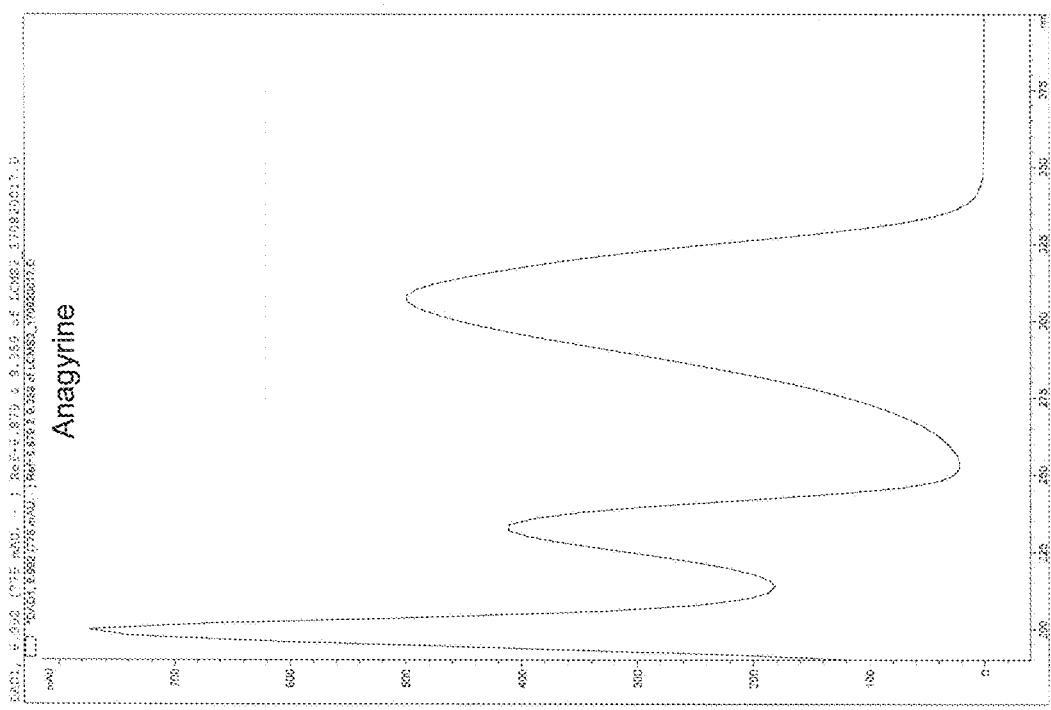
Figure 3E:
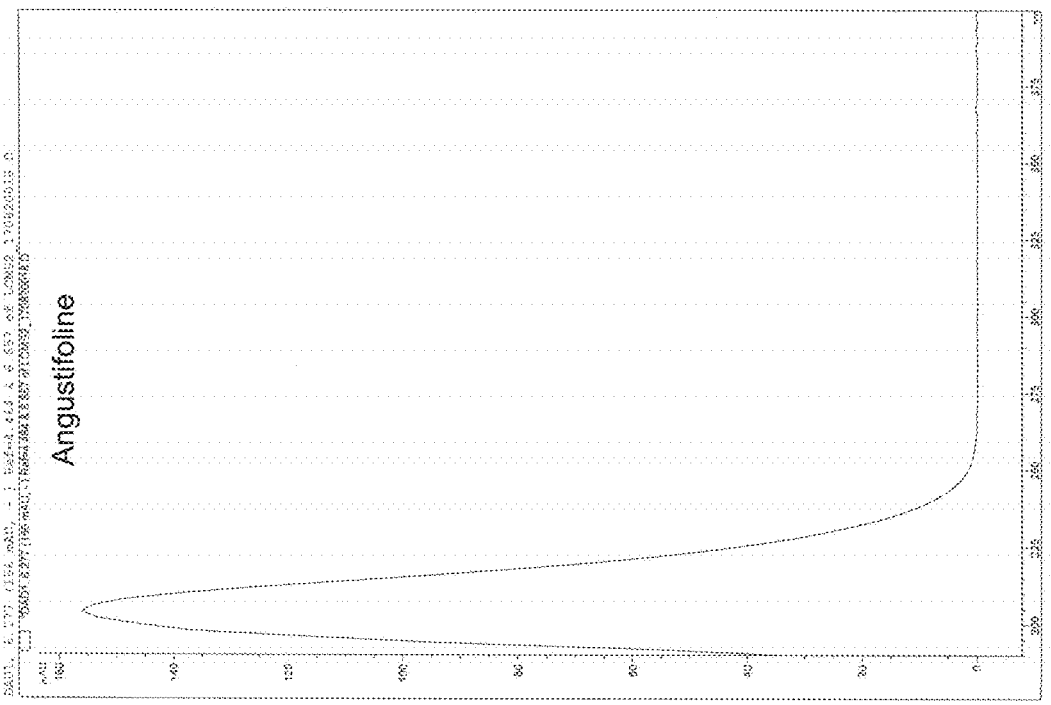
Figure 3G:
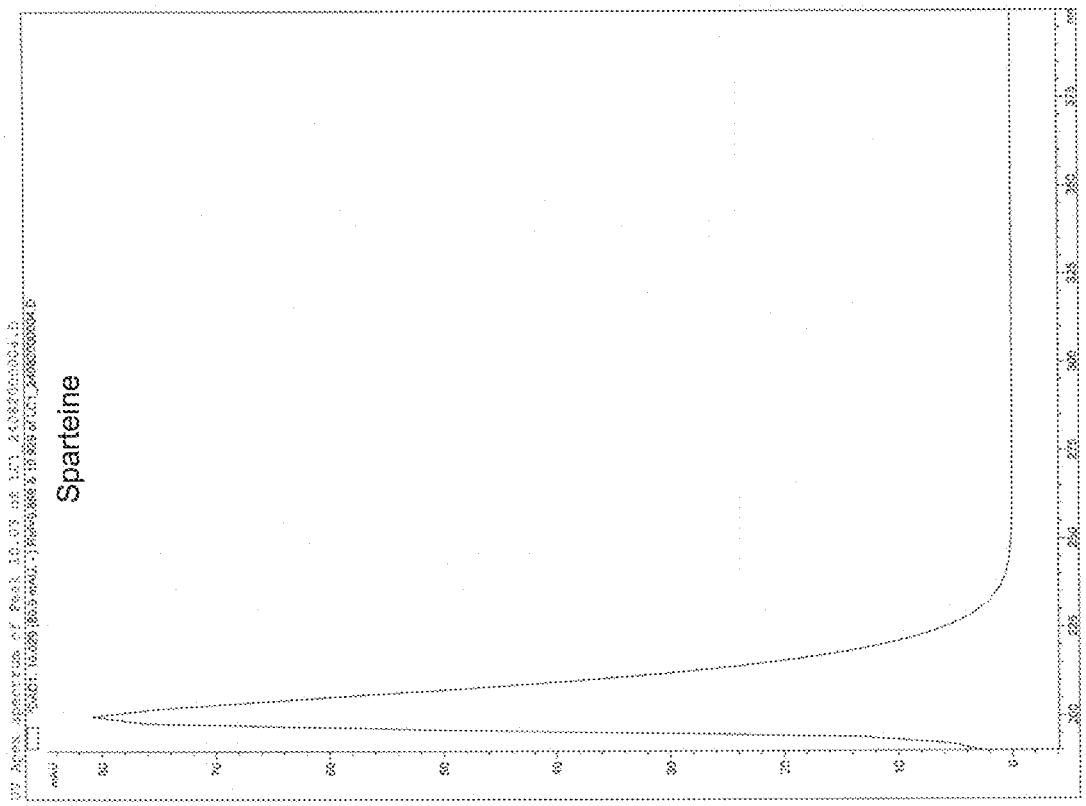

Previous methods for analyzing cytisine used isocratic HPLC methods where the mobile phase used throughout the analyses remained constant. However, the isocratic methods were limiting as the methods failed to resolve cytisine from known impurities as shown in FIG. 2A (wavelength 200 nm) and FIG. 2B (wavelength 310 nm).

Further, previous reports related to analyzing cytisine that relied on reverse phase chromatography using a C18 column used only one wavelength at 310 nm. This is problematic as some of the expected impurities, angustifoline, lupanine, and sparteine, do not have any absorbance at a wavelength of 310 nm (See FIGS. 3A-3G for UV absorption spectra for cytisine and known impurities). This suggests the need for a dual wavelength method to achieve optimal resolution of cytisine from the known impurities.

The present study was designed in an effort to produce a gradient HPLC method (as opposed to an isocratic method) with the ability to resolve cytisine and the expected related impurities at multiple wavelengths. During the development process sparteine and ammodendrine were removed from the screening process. This was due to an inability to source ammodendrine and difficulties analyzing sparteine using a standalone HPLC method. In addition, thermopsine was also removed from the study on the basis that if a peak was detected in the samples corresponding to anagyrine, a chiral method would also be developed.

1. Sample Preparation

Over the course of the development, several diluents were trialed with the aim of optimizing the peak shape of cytisine and the screened impurities. The diluents screened are enumerated below in Table 2.

TABLE 2

Screened Diluents

Acetonitrile (100%)
Water:Acetonitrile (1:1)
10 mM Borate Buffer (pH 10.0):Acetonitrile (95:5) (Mobile Phase A)

Acetonitrile (100%) proved unsuitable due to peak splitting across a range of mobile phases. A 1:1 mixture of acetonitrile:water gave a single, broad peak. Significant improvements were observed when using the selected diluent, Mobile Phase A, which resulted in a suitable peak shape shown in Table 3.

TABLE 3

Selected Diluent

Mobile Phase A
10 mM Borate Buffer (pH 10.0):Acetonitrile (95:5) (Mobile Phase A)

2. Mobile Phase Screening: Stage 1

The mobile phases enumerated in Table 4 were screened during method development and cover a selection of different pH levels. Table 4 displays the mobile phases screened in the first stage of the screening process with the aqueous phase and its corresponding organic phase detailed in each row. Mobile phase system No. 2 was also run using a different gradient (Table 5) to mimic the isocratic methods. No reference material for sparteine was available at this stage of mobile phase screening, so it is not included in the data.

TABLE 4

Screened Mobile Phases

| No. | Aqueous phase | Organic phase |
|---|---|---|
| 1 | Water:TFA (100:0.05) | Acetonitrile:TFA (100:0.05) |
| 2 | Water:Formic acid (100:0.1) | Acetonitrile:Formic acid (100:0.1) |
| 3 | 20 mM Ammonium Acetate (pH 5.8) | Acetonitrile |
| 4 | 10 mM Ammonium Bicarbonate (pH 8.0) | Acetonitrile |
| 5 | Water:Formic acid (100:0.1) | Acetonitrile:Formic acid (100:0.1) |

TABLE 5

Gradient Used to Replicate Isocratic Method

| Time | % A | % B |
|---|---|---|
| 0 | 95 | 5 |
| 25 | 95 | 5 |
| 45 | 5 | 95 |
| 49.5 | 5 | 95 |
| 50 | 95 | 5 |

Screening was performed by injecting a sample, at 0.5 mg/ml of cytisine and every impurity available, on the HPLC system with a standard set of parameters shown below in Tables 6 and 7.

TABLE 6

HPLC Parameters
HPLC Parameters

| | |
|---|---|
| System | Agilent 1100/1200 series liquid chromatograph or equivalent |
| Column | XBridge C18; 150 × 4.6 mm, 3.5 μm particle size |
| Mobile Phase A | Aqueous phase |
| Mobile Phase B | Organic phase |
| Flow Rate | 1.0 ml/min |
| Stop Time | 25 min |
| Injection Volume | 5 μl |
| Column Temperature | 30° C. |
| Wavelength | 200 nm, 220 nm, 310 nm |
| Post Run Time | 5 min |

TABLE 7

HPLC Gradient Parameters
HPLC Gradient Parameters

| Time | % A | % B |
|---|---|---|
| 0 | 95 | 5 |
| 20 | 5 | 95 |
| 24.5 | 5 | 95 |
| 25 | 95 | 5 |

For each set of injections, the mobile phase was changed to investigate the effects each mobile phase system had on the chromatography. The primary aims of the mobile phase screening were to find a mobile phase that delivered adequate retention of all impurities (e.g., N-formylcytisine, N-methylcytisine, anagyrine, angustifoline, lupanine) as well as a good peak shape.

Figure 4:
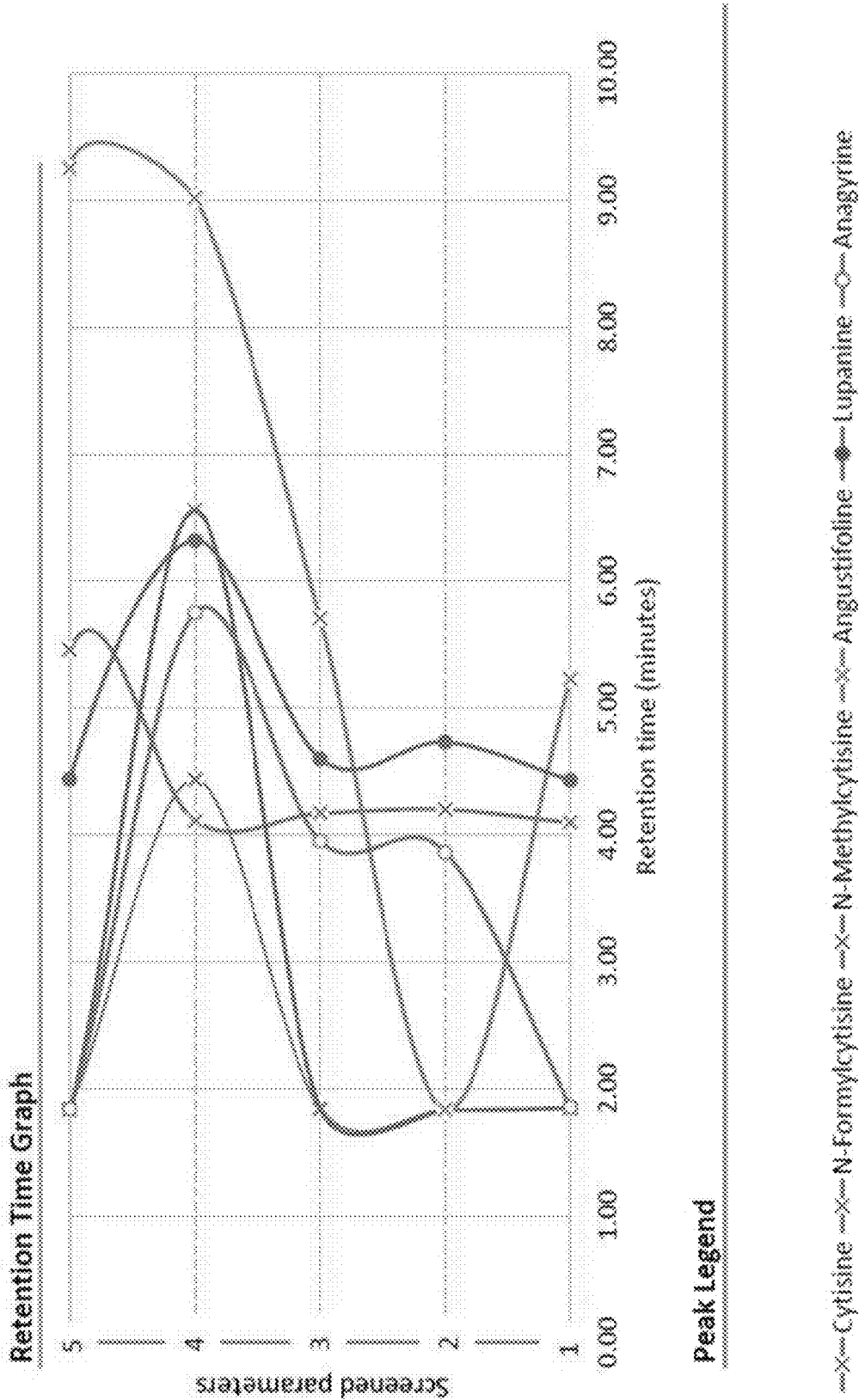
FIG. 4 is an exemplary plot showing retention time of cytisine and each of the known impurities as the mobile phase conditions change in accordance with embodiments of the present disclosure (legend: (1)—water:TFA (100:0.05)/acetonitrile:TFA (100:0.05); (2)—Water:formic acid (100:0.1)/acetonitrile:formic acid (100:0.1); (3)—20 mM ammonium acetate (pH 5.8)/acetonitrile; (4) 10 mM ammonium bicarbonate (pH 8.0)/acetonitrile; and (5)—water:formic acid (100:0.1)/acetonitrile:formic acid (100:0.1) with isocratic hold).

FIG. 4 and Table 8 illustrate how the retention time of each available impurity changes with the mobile phase conditions.

TABLE 8

Retention Time Table

| Peak Name | 1 | 2 | 3 | 4 | 5 |
|---|---|---|---|---|---|
| Cytisine | 1.85 | 1.83 | 1.842 | 4.44 | 1.84 |
| N-Formylcytisine | 4.10 | 4.2 | 4.171 | 4.11 | 5.46 |
| N-Methylcytisine | 1.85 | 1.83 | 1.845 | 6.56 | 1.84 |
| Anagyrine | 5.23 | 1.84 | 5.706 | 9.02 | 9.25 |
| Angustifoline | 4.43 | 4.73 | 4.602 | 6.32 | 4.44 |
| Lupanine | 1.85 | 3.86 | 3.953 | 5.75 | 1.84 |

Figure 5A:
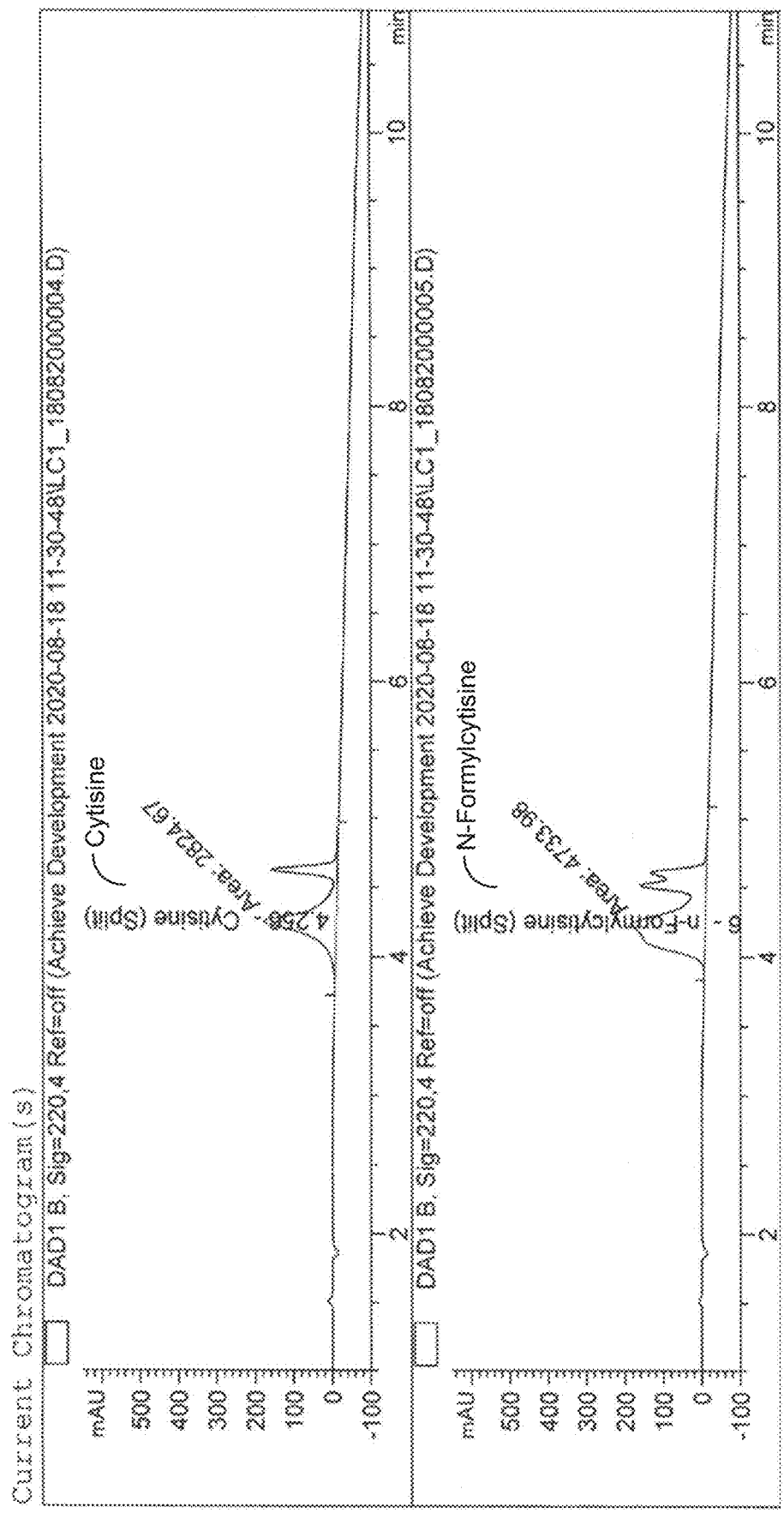
FIGS. 5A-5C are exemplary chromatographs of cytisine and N-formylcytisine (FIG. 5A), N-methylcytisine and anagyrine (FIG. 5B), and angustifoline and lupanine (FIG. 5C) using a mobile phase comprising 2 mM ammonium formate (pH 8) and acetonitrile in accordance with embodiments of the present disclosure.
Figure 5B:
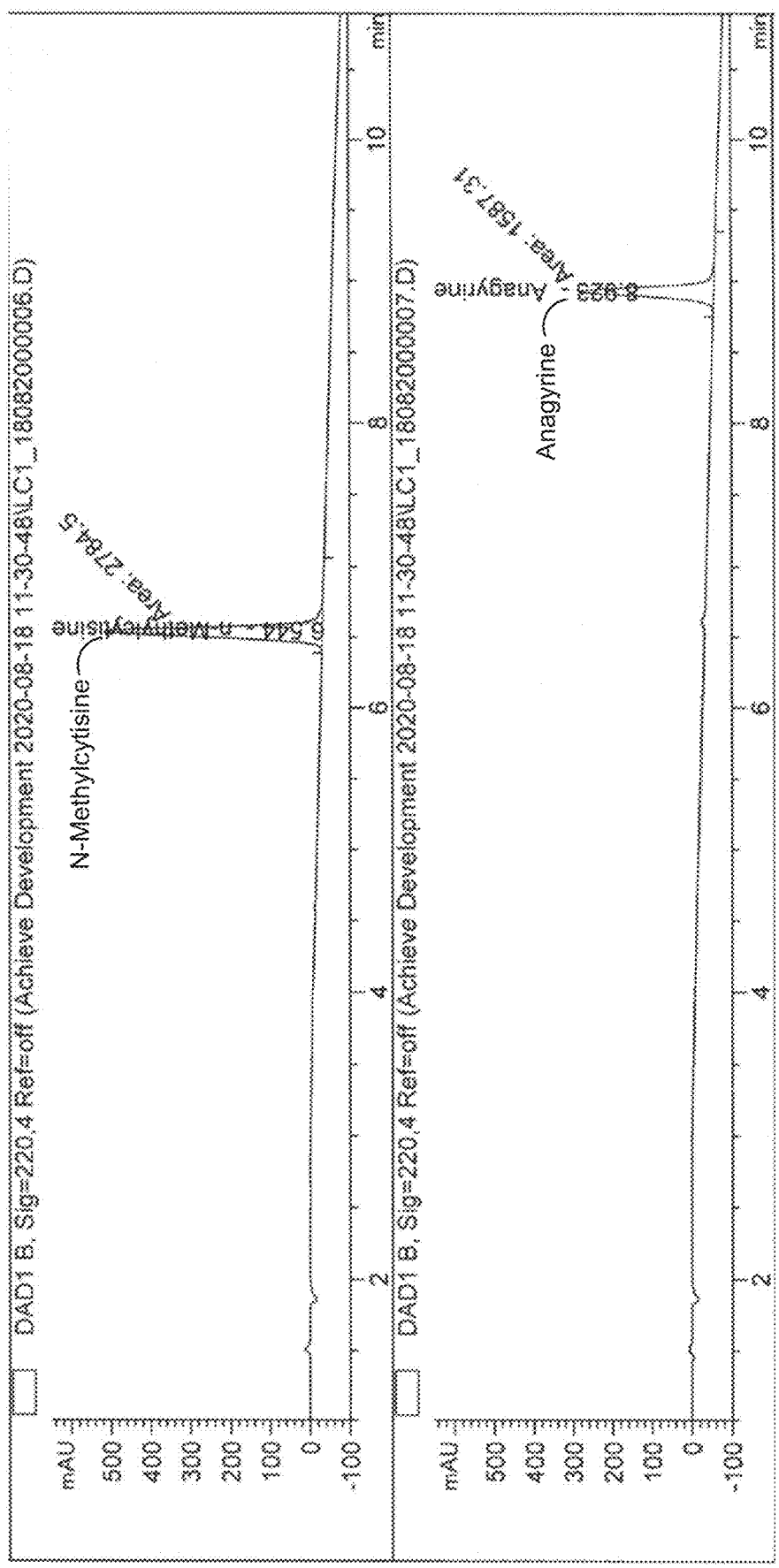
Figure 5C:
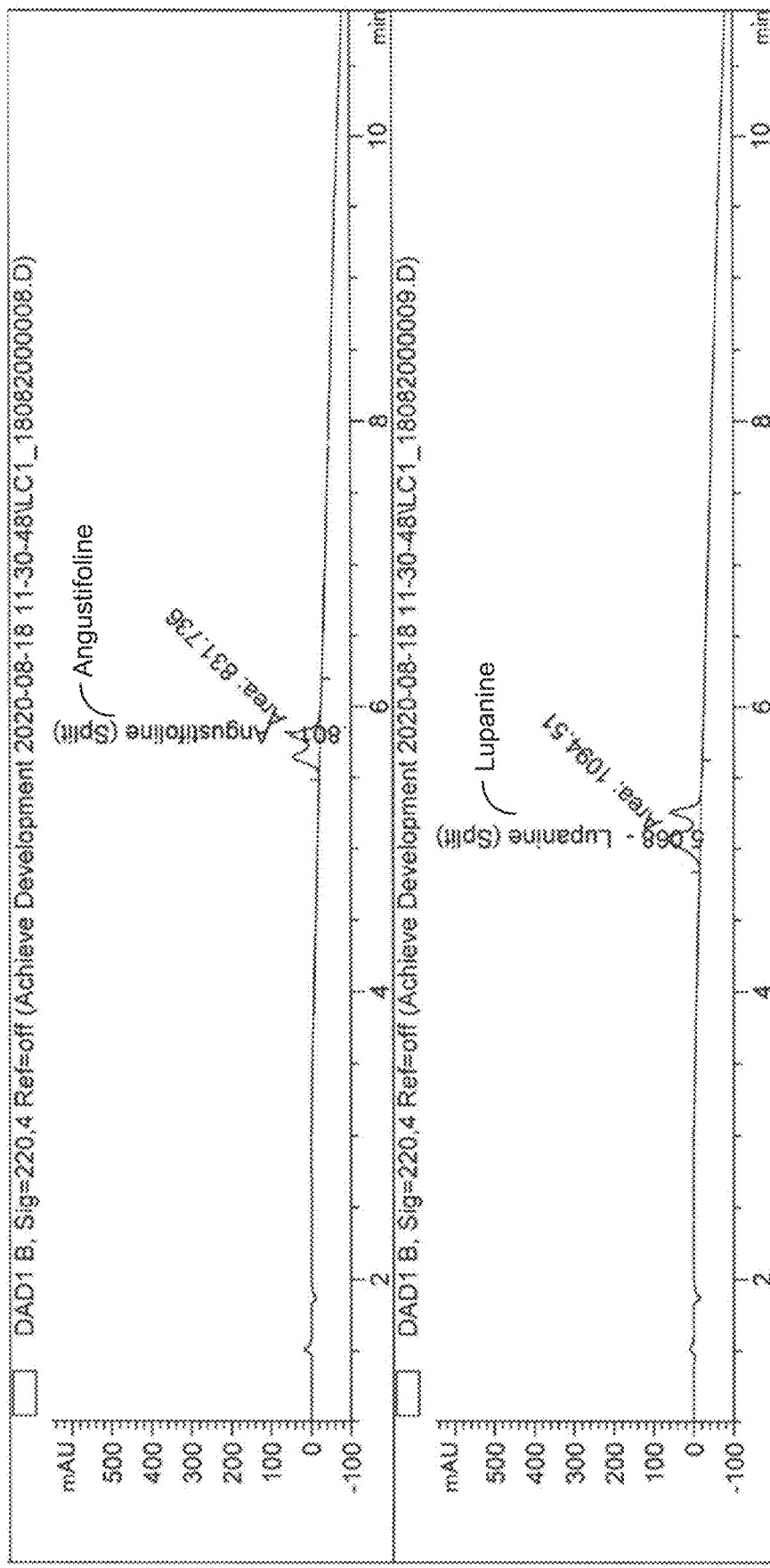
Figure 6A:
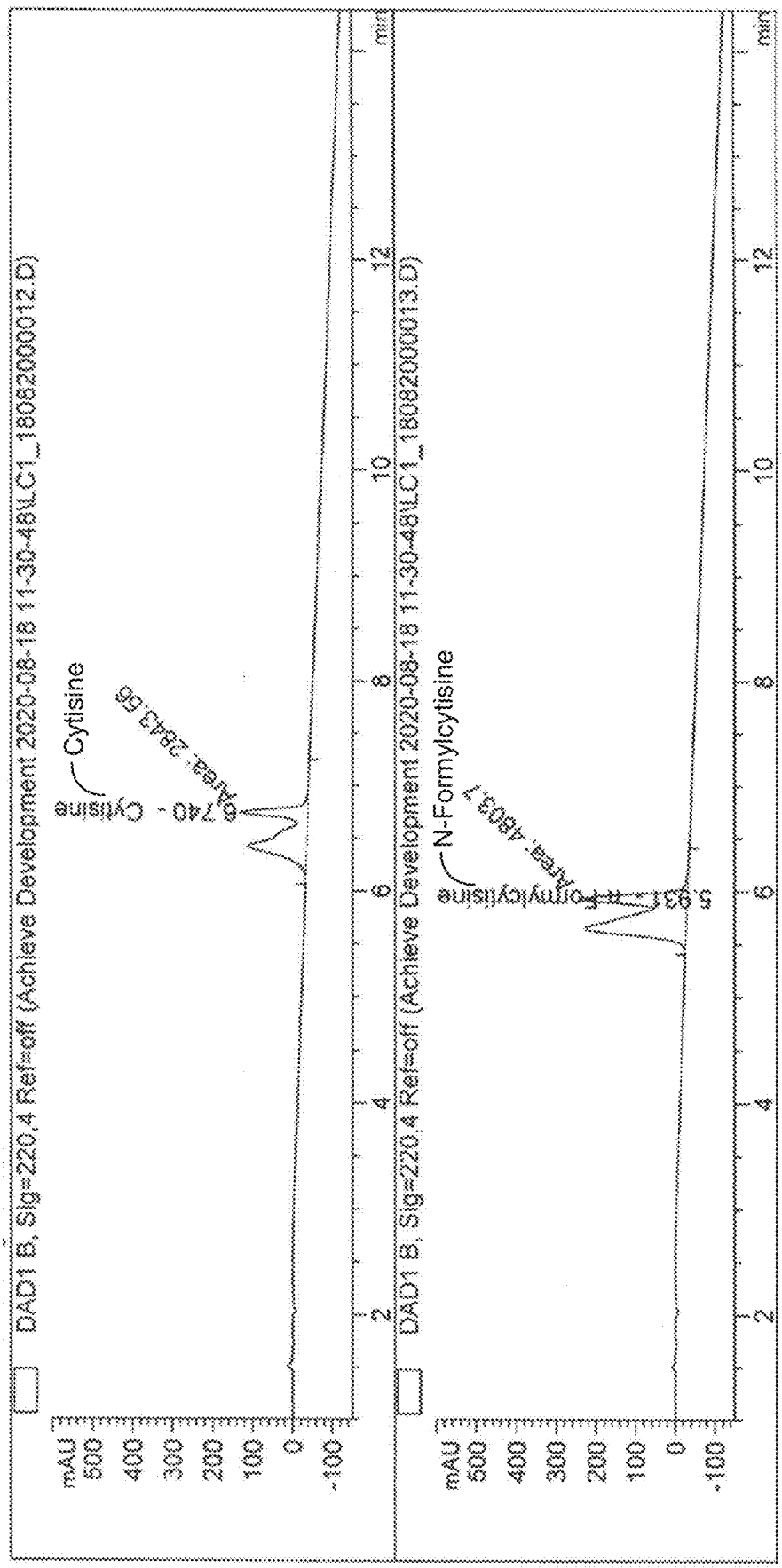
FIGS. 6A-6C are exemplary chromatographs of cytisine and N-formylcytisine (FIG. 6A), N-methylcytisine and anagyrine (FIG. 6B), and angustifoline and lupanine (FIG. 6C) using a mobile phase comprising 2 mM ammonium formate (pH 8) and methanol in accordance with embodiments of the present disclosure.
Figure 6B:
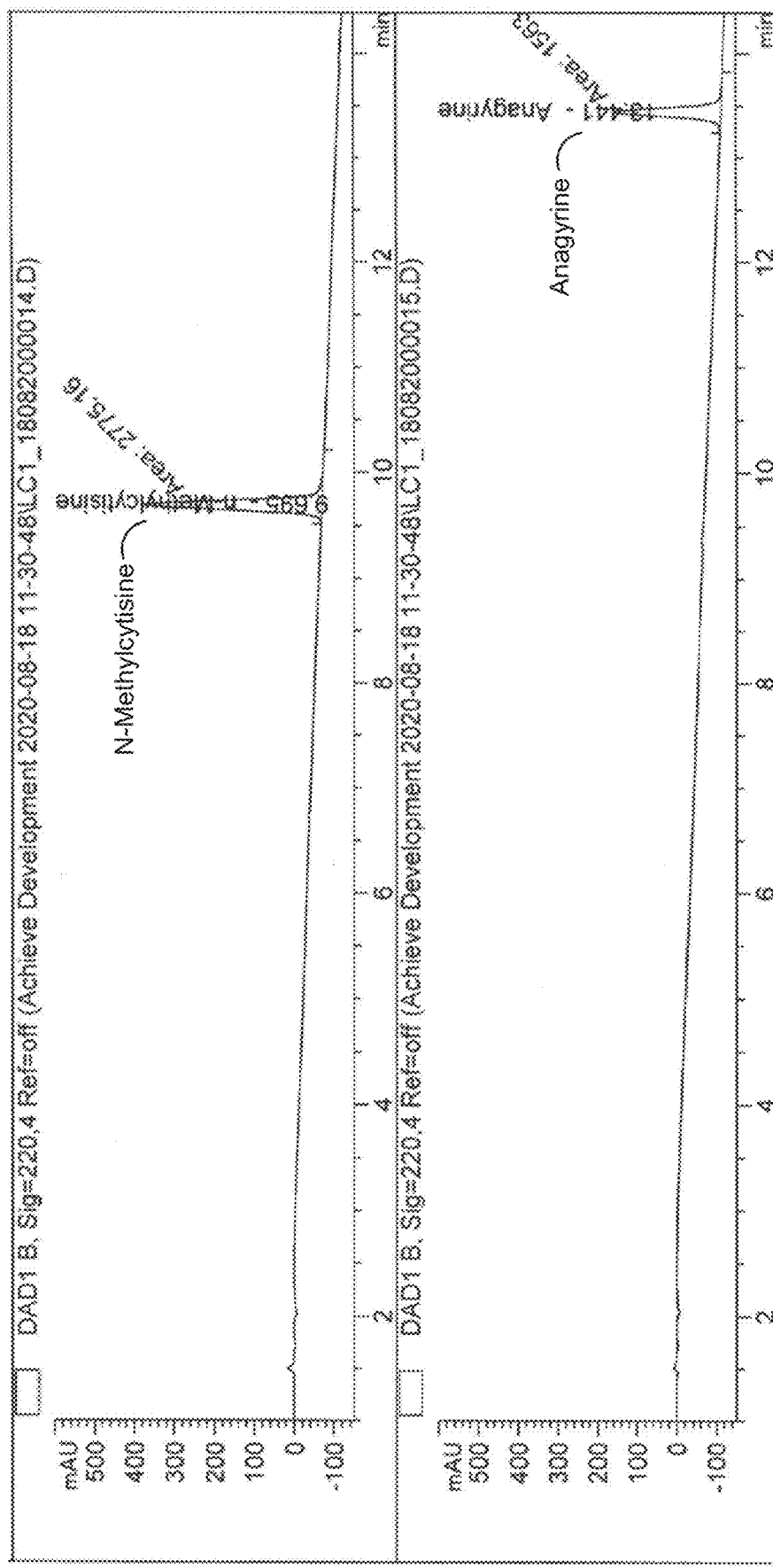
Figure 6C:
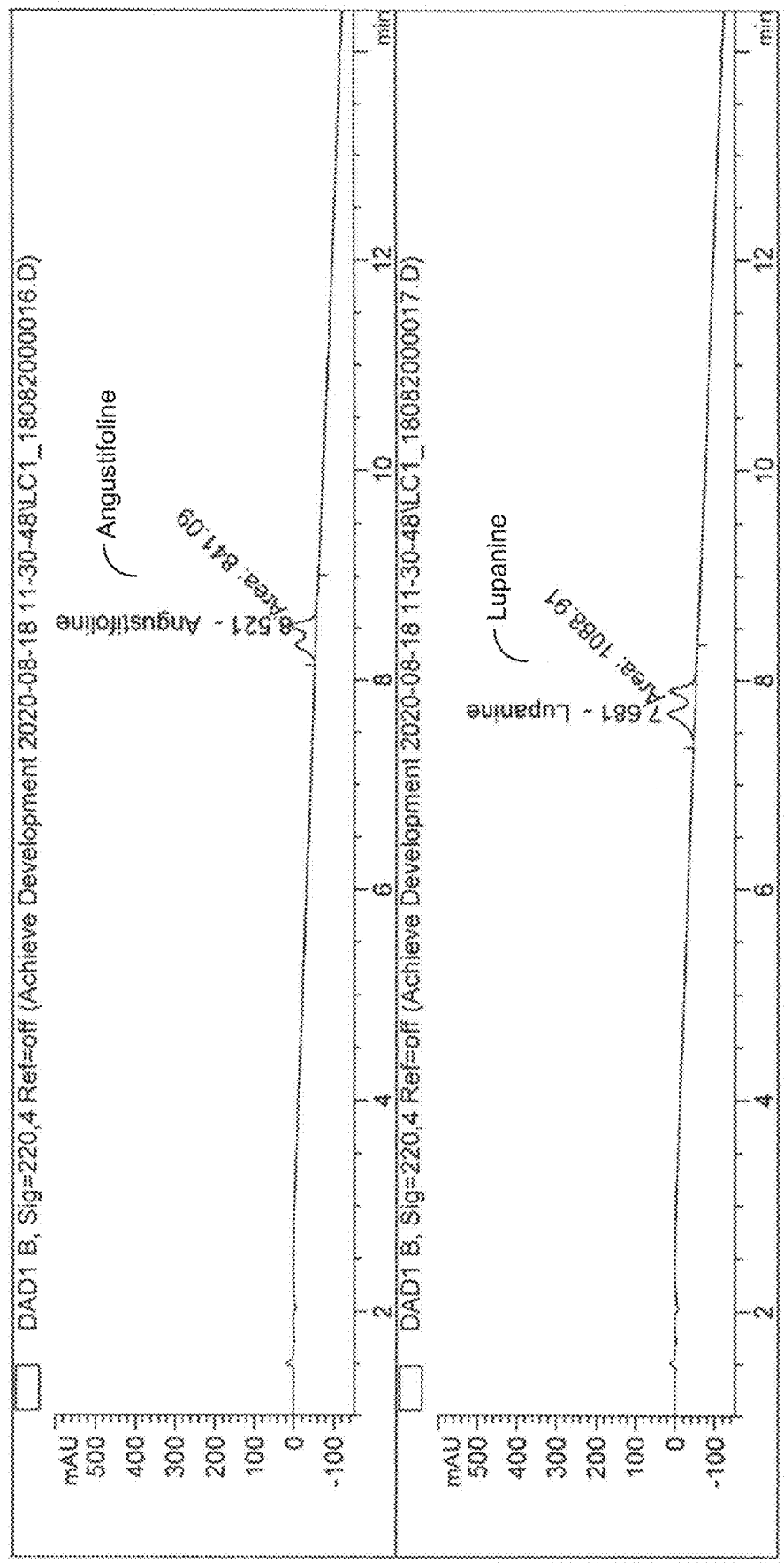

Due to the lack of retention for cytisine with the acidic gradient, further screening was performed using a different buffer system. 20 mM ammonium formate (pH 8.0) was prepared and screened separately with both acetonitrile and methanol as an organic phase. Ammonium formate was preferred over ammonium bicarbonate due to fewer gradient impurities found at 200 nm. Methanol proved to have a big impact on the retention of cytisine and the screened impurities. Retention was increased by at least 2 minutes for each impurity. This screening was conducted before the diluent had been altered, and, as such, the peak shape is still very poor at this point; however, a distinguishable peak can still be identified in each chromatogram. The chromatograms of this stage of screening are shown in FIGS. 5A-5C (2 mM ammonium formate (pH 8) and acetonitrile) and FIGS. 6A-6C (2 mM ammonium formate (pH 8) and methanol).

3. Mobile Phase Screening: Stage 2

Figure 7:
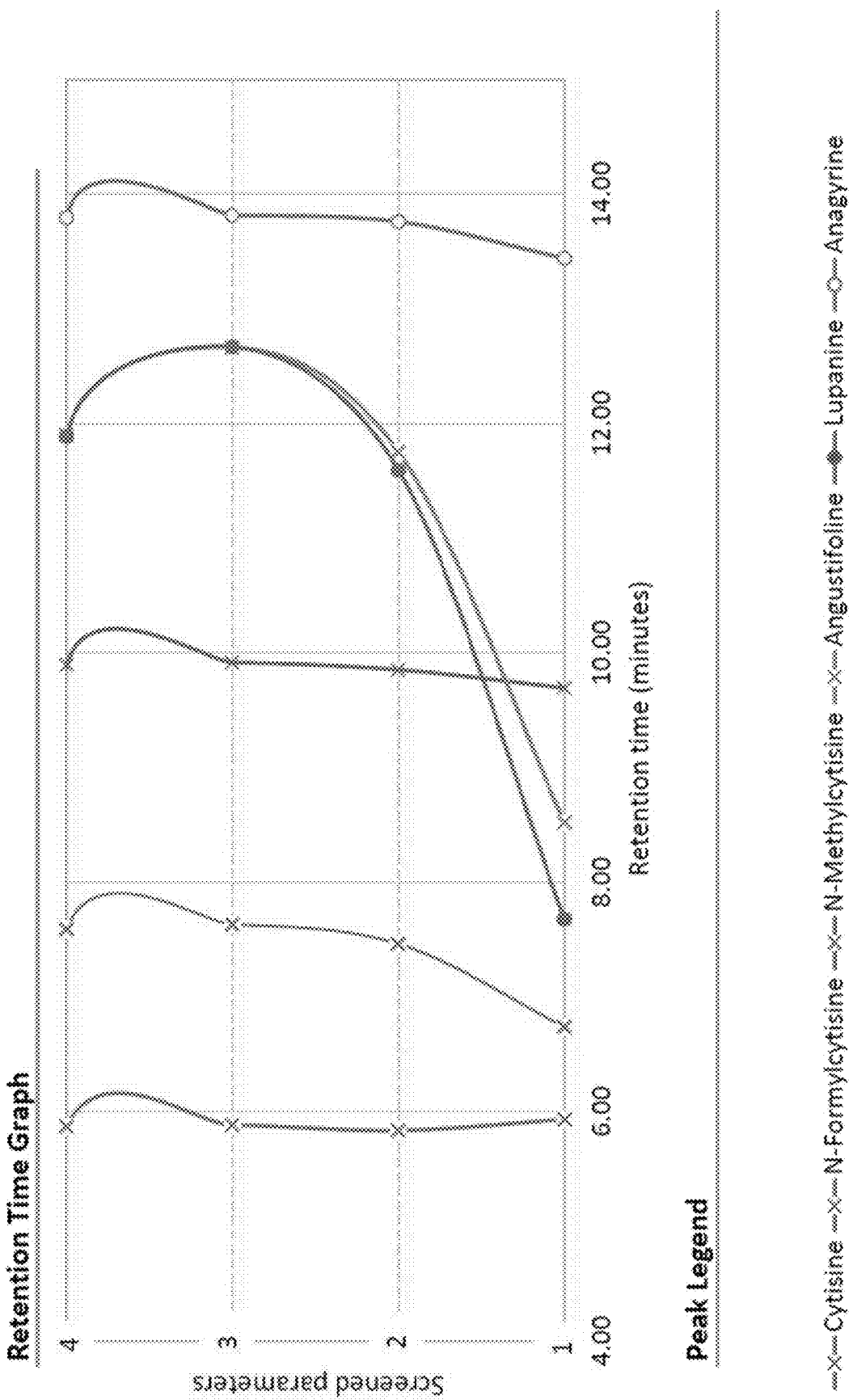
FIG. 7 is an exemplary plot showing retention time of cytisine and each of the known impurities as the pH of the mobile phase changes in accordance with embodiments of the present disclosure (legend: (1)—20 mM ammonium formate (pH 8.0)/methanol; (2)—10 mM boric acid (pH 8.5)/methanol; (3)—10 mM boric acid (pH 9.0)/methanol; and (4)—ammonia solution (pH 9.2)/methanol).

The increase in retention observed using methanol as an organic phase meant methanol was carried through to the next stage of mobile phase screening. Further buffers were screened at different pH levels. FIG. 7 and Tables 9 and 10 illustrate how retention times changes with pH. The results were plotted against the 20 mM ammonium formate (pH 8.0) with methanol showing retention time comparison (FIG. 7).

TABLE 9

Parameters Legend for FIG. 7

| Legend | Screened Parameters |
|---|---|
| 1 | 20 mM Ammonium Formate (pH 8)/Methanol |
| 2 | 10 mM Boric Acid (pH 8.5)/Methanol |
| 3 | 10 mM Boric Acid (pH 9.0)/Methanol |
| 4 | Ammonia Solution (pH 9.2)/Methanol |

TABLE 10

Retention Time Table

| Peak Name | 1 | 2 | 3 | 4 |
|---|---|---|---|---|
| Cytisine | 6.74 | 7.46 | 7.632 | 7.59 |
| N-Formylcytisine | 5.93 | 5.84 | 5.882 | 5.87 |
| N-Methylcytisine | 9.70 | 9.85 | 9.916 | 9.90 |
| Anagyrine | 8.52 | 11.75 | 12.664 | 11.90 |
| Angustifoline | 7.68 | 11.59 | 12.669 | 11.89 |
| Lupanine | 13.44 | 13.76 | 13.815 | 13.80 |

The findings from this stage of mobile phase screening were used for further mobile phase optimization detailed in section 5.

4. Stationary Phase Screening

Stationary phase screening started in parallel to the second stage of mobile phase screening. This screening was performed in a similar fashion to mobile phase screening; however, the column was changed instead of the mobile phase. The temperature was increased from 30° C. to 40° C. to combat back pressure issues observed with columns of a smaller particle size. The parameters used for screening are enumerated in Tables 11 and 12.

TABLE 11

HPLC Parameters for Stationary Phase Screening
HPLC Parameters

| | |
|---|---|
| System | Agilent 1100/1200 series liquid chromatograph or equivalent |
| Column | Various stationary phases |
| Mobile Phase A | 20 mM Ammonium formate (pH 8.0): Methanol (95:5) |
| Mobile Phase B | Methanol:20 mM Ammonium formate (pH 8.0) (95:5) |
| Flow Rate | 1.0 ml/min |
| Stop Time | 25 min |
| Injection Volume | 5 μl |
| Column Temperature | 40° C. |
| Wavelength | 200 nm, 220 nm, 310 nm |
| Post Run Time | 5 min |

TABLE 12

HPLC Gradient Parameters for Stationary Phase Screening
HPLC Gradient Parameters

| Time | % A | % B |
|---|---|---|
| 0 | 95 | 5 |
| 20 | 5 | 95 |
| 24.5 | 5 | 95 |
| 25 | 95 | 5 |

Figure 8:
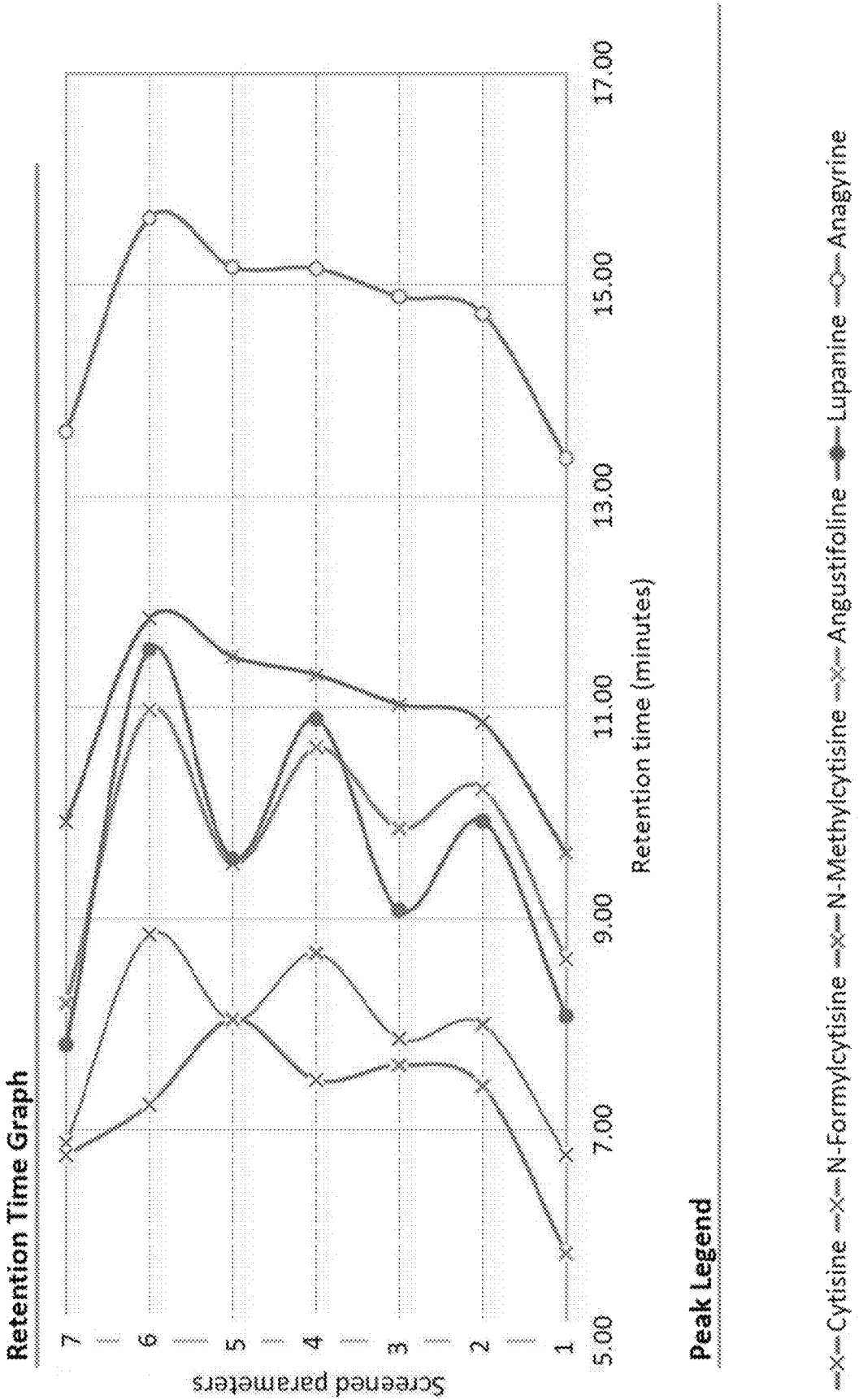
FIG. 8 is an exemplary plot showing retention time of cytisine and each of the known impurities as the stationary phase changes in accordance with embodiments of the present disclosure (legend: (1)—C18; 150×4.6 mm, 3.5 μm particle size; (2)—Phenyl; 150×4.6 mm, 3.5 μm particle size; (3)—Phenyl-Hexyl; 150×4.6 mm, 3.5 μm particle size; (4)—YMC C18; 150×4.6 mm, 3.0 μm particle size; (5)—Phenyl; 150×4.6 mm, 3.0 μm particle size; (6)—Synergi MAX-RP; 150×4.6 mm, 4 μm particle size; and (7)—Gemini C6-Phenyl; 150×4.6 mm, 5 μm particle size).

The range of stationary phases screened incorporate different reversed-phase chemistries as well as varying particle size and column dimensions. Selection of the best stationary phase was based on good resolution of all impurities and comparable peak shape. A good window around the cytisine peak was also desired to allow for high sample loading if necessary. The columns screened are listed below in Table 13. A report demonstrating the separation of the impurities is shown in FIG. 8.

TABLE 13

Screened Stationary Phases

| No. | Screened Stationary Phases |
|---|---|
| 1 | C18; 150 × 4.6 mm, 3.5 μm particle size |
| 2 | Phenyl; 150 × 4.6 mm, 3.5 μm particle size |
| 3 | Phenyl-Hexyl; 150x4.6 mm, 3.5 μm particle size |
| 4 | YMC C18; 150 × 4.6 mm, 3.0 μm particle size |
| 5 | Phenyl; 150 × 4.6 mm, 3.0 μm particle size |
| 6 | Synergi MAX-RP; 150 × 4.6 mm, 4 μm particle size |
| 7 | Gemini C6-Phenyl; 150 × 4.6 mm, 5 μm particle size |
| 8 | Synergi Polar-RP; 250 × 4.6 mm, 4 μm particle size |

The Synergi Polar-RP results were omitted from this report as only two compounds eluted using this column. The Synergi MAX-RP displayed very poor peak shape for cytisine. Both phenyl and phenyl-hexyl stationary phases struggled to give adequate separation between cytisine and N-formylcytisine. The C18 stationary phase gave the best separation around the cytisine peak, exhibited good peak shape, and resolved all impurities. Further C18 stationary phases enumerated below in Table 14 were screened to investigate more particle sizes.

TABLE 14

C18 Stationary Phases Screened

| No. | C18 Stationary Phases Screened |
|---|---|
| 1 | C18; 150 × 4.6 mm, 3.5 μm particle size |
| 2 | YMC C18; 150 × 4.6 mm, 3.0 μm particle size |
| 3 | ACE C18; 150 × 4.6 mm, 3.0 μm particle size |
| 4 | C18; 150 × 4.6 mm, 2.7 μm particle size |
| 5 | C18; 150 × 4.6 mm, 2.5 μm particle size |

The YMC 3.0 μm and the 2.7 μm C18 stationary phases resulted in poor separation of N-methylcytisine, angustifoline, and lupanine. The YMC 3.0 μm column also gave a split peak for N-formylcytisine. The 2.7 μm C18 column also exhibited very poor peak shape for cytisine. The 2.5 μm C18, ACE 3.0 μm C18, and 3.5 μm C18 stationary phases gave good separation of cytisine and expected impurities. These columns were carried through to the next stage and screened against additional mobile phases.

5. Further Mobile Phase and Stationary Phase Screening

Figure 9A:
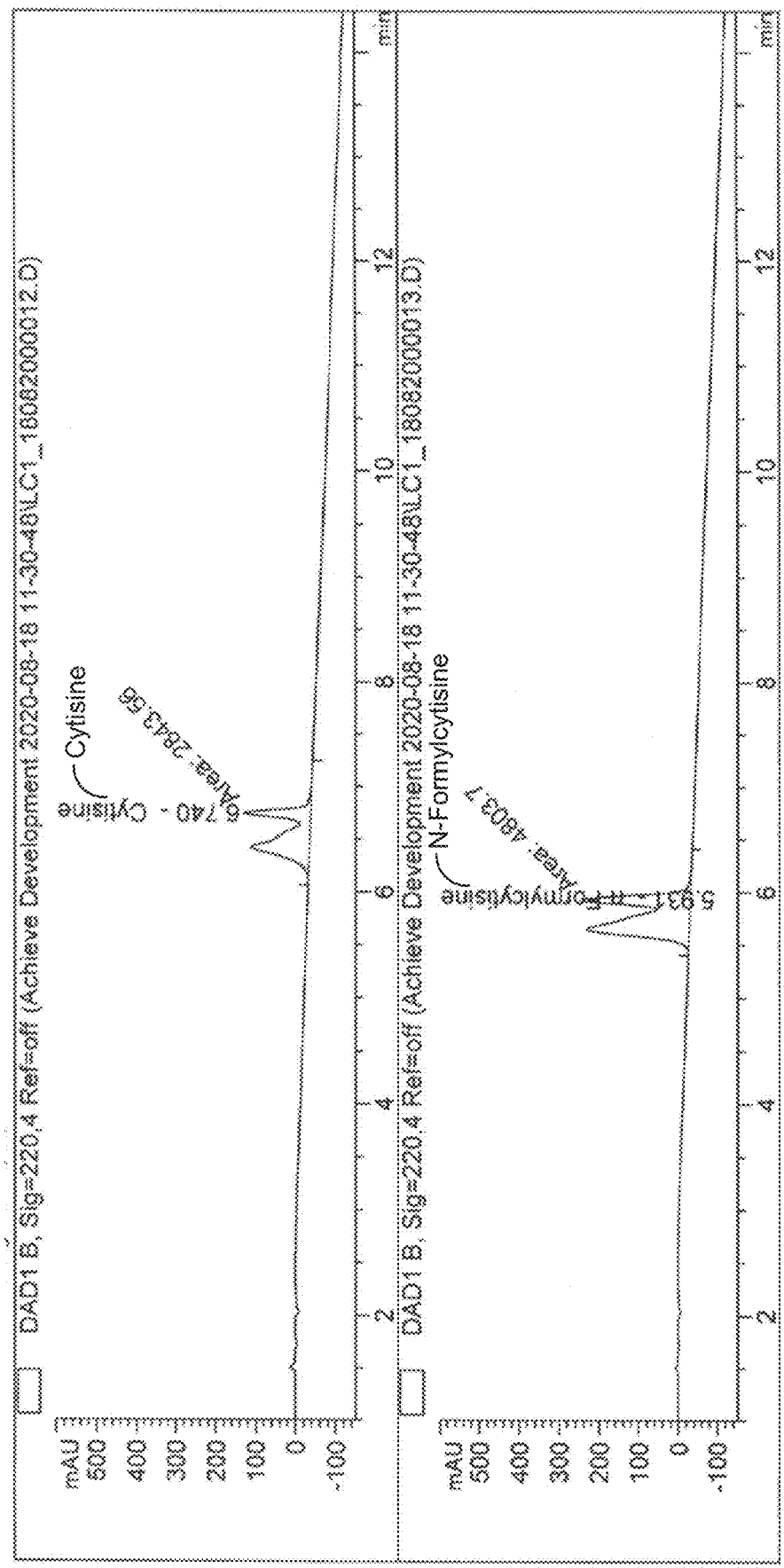
FIGS. 9A-9C are exemplary chromatographs of cytisine and N-formylcytisine (FIG. 9A), N-methylcytisine and anagyrine (FIG. 9B), and angustifoline and lupanine (FIG. 9C) using a mobile phase comprising 10 mM boric acid buffer (pH 8) and methanol in accordance with embodiments of the present disclosure.
Figure 9B:
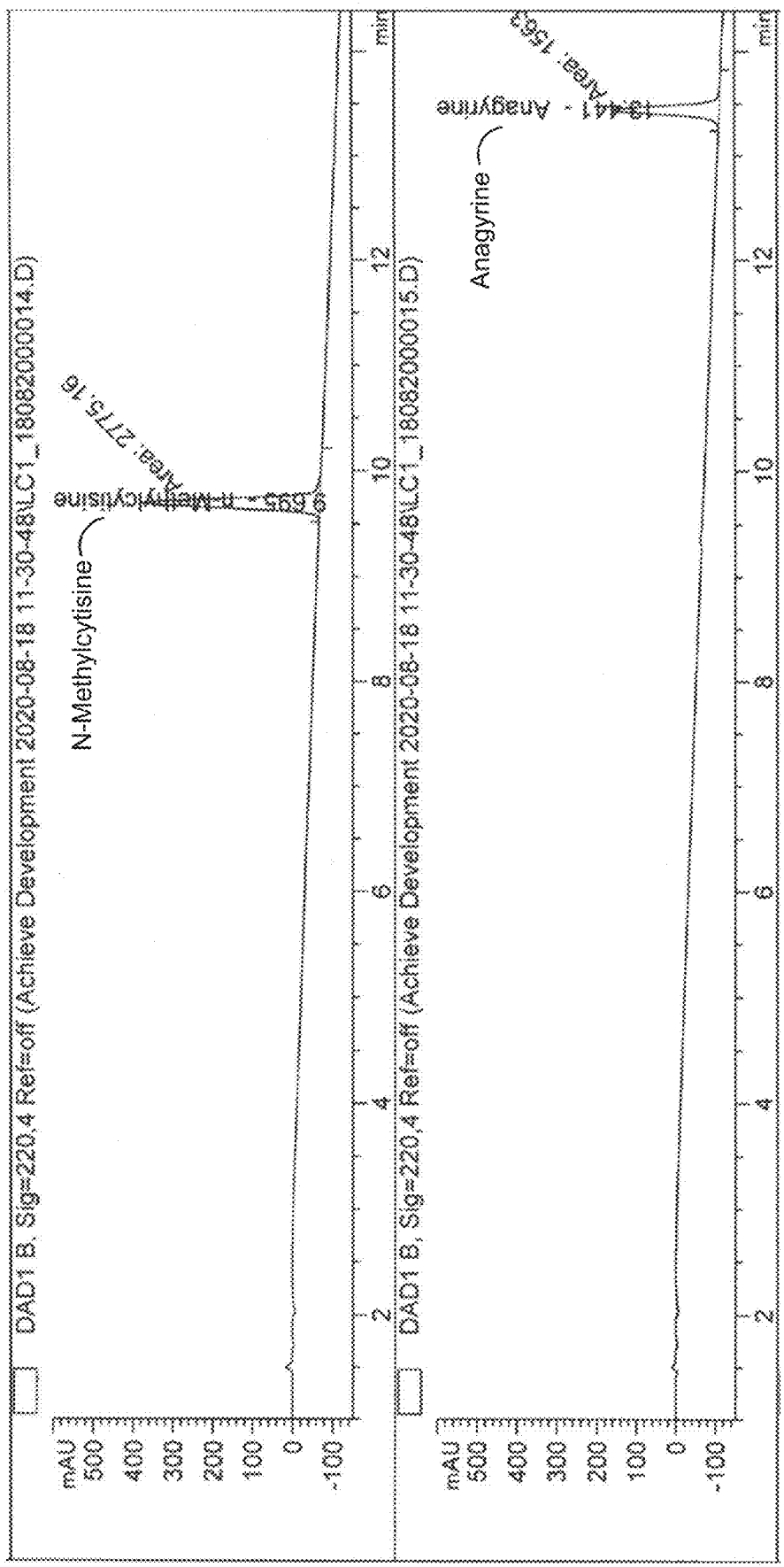
Figure 9C:
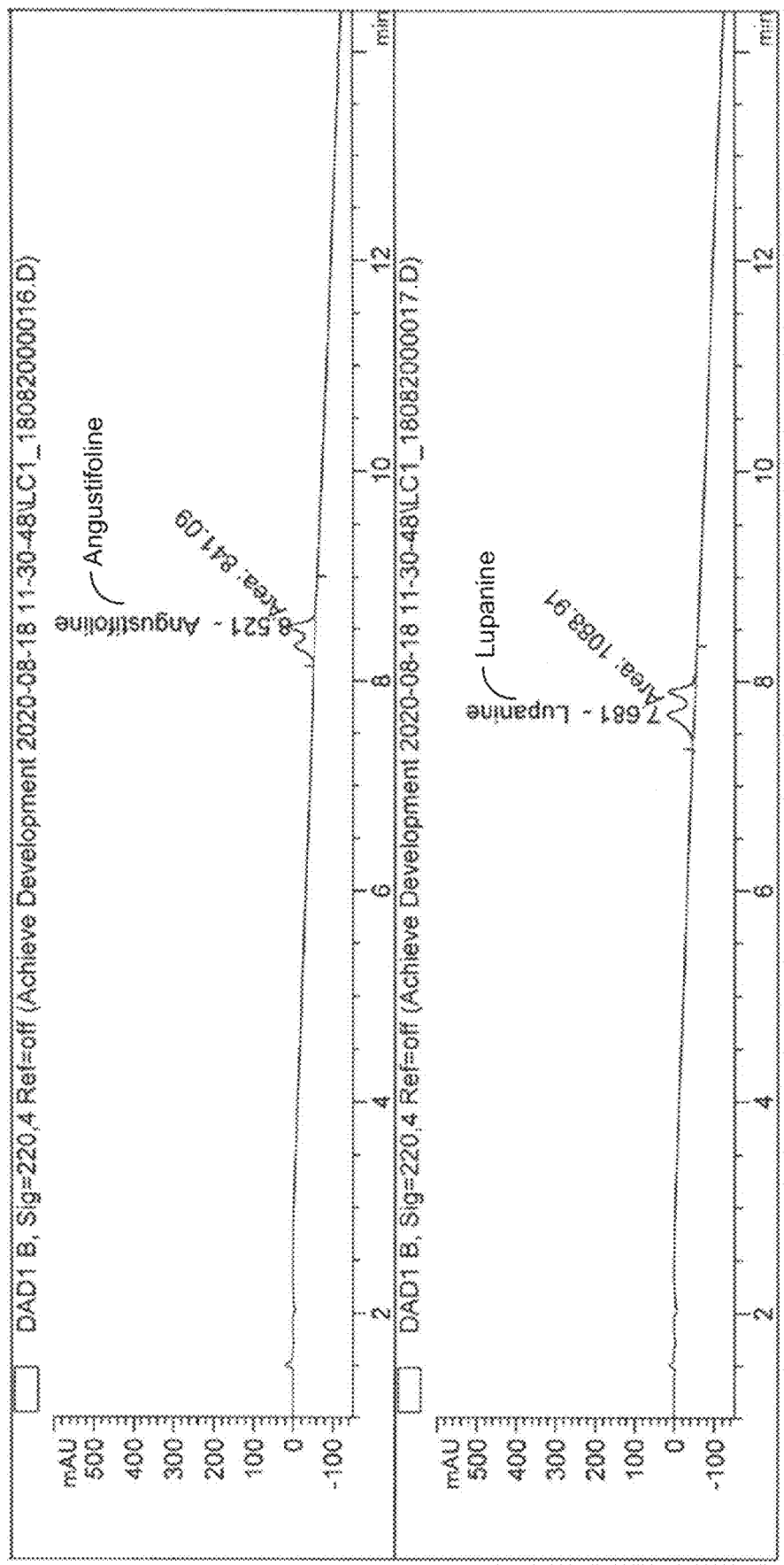
Figure 10A:
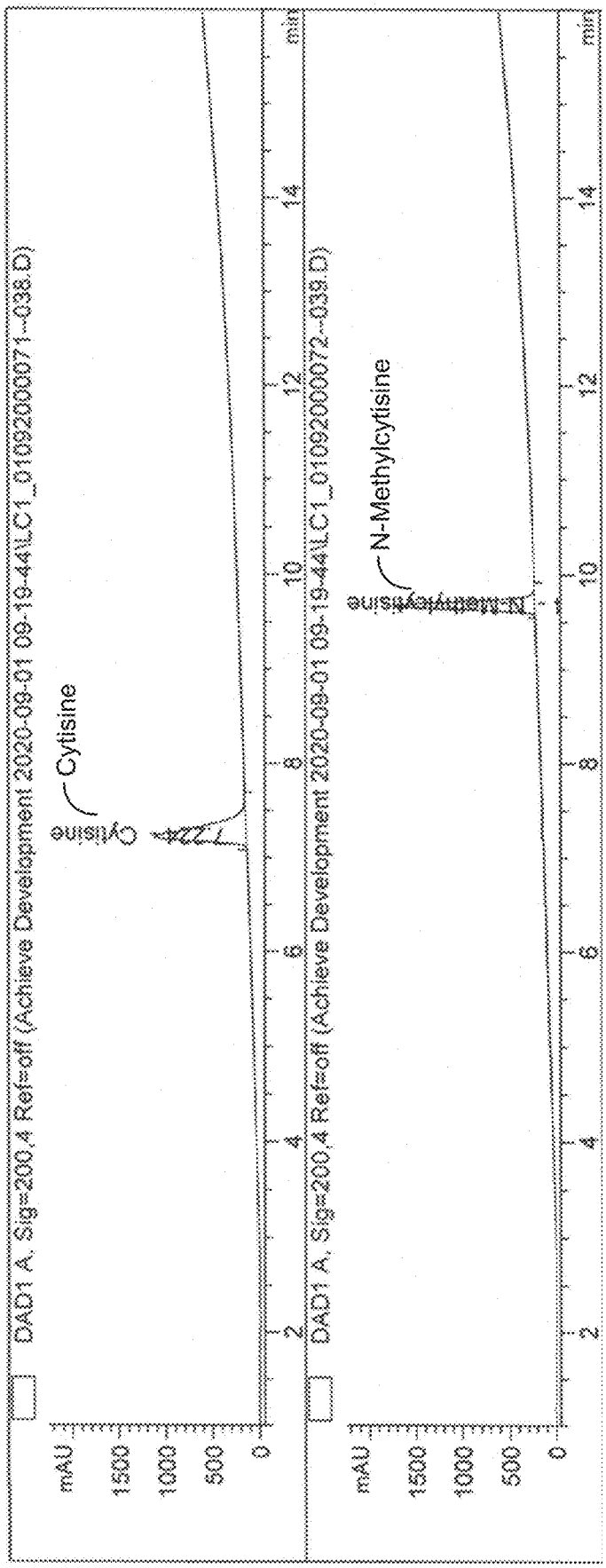
FIGS. 10A-10C are exemplary chromatographs of cytisine and N-methylcytisine (FIG. 10A), N-formylcytisine and anagyrine (FIG. 10B), and angustifoline, lupanine, and sparteine (FIG. 10C) using the stationary phase XBridge C18 3.5 μm and methanol in accordance with embodiments of the present disclosure.
Figure 10B:
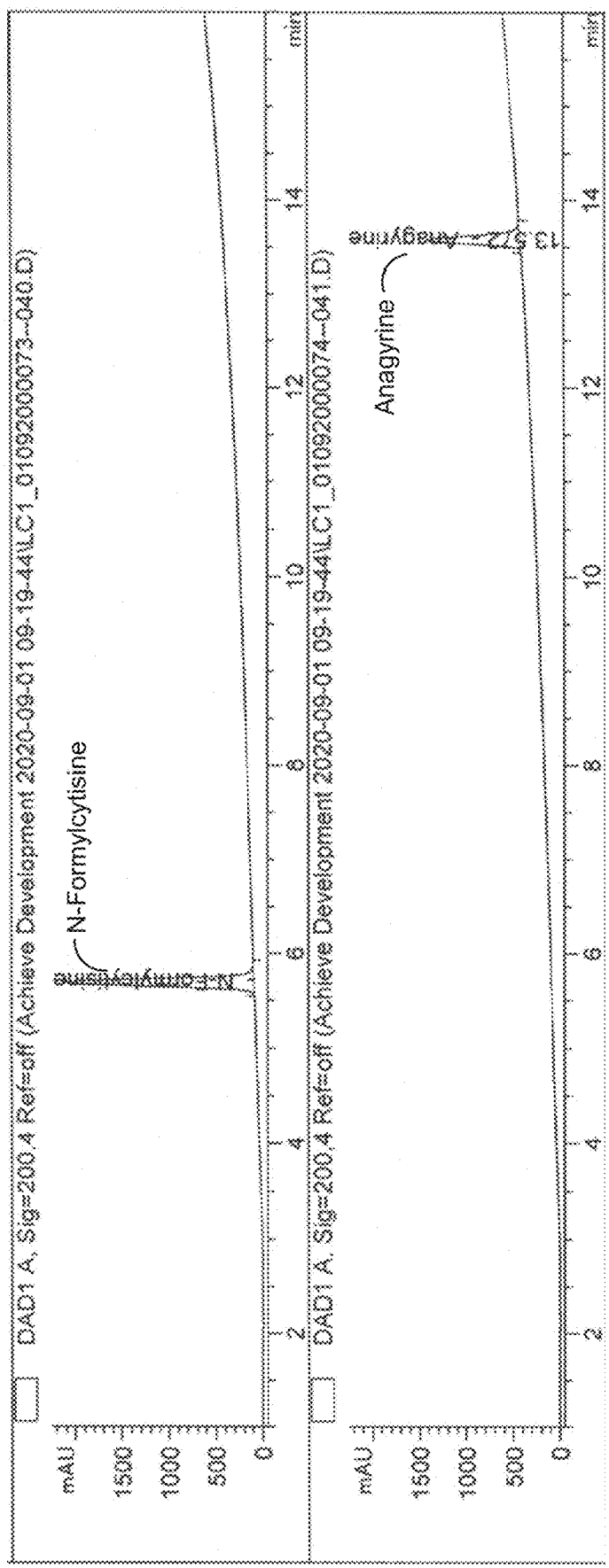
Figure 10C:
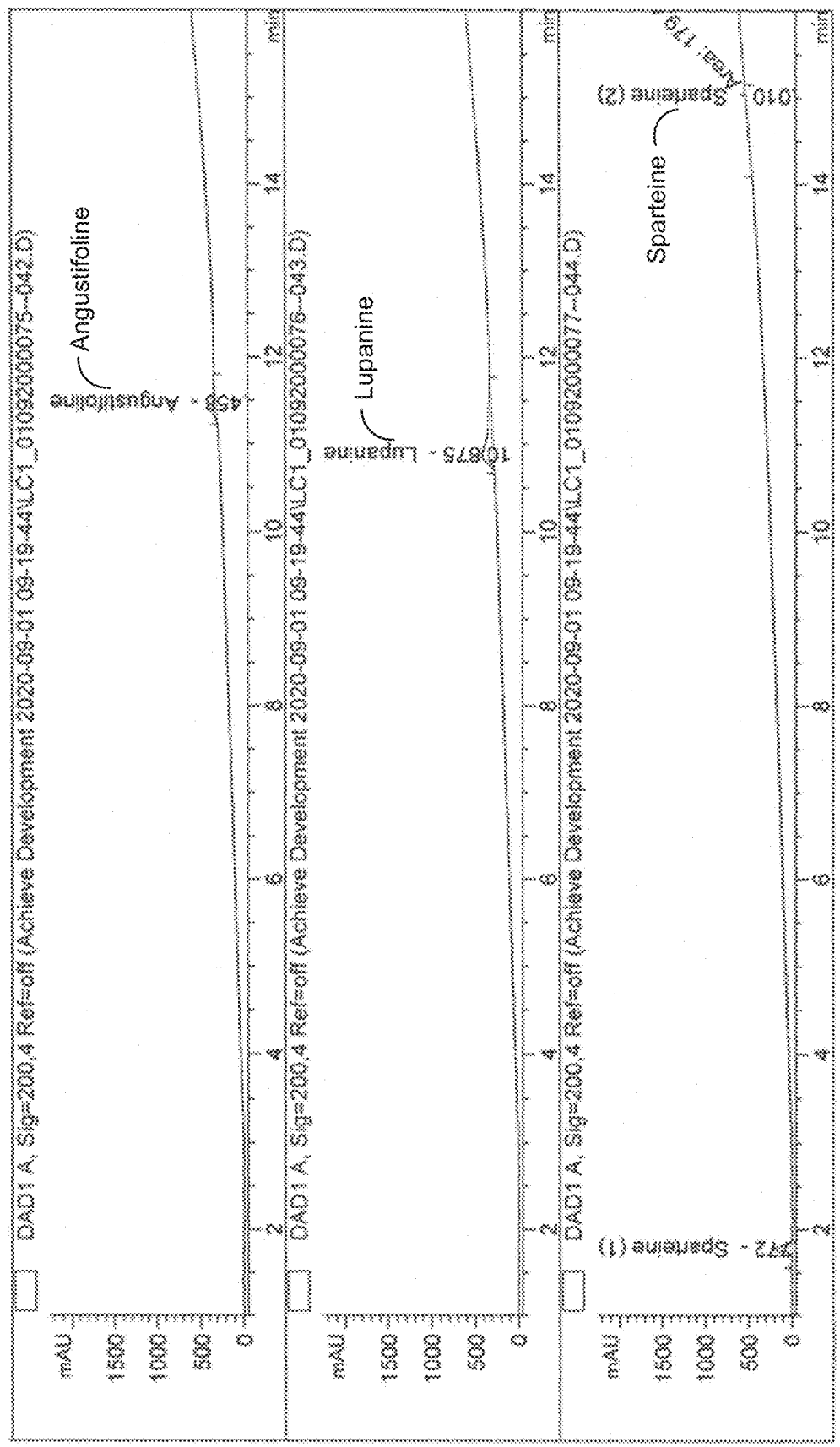

The most promising columns and mobile phases were combined for an additional, much more targeted stage of development. A 10 mM boric acid buffer (pH 8.0) was used as opposed to 20 mM ammonium formate (pH 8.0) as the boric acid buffer mobile phase increased the separation around the cytisine peak as shown in FIGS. 9A-9C (20 mM ammonium formate (pH 8.0) and methanol) and 10A-10C (XBridge C18 3.5 μm and methanol).

The mobile phases and stationary phases screened in this stage are listed below in Tables 15 and 16, respectively, along with the system parameters in Tables 17 and 18. The 10 mM boric acid buffer (pH 8.0) and methanol combination could not be screened together on the smallest particle size due to high pressure on the column. Table 19 shows the combination of mobile and stationary phases with peak height, peak width, and USP Tailing of the cytisine peak.

TABLE 15

Screened Mobile Phases

| No. | Aqueous phase | Organic phase |
|---|---|---|
| 1 | 10 mM Boric Acid Buffer (pH 8.0) | Acetonitrile |
| 2 | 10 mM Boric Acid Buffer (pH 8.0) | Methanol |

TABLE 16

Screened Stationary Phases

| | |
|---|---|
| A | C18; 150 × 4.6 mm, 3.5 μm particle size |
| B | ACE C18; 150 × 4.6 mm, 3.0 μm particle size |
| C | C18; 150 × 4.6 mm, 2.5 μm particle size |

TABLE 17

HPLC Parameters

| | |
|---|---|
| System | Agilent 1100/1200 series liquid chromatograph or equivalent |

TABLE 17-continued

HPLC Parameters

| Column | Various stationary phases |
| --- | --- |
| Mobile Phase A | 10 mM Borate buffer (pH 8.0) |
| Mobile Phase B | Methanol/Acetonitrile |
| Flow Rate | 1.0 ml/min |
| Stop Time | 25 min |
| Injection Volume | 5 pl |
| Column Temperature | 40° C. |
| Wavelength | 200 nm |
| Post Run Time | 5 min |

TABLE 18

HPLC Gradient Parameters

| Time | % A | % B |
| --- | --- | --- |
| 0 | 95 | 5 |
| 20 | 5 | 95 |
| 24.5 | 5 | 95 |
| 25 | 95 | 5 |

TABLE 19

Combination of Mobile and Stationary Phases with Peak Height, Peak Width, and USP Tailing of the Cytisine Peak

| Screened Parameter | Cytisine RT (min) | Peak Height (mAu) | Peak Width* (min) | USP Tailing |
| --- | --- | --- | --- | --- |
| 1A | 5.16 | 1348.19 | 0.1157 | 1.72 |
| 1B | 5.97 | 1382.95 | 0.1028 | 1.81 |
| 1C | 4.76 | 1769.75 | 0.0682 | 2.25 |
| 2A | 7.22 | 981.67 | 0.1633 | 2.07 |
| 2B | 8.07 | 1072.83 | 0.1333 | 2.68 |

*Peak width measured at half height.

Absorbance of methanol resulted in much smaller peak height for cytisine and, therefore, lower method sensitivity. Peak width was also narrower for cytisine with acetonitrile as the organic phase. There is also a correlation between a smaller particle size and an increase in peak height/decrease in peak width. However, an increase in USP Tailing was observed. A further run was performed with the boric acid buffer adjusted to pH 10.0 using the 2.5 μm C18 column. There was also 5% v/v methanol included in the mobile phase. The results from this experiment are shown below in Table 20. This test was performed on a different instrument with a different detector. Therefore, peak height is not directly comparable to the results above.

TABLE 20

Screened pH Parameters with Boric Acid Buffer

| Screened Parameter | Cytisine RT (min) | Peak Height (mAu) | Peak Width* (min) | USP Tailing |
| --- | --- | --- | --- | --- |
| pH 8.0 | 4.49 | 1305.12 | 0.08 | 2.43 |
| pH 10.0 | 4.61 | 1023.32 | 0.06 | 1.01 |

*Peak width measured at half height.

Another test was performed with the concentration of the buffer increased to 25 mM boric acid; this was also performed using the 2.5 μm C18 column. The results of this run are included below in Table 21 for the cytisine peak.

TABLE 21

Screened Concentration Parameters with Boric Acid Buffer

| Screened Parameter | Cytisine RT (min) | Peak Height (mAu) | Peak Width* (min) | USP Tailing |
| --- | --- | --- | --- | --- |
| 10 mM Boric Acid Buffer | 5.10 | 1696.08 | 0.05 | 1.20 |
| 25 mM Boric Acid Buffer | 5.21 | 1632.44 | 0.06 | 1.30 |

*Peak width measured at half height.

These results show that there is no significant impact on peak shape with an increase in buffer concentration. Following these results, 10 mM boric acid (pH 10.0) was deemed appropriate for the aqueous mobile phase. It was also noted that changing the pH modifier of the boric acid to ammonia, as opposed to sodium hydroxide, increased compatibility with liquid chromatography mass spectrometry (LC-MS).

6. Gradient Screening

Methanol has a distinct impact on retention of the cytisine peak. Therefore, a brief trial of gradients was conducted using a combination of methanol and acetonitrile as the organic phase. The below conditions enumerated in Table 22 (A=10 mM Boric acid buffer (pH 8.0), B=Methanol and C=Acetonitrile) were screened with the aim of optimizing the separation between the impurities and reducing the absorption of the gradient.

TABLE 22

Screened Organic Phases Using Methanol and Acetonitrile

| Gradient A | | | | Gradient B | | | | Gradient C | | | |
| --- | --- | --- | --- | --- | --- | --- | --- | --- | --- | --- | --- |
| T | % A | % B | % C | T | % A | % B | % C | T | % A | % B | % C |
| 0 | 95 | 5 | 0 | 0 | 95 | 5 | 0 | 0 | 95 | 5 | 0 |
| 20 | 5 | 5 | 90 | 20 | 5 | 20 | 75 | 20 | 5 | 50 | 45 |
| 24.5 | 5 | 5 | 90 | 24.5 | 5 | 20 | 75 | 24.5 | 5 | 50 | 45 |
| 25 | 95 | 5 | 0 | 25 | 95 | 5 | 0 | 25 | 95 | 5 | 0 |

A = 10 mM Boric Acid Buffer (pH 8.0), B = Methanol and C = Acetonitrile

Figure 11:
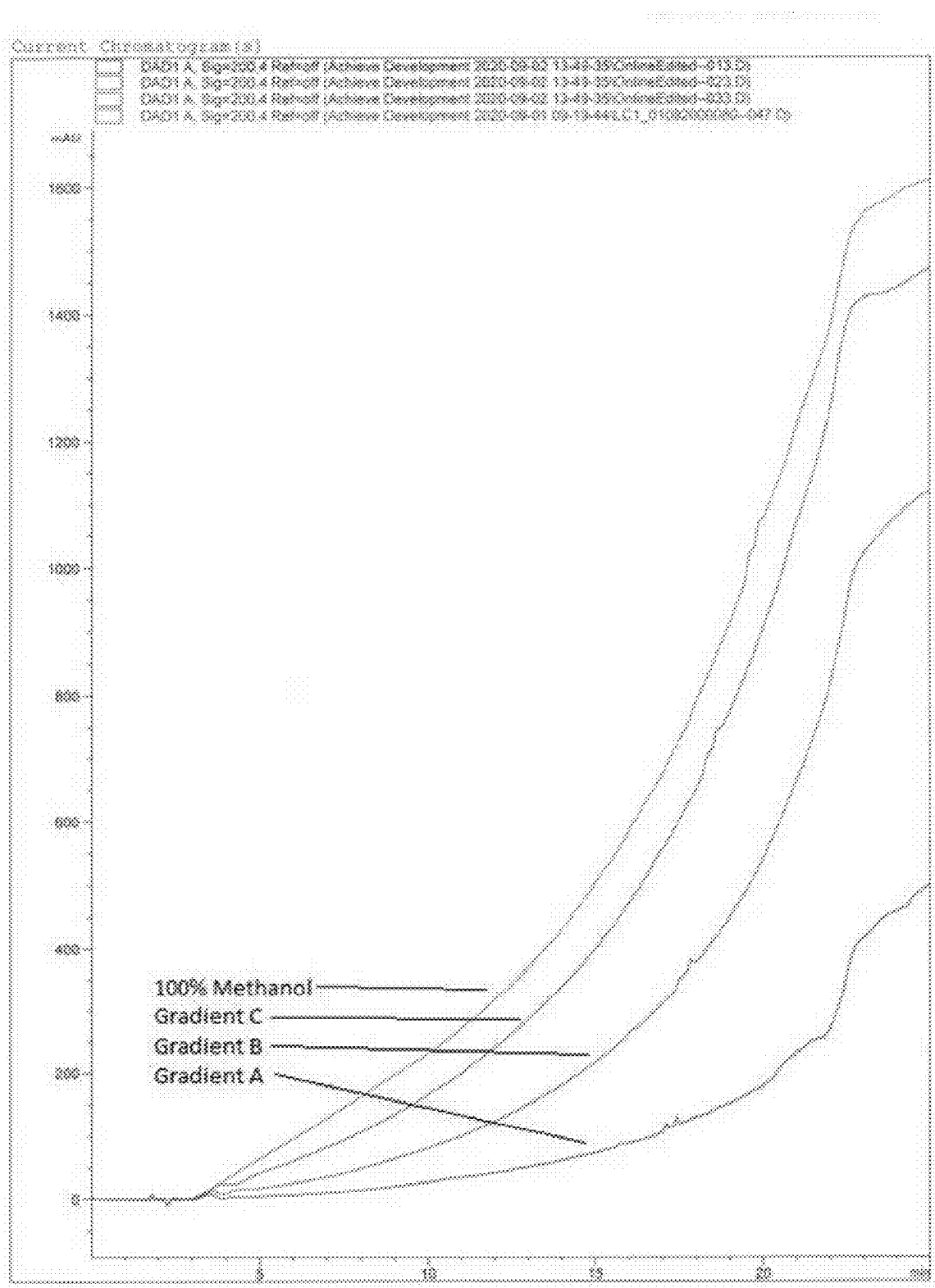
FIG. 11 is an exemplary chromatograph showing that the inclusion of methanol in the mobile phase causes a significant gradient rise in the chromatograph in accordance with embodiments of the present disclosure.

Methanol has been demonstrated to impact the separation of all the screened impurities with 5% v/v (Gradient A) methanol being sufficient to impact separation. The inclusion of methanol does result in additional complexity, however, and could have an impact on method robustness. The chromatogram in FIG. 11 also demonstrates the significant gradient rise observed with the inclusion of methanol.

Figure 12:
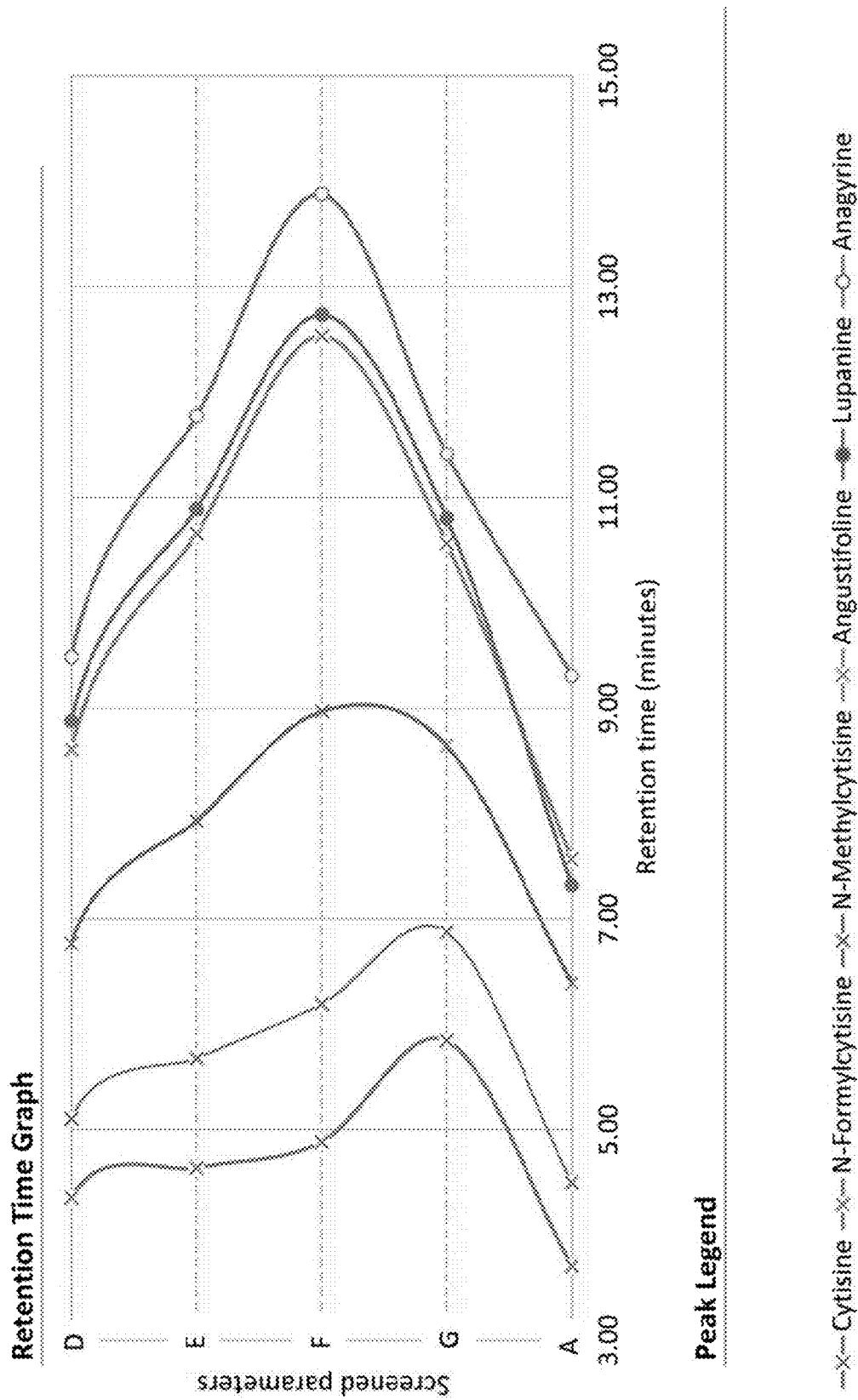
FIG. 12 is an exemplary plot showing retention time of cytisine and one or more impurities as the gradient of the mobile phase changes in accordance with embodiments of the present disclosure (legend: (A)—gradient A; (D)—gradient D; (E)—gradient E; (F)—gradient F; and (G)—gradient F, gradient A provided in Table 22 and gradients D-G provided in Table 23).

Development proceeded with further investigation to find an improved gradient using 100% acetonitrile as an organic phase, therefore removing the complexity of adding methanol. Longer gradients were screened as well as a gradient with a 2-minute isocratic hold at the beginning as enumerated in Table 23. This gradient screening was performed after the fine-tuning of the mobile phase, meaning the boric acid buffer was pH 10 as opposed to the previous gradients, which were screened at pH 8. Mobile phase screening showed that the change from pH 8 to pH 10 improved peak shape and the impact on retention times was negligible. Therefore, the results of the previous gradient screening and this further screening were still deemed comparable. The results of the gradient screening were tabulated to show retention times of each screened impurity. The gradients were compared to Gradient A (Table 22), which was the only gradient using methanol with acceptable gradient rise (FIG. 12).

TABLE 23

Screened Organic Phases Using Acetonitrile

| Gradient D | | | Gradient E | | | Gradient F | | | Gradient G (Selected) | | |
|---|---|---|---|---|---|---|---|---|---|---|---|
| T | % A | % B | T | % A | % B | T | % A | % B | T | % A | % B |
| 0 | 100 | 0 | 0 | 100 | 0 | 0 | 0 | 0 | 0 | 100 | 0 |
| 20 | 0 | 100 | 30 | 0 | 100 | 40 | 40 | 40 | 2 | 100 | 0 |
| 24.5 | 0 | 100 | 34.5 | 0 | 100 | 44.5 | 44.5 | 44.5 | 22 | 0 | 100 |

Mobile Phase A = 10 mM Boric Acid Buffer pH 10.0:Acetonitrile (95:5)
Mobile Phase B = 10 mM Boric Acid Buffer pH 10.0:Acetonitrile (5:95)

The selected gradient gave the optimum separation and peak shape for cytisine plus the related process impurities. By introducing a 2-minute hold, the retention of cytisine, N-formylcytisine, and N-methylcytisine was increased sufficiently to suggest that adequate chromatography could be obtained without the use of methanol. This allows for a two-component mobile phase system with lower absorbance, which is also less susceptible to over pressuring the column. The finalized method parameters have been enumerated below in Tables 24-26.

TABLE 24

HPLC Parameters
HPLC Parameters

| | |
|---|---|
| System | Agilent 1100/1200 series liquid chromatograph or equivalent |
| Column | ACE Ultracore SuperC18; 150 × 4.6 mm, 2.5 μm particle size |
| Mobile Phase A | 10 mM Boric Acid Buffer (pH 10.0) : Acetonitrile (95:5) |
| Mobile Phase B | 10 mM Boric Acid Buffer (pH 10.0) : Acetonitrile (5:95) |
| Flow Rate | 1.0 ml/min |
| Stop Time | 25 min |
| Injection Volume | 5 μl |
| Column Temperature | 40° C. |
| Wavelength | 200 nm and 308 nm |
| Post Run Time | 5 min |

TABLE 25

HPLC Gradient Parameters
HPLC Gradient Parameters

| Time | % A | % B |
|---|---|---|
| 0 | 100 | 0 |
| 2 | 100 | 0 |
| 22 | 0 | 100 |
| 26.5 | 0 | 100 |
| 27 | 100 | 0 |

TABLE 26

Impurities and Intermediates

|  | RT | RRT | Concentration (mg/ml) | Diluent | λmax | Normalization Factor |
|---|---|---|---|---|---|---|
| Cytisine | 6.54 | 1.00 | 0.2 | Mobile Phase A | 306 nm | 1.00 |
| N-Formylcytisine | 5.45 | 0.83 | 0.2 | Mobile Phase A | 306 nm | 1.00 |
| N-Methylcytisine | 8.25 | 1.26 | 0.2 | Mobile Phase A | 306 nm | 1.00 |
| Anagyrine | 10.86 | 1.66 | 0.2 | Mobile Phase A | 306 nm | 2.06 |
| Angustifoline | 9.99 | 1.53 | 0.2 | Mobile Phase A | 200 nm | 3.48 |
| Lupanine | 10.23 | 1.56 | 0.2 | Mobile Phase A | 200 nm | 1.77 |

7. Method Performance

Figure 13A:
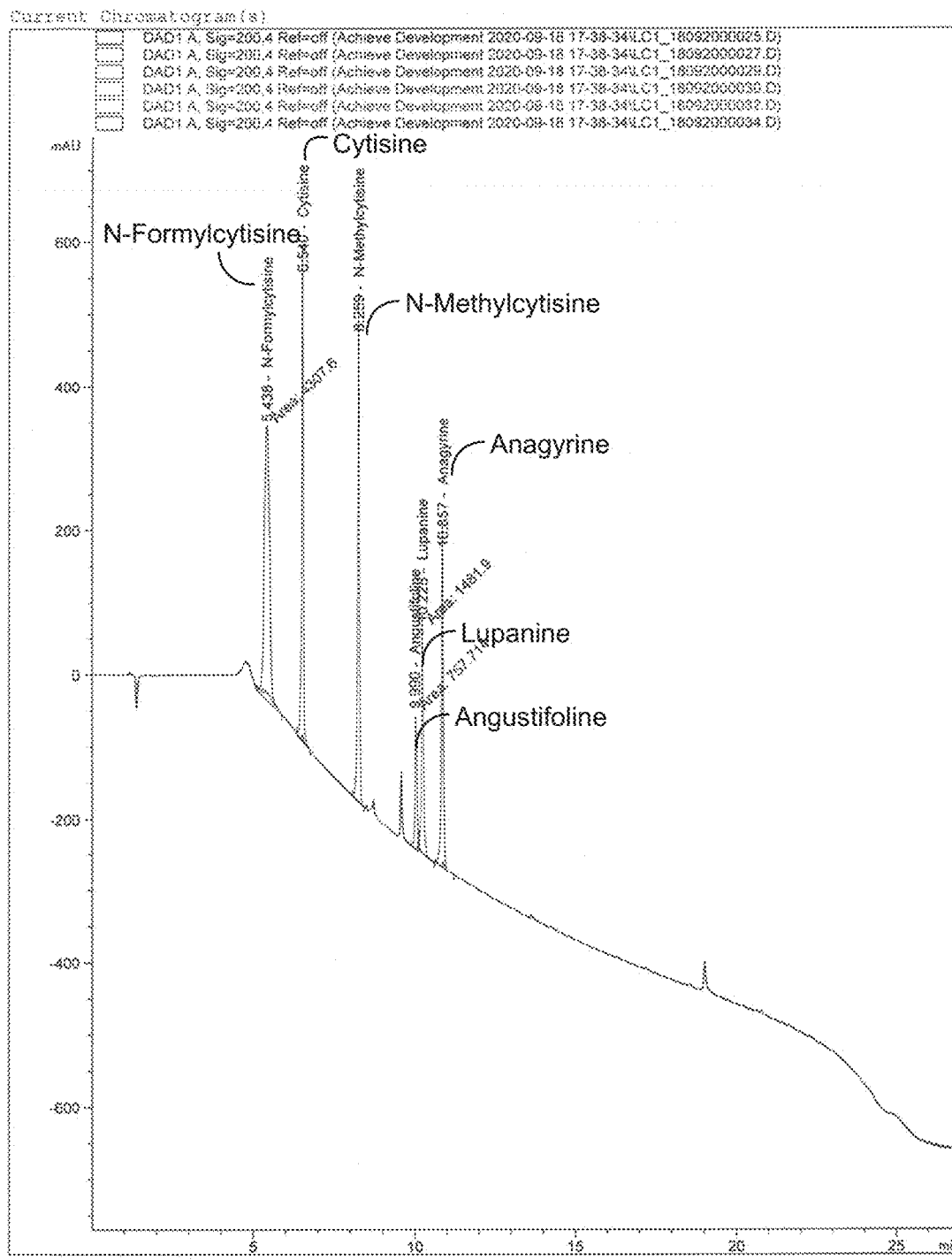
FIGS. 13A-13F show exemplary chromatographs displaying the overlays of cytisine and one or more impurities at a wavelength of 200 nm (FIG. 13A) and wavelength of 308 nm (FIG. 13B), overlays of cytisine and known impurities at a high concentration at a wavelength of 200 nm (FIG. 13C) and wavelength of 308 nm (FIG. 13D), and overlays of cytisine and known impurities at a low concentration at a wavelength of 200 nm (FIG. 13E) and wavelength of 308 nm (FIG. 13F) in accordance with embodiments of the present disclosure.
Figure 13B:
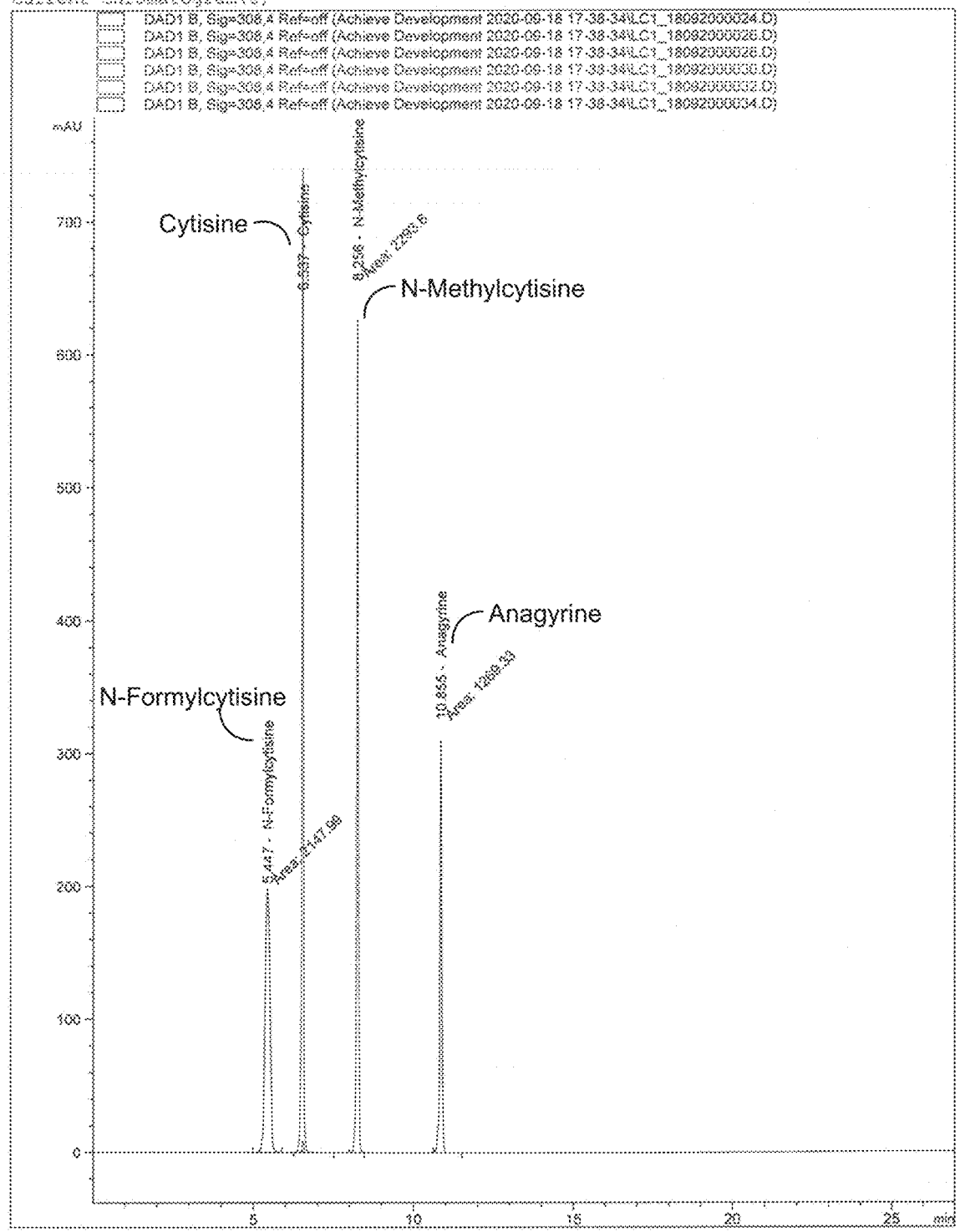
Figure 13C:
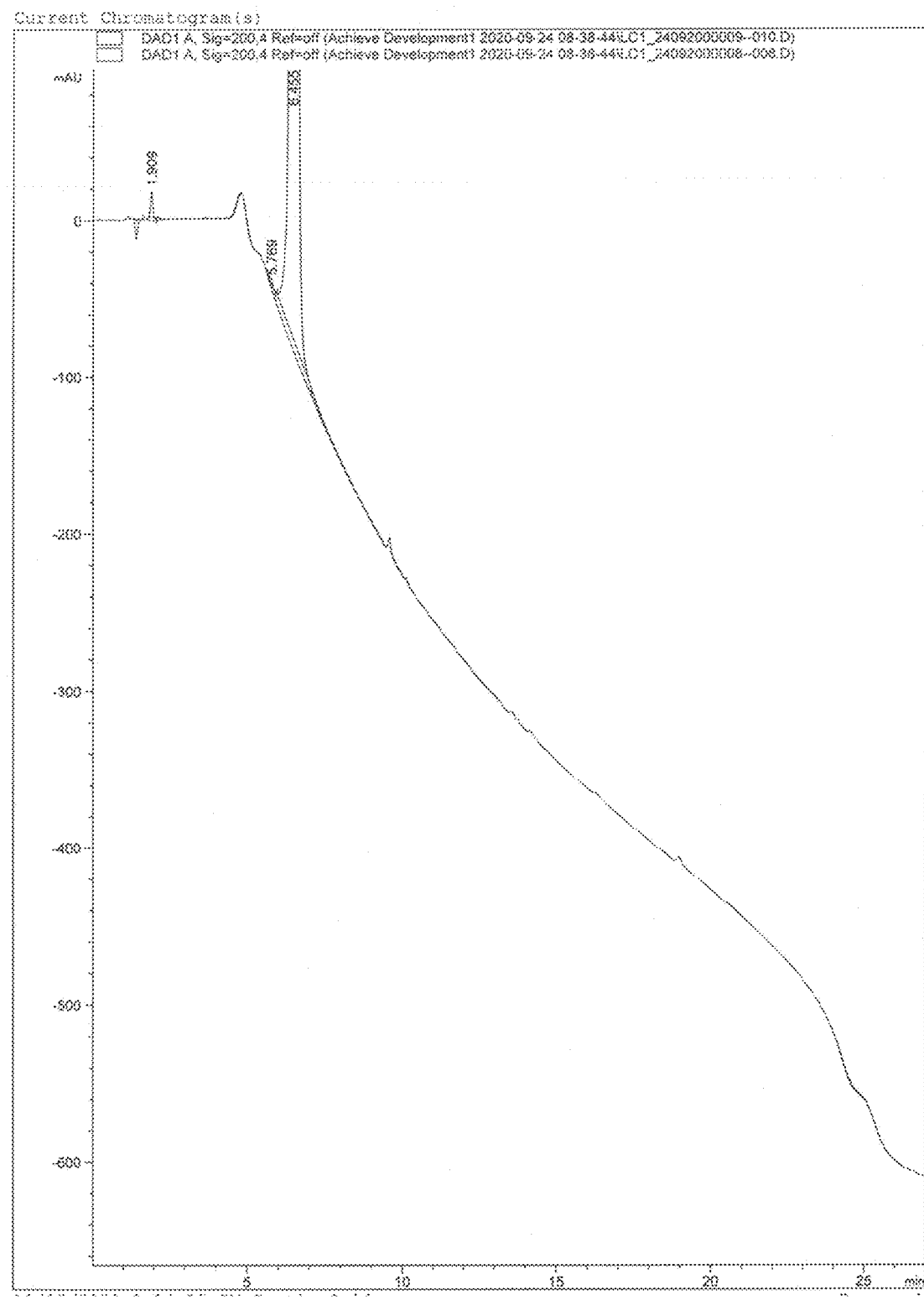
Figure 13D:
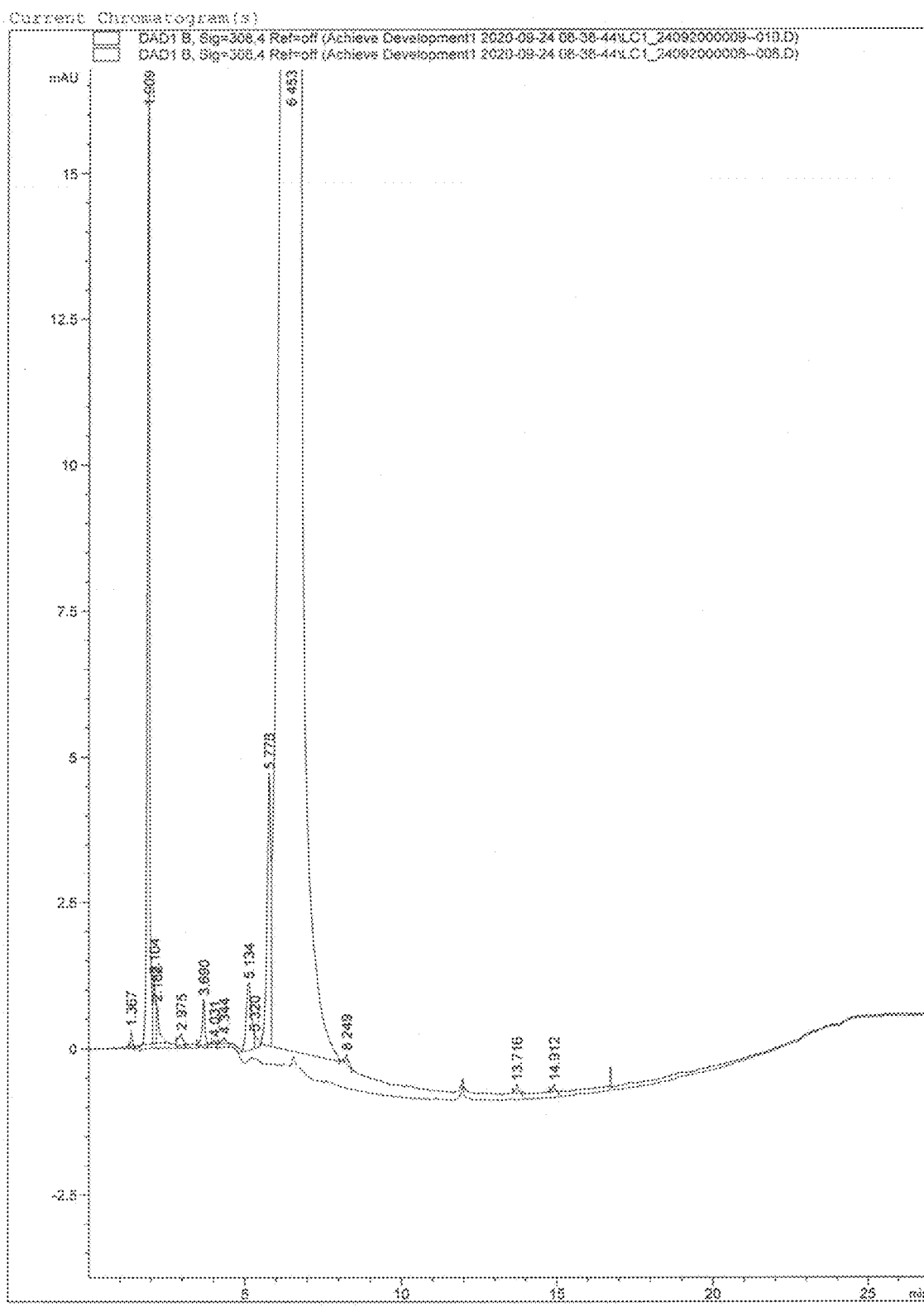
Figure 13E:
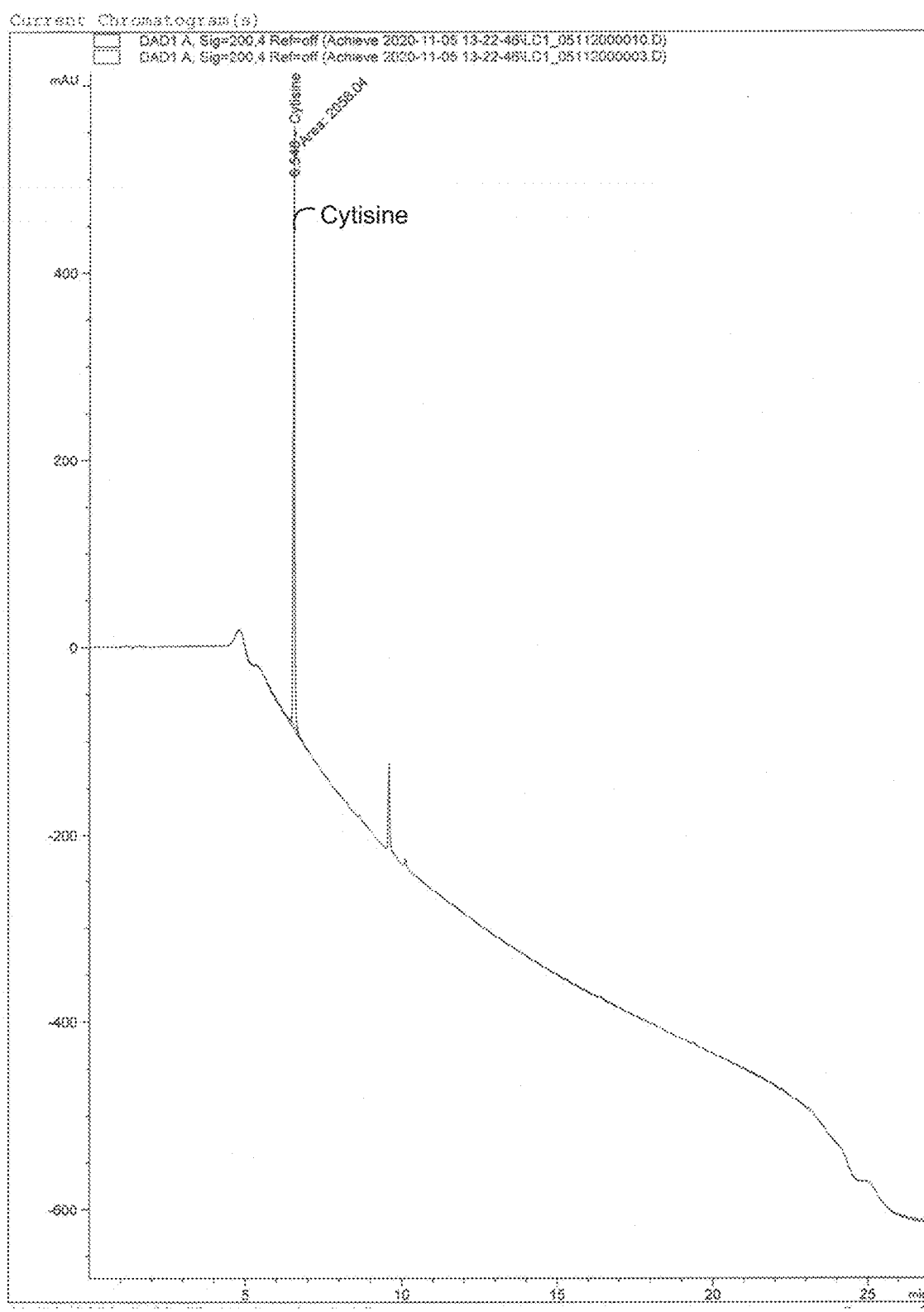
Figure 13F:
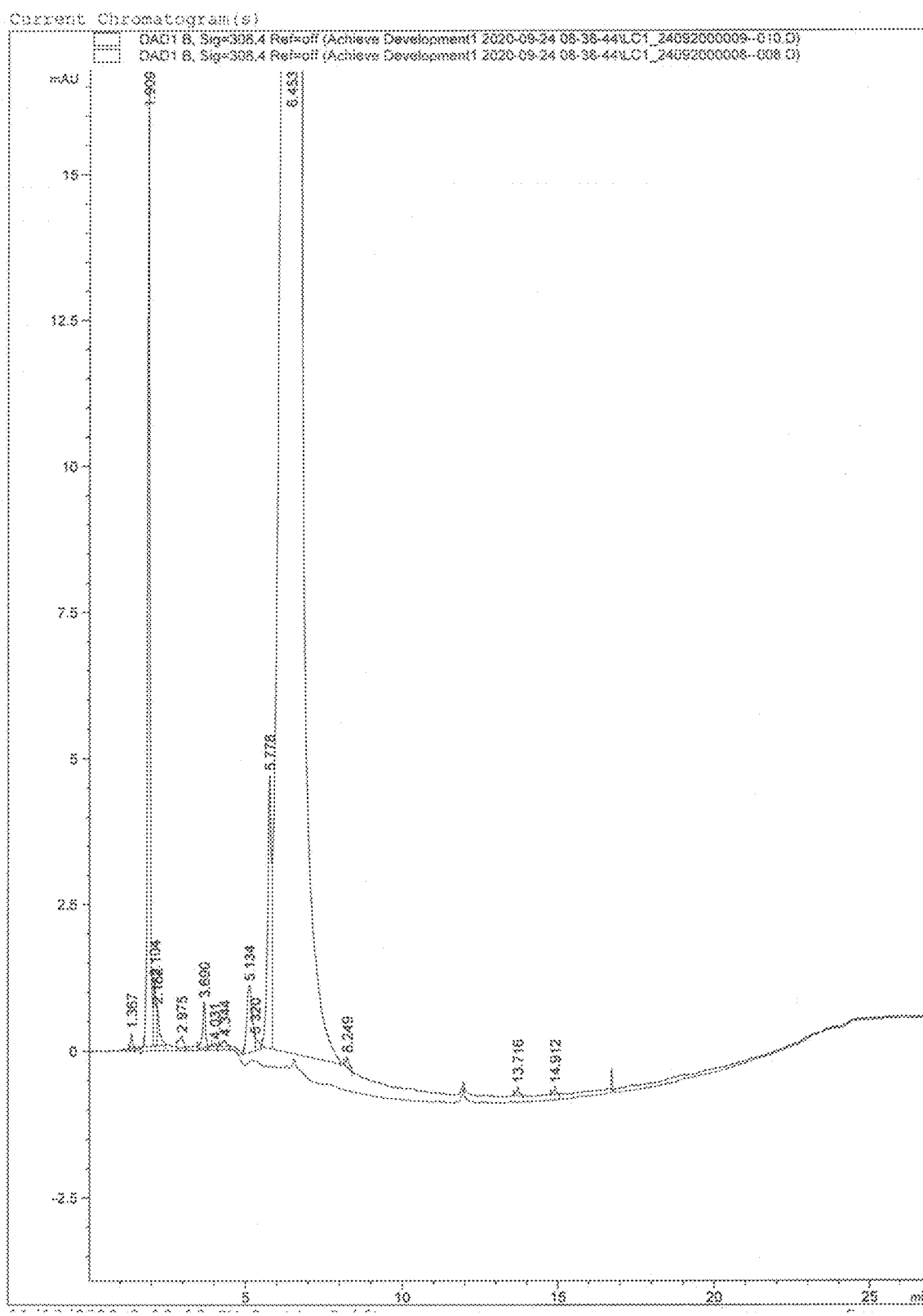

Cytisine and all the impurities screened in development have λmax around 200 nm at differing levels of response. Cytisine, N-formylcytisine, N-methylcytisine, and anagyrine have another λmax at 308 nm. The signal to noise ratio was proven to be about ten times higher for the method at 308 nm due to significantly lower gradient absorption. As a result, development shifted towards a method that analyzed the samples primarily at 308 nm but also collected data for 200 nm to still detect lupanine, angustifoline, and any other impurities that absorbed UV at 200 nm but not 308 nm. Example overlays of 200 nm and 308 nm have been included for the relevant impurities as shown in FIGS. 13A-13F. In particular, FIGS. 13A and 13B show all of the impurities screened at 200 nm and 308 nm, respectively, with FIGS. 13C and 13D showing the typical chromatographs of a sample collected with a high concentration sample at 200 nm and 308 nm, respectively. And lastly, FIGS. 13E and 13F show the typical chromatographs of a sample collected with a low concentration sample at 200 nm and 308 nm, respectively.

8. Experimental Validation Tests

Preliminary validation has been carried out in terms of system suitability, specificity, limit of detection, limit of quantitation, linearity, precision, and accuracy at the working concentration (200 μg/mL) for cytisine.

Specificity

Figure 14A:
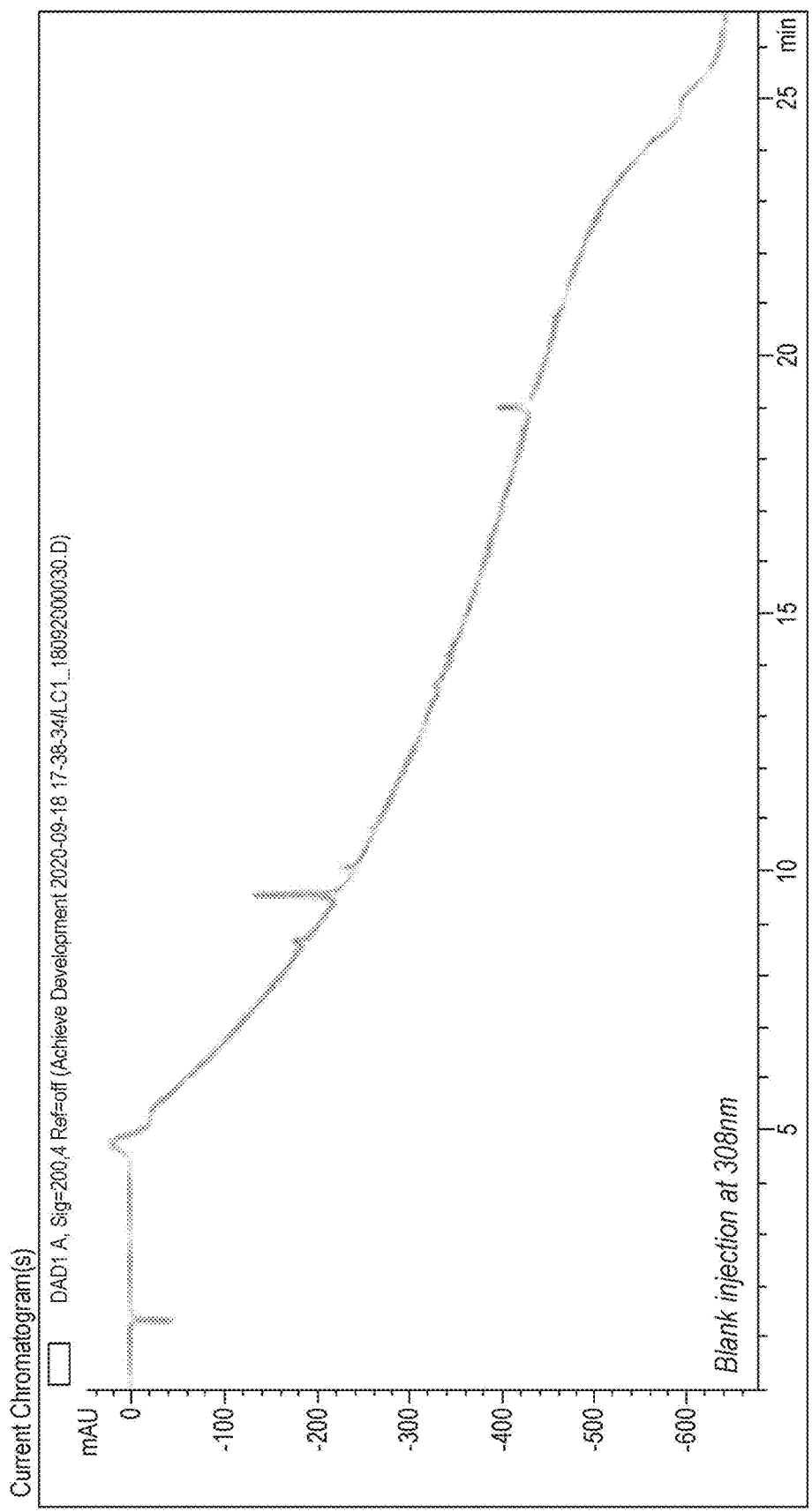
FIGS. 14A-14F show exemplary chromatographs displaying the overlays of cytisine, N-formylcytisine, N-methylcytisine, anagyrine, angustifoline, and lupanine at 308 nm to include a blank (FIG. 14A), overlay (FIG. 14B), and a zoom in of the overlay (FIG. 14C) and at 200 nm to include a blank (FIG. 14D), overlay (FIG. 14E), and a zoom in of the overlay (FIG. 14F) in accordance with embodiments of the present disclosure.
Figure 14B:
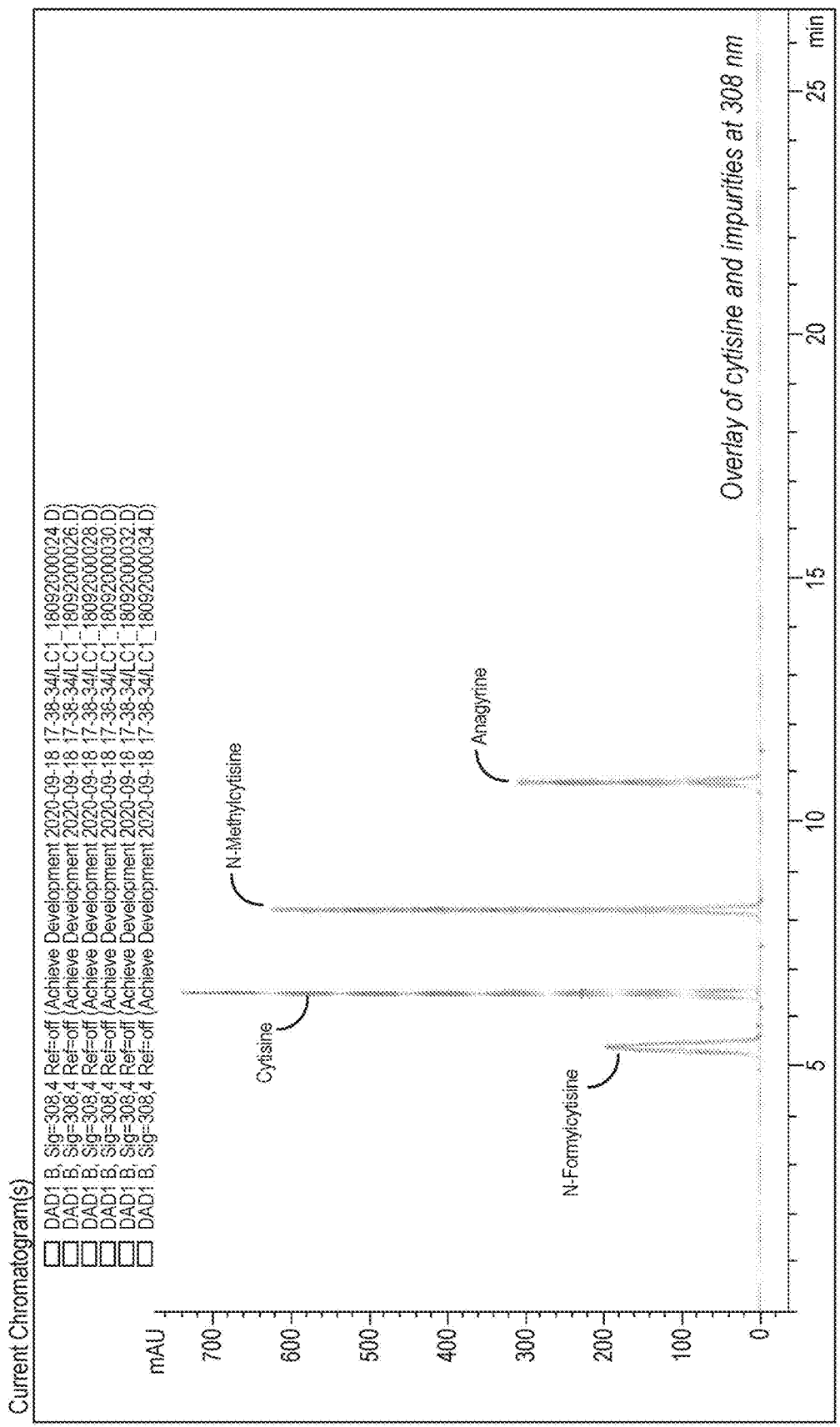
Figure 14C:
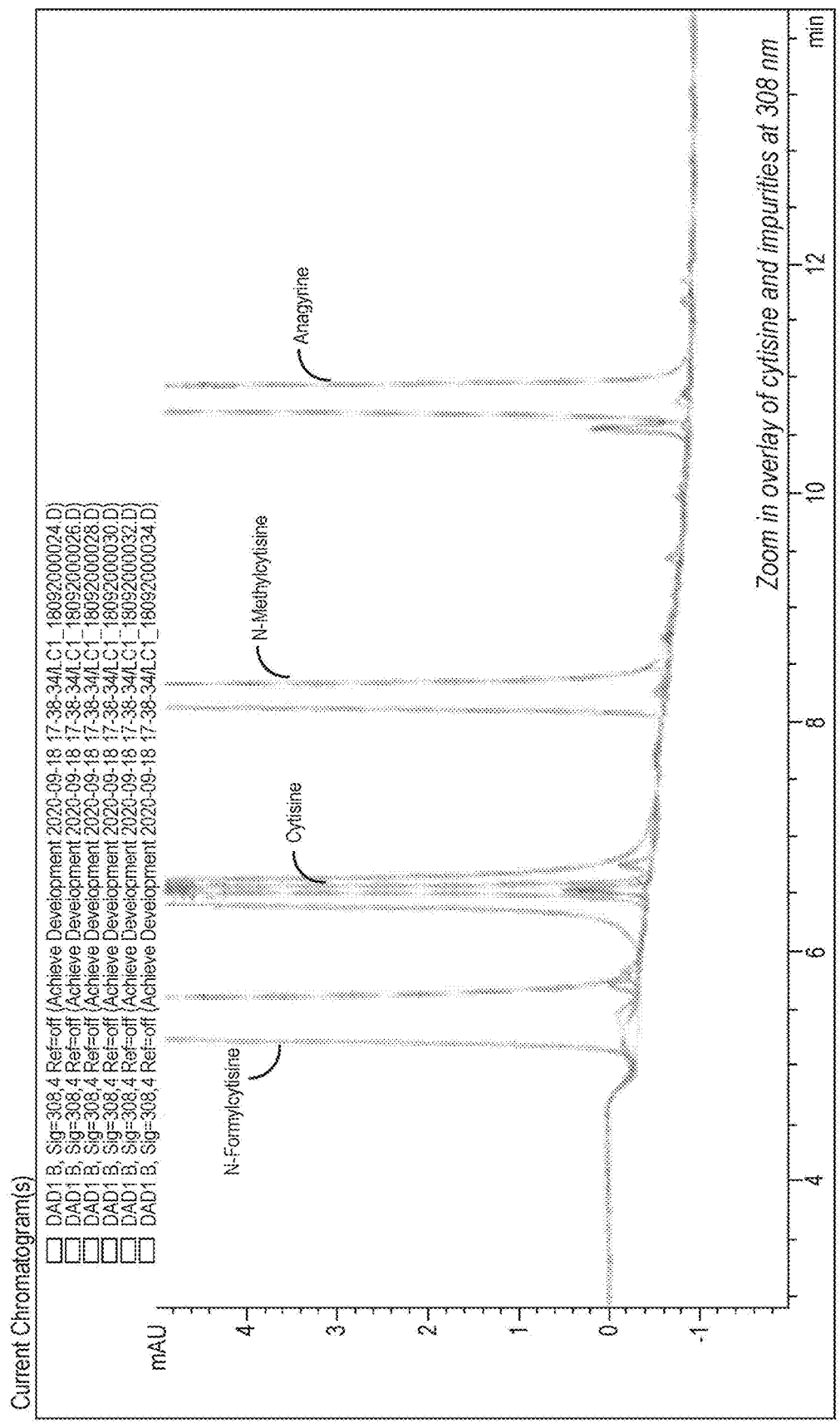
Figure 14D:
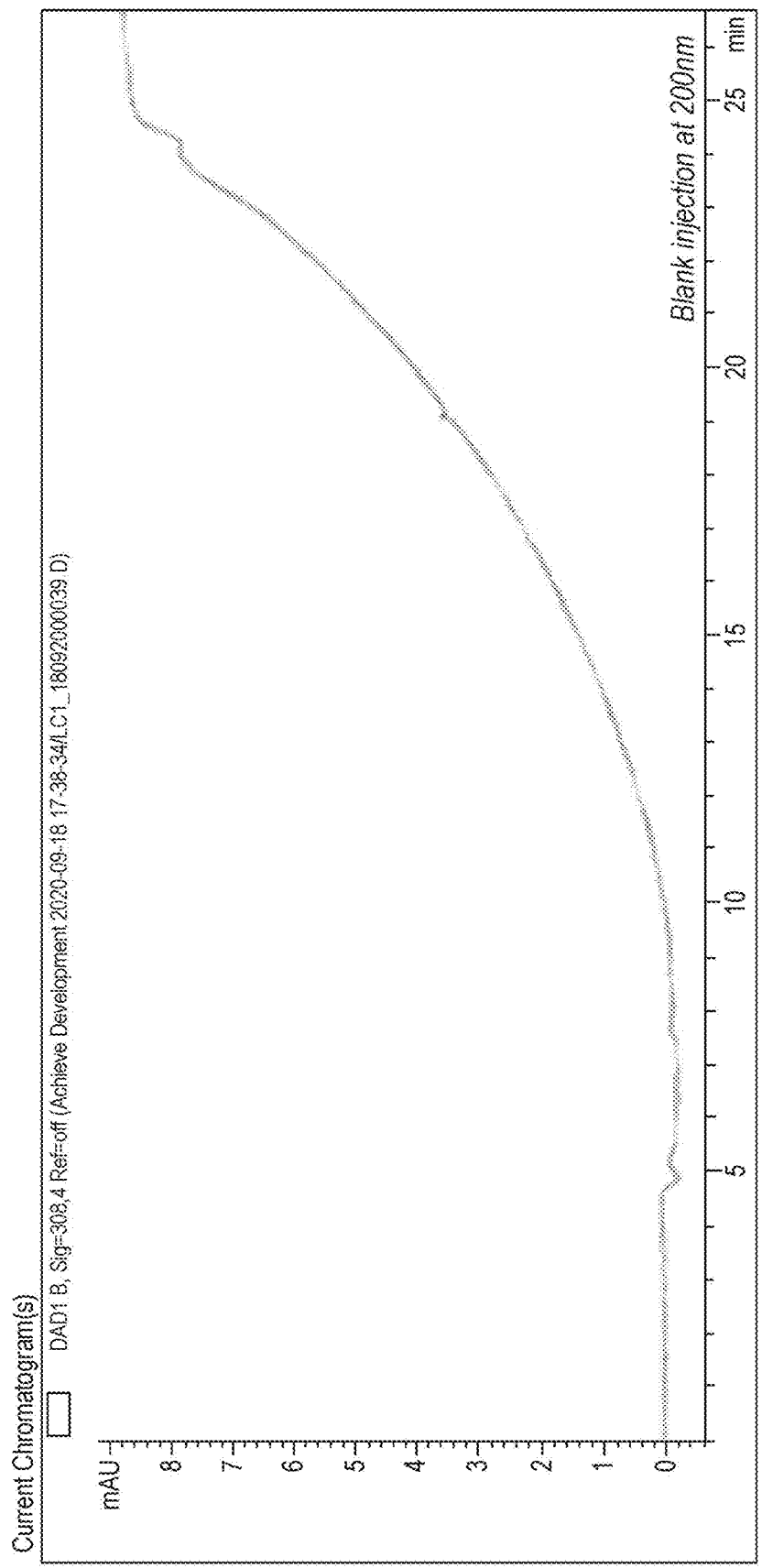
Figure 14E:
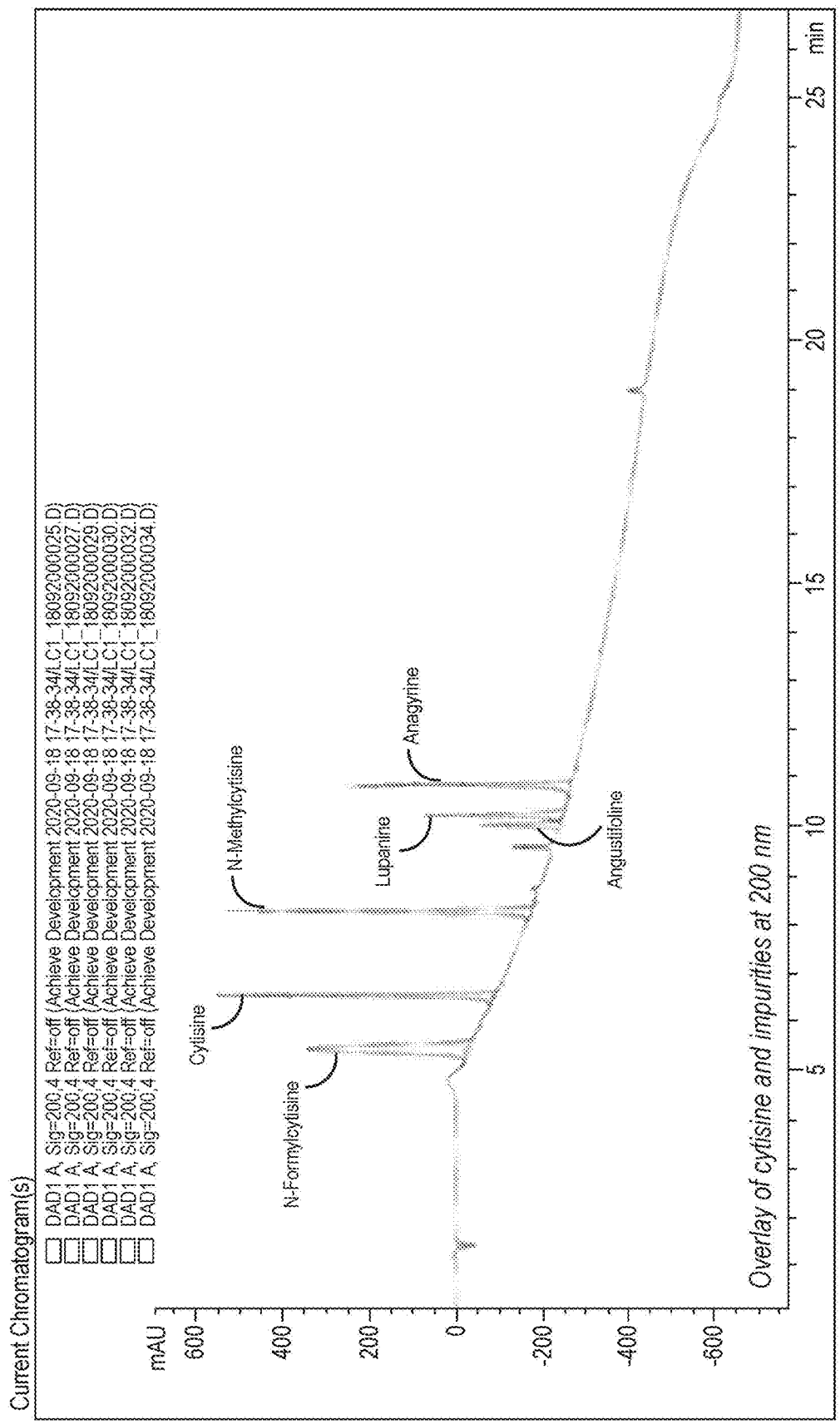
Figure 14F:
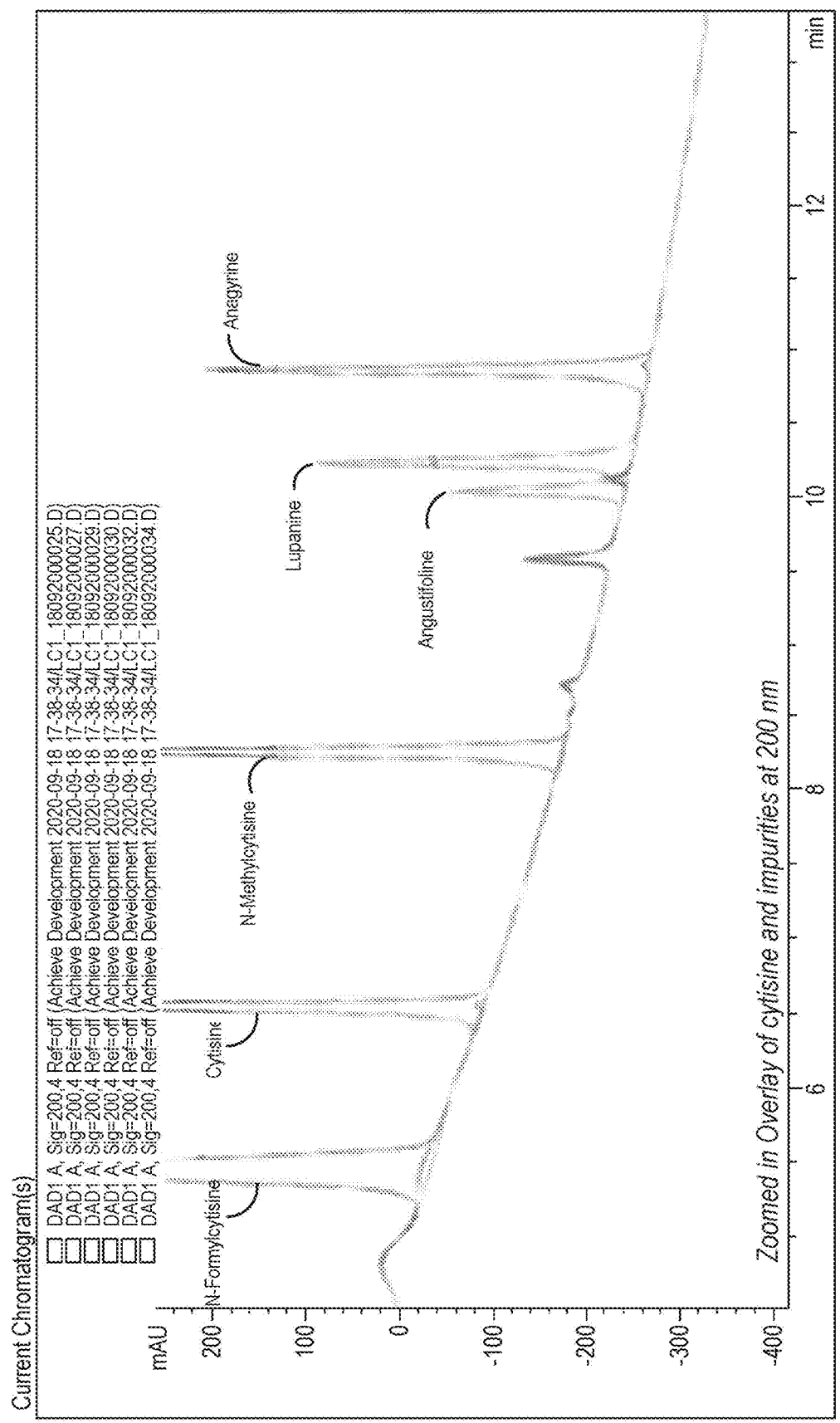

Chromatographs from specificity tests are shown in FIGS. 14A-14F, which include chromatograms of diluent along with overlaid chromatograms of cytisine, N-formylcytisine, N-methylcytisine, anagyrine, angustifoline (200 nm only), and lupanine (200 nm only) at 308 nm (FIGS. 14A-14C) and 200 nm (FIGS. 14D-14F). No interference with cytisine was detected. The diluent blank injections injected prior to the impurities showed no peaks greater than the limit of quantification (LOQ) at the retention times of all the impurities.

System Suitability Test

System suitability testing was performed by injecting cytisine at the working concentration (200 μg/mL) six times. System suitability results are shown in Table 27.

TABLE 27

System Suitability Test

| Injection | Peak area | Retention time (min) | Plates | Tailing factor | Retention factor |
|---|---|---|---|---|---|
| 1 | 2579.46 | 6.470 | 38182 | 1.457 | 3.326 |
| 2 | 2580.64 | 6.468 | 38507 | 1.429 | 3.324 |
| 3 | 2584.72 | 6.469 | 38354 | 1.480 | 3.325 |
| 4 | 2585.58 | 6.467 | 37841 | 1.541 | 3.323 |
| 5 | 2584.63 | 6.469 | 37689 | 1.498 | 3.325 |
| 6 | 2578.04 | 6.468 | 38690 | 1.471 | 3.324 |
| Mean | 2582.18 | 6.47 | 38210.50 | 1.48 | 3.32 |
| Std dev | 3.19 | 0.00 | 386.71 | 0.04 | 0.00 |
| % RSD | 0.12 | 0.02 | 1.01 | 2.57 | 0.03 |
| Acceptance criteria | <2.0% RSD | <2.0% RSD | >10000 | <3 | >2 |

Linearity

Figure 15A:
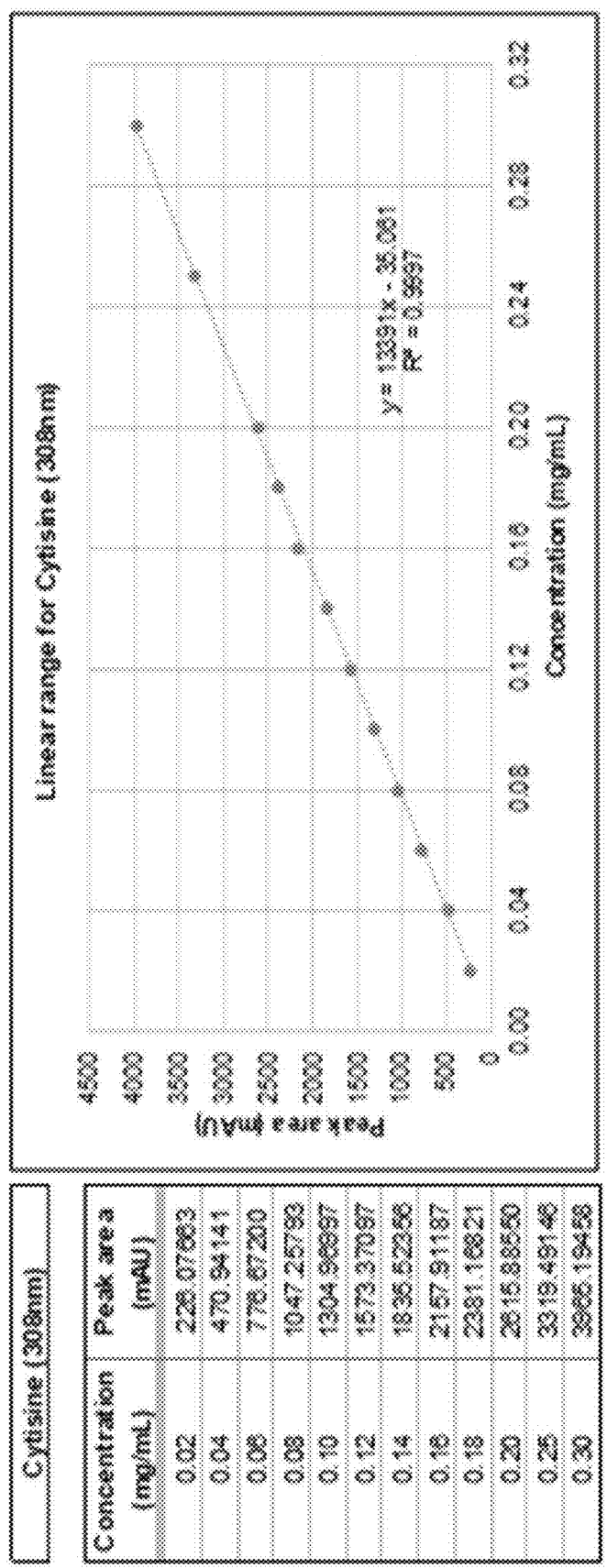
FIGS. 15A-15B show exemplary plots confirming the linear response using the HPLC methods at 308 nm (FIG. 15A) and 200 nm (FIG. 15B) in accordance with embodiments of the present disclosure.
Figure 15B:
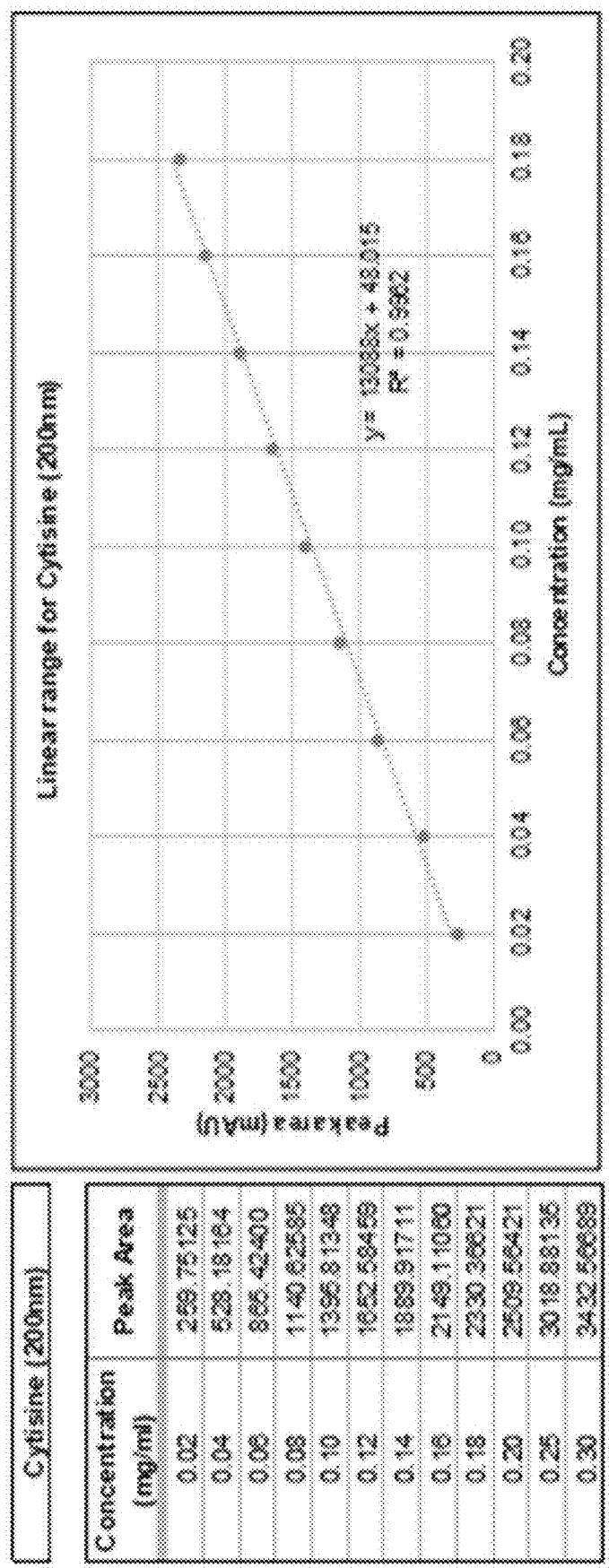

The linearity solutions were prepared by diluting a stock standard solution to give a concentration range between 20 and 300 μg/ml of cytisine in diluent. The peak area results of the linearity solutions with concentrations from 20 to 300 μg/ml are presented graphically in FIGS. 15A-15B. The peak area response was linear over the concentration range tested. The correlation coefficient of the slope of the linear regression line of the peak areas versus nominal concentrations was 0.9997 at 308 nm and 0.9962 at 200 nm.

Sensitivity

Duplicate injections of cytisine and all the impurities screened were performed to obtain theoretical limits of detection and quantification as enumerated below in Tables 28 and 29 (working concentration at 0.2 mg/ml).

TABLE 28

Cytisine and Related Impurities Sensitivity

|  | Peak Height (mAU) | | Signal: Noise | | LOD (μg/mL) | LOQ (μg/mL) | LOD (%) | LOQ (%) |
|---|---|---|---|---|---|---|---|---|
|  | Inj 1 | Inj 2 | Inj 1 | Inj 2 | | | | |
| Cytisine (308 nm) | 645.95679 | 688.21869 | 32000.0 | 28000.0 | 0.0200 | 0.0667 | 0.010 | 0.033 |
| N-Formylcytisine (308 nm) | 199.25389 | 198.37944 | 6509.4 | 6923.3 | 0.0893 | 0.2978 | 0.045 | 0.149 |
| Cytisine (200 nm) | 608.77539 | 643.76862 | 1996.5 | 1859.1 | 0.3112 | 1.0375 | 0.156 | 0.519 |
| N-Methylcytisine (308 nm) | 655.70807 | 654.70691 | 25000.0 | 27000.0 | 0.0231 | 0.0769 | 0.012 | 0.038 |
| Angustifoline (200 nm) | 189.20650 | 191.00620 | 424.4 | 442.8 | 1.3838 | 4.6125 | 0.692 | 2.306 |
| Lupanine (200 nm) | 314.94510 | 319.17242 | 709.8 | 1079.6 | 0.6706 | 2.2354 | 0.335 | 1.118 |
| Anagyrine (308 nm) | 323.27017 | 306.00717 | 17000.0 | 11000.0 | 0.0429 | 0.1429 | 0.021 | 0.071 |

TABLE 29

Cytisine and Related Impurities Response Factors

| | Peak Area (mAU) | | | Relative response factors | | | Normalized | |
|---|---|---|---|---|---|---|---|---|
| | Inj 1 | Inj 2 | Average | Maximum | Minimum | Average | Average | Required |
| Cytisine (308 nm) | 2612.40210 | 2621.68823 | 2617.04517 | | | | | |
| N-Formylcytisine (308 nm) | 2147.98901 | 2149.42676 | 2148.70789 | 0.8193 | 0.8228 | 0.8210 | 1.22 | NO |
| Cytisine (200 nm) | 2549.88599 | 2554.36694 | 2552.12647 | 0.9726 | 0.9778 | 0.9752 | 1.03 | NO |
| N-Methylcytisine (308 nm) | 2293.80078 | 2297.23218 | 2295.51648 | 0.8749 | 0.8794 | 0.8771 | 1.14 | NO |
| Angustifoline (200 nm) | 757.71368 | 744.34424 | 751.02896 | 0.2839 | 0.2900 | 0.2870 | 3.48 | YES |
| Lupanine (200 nm) | 1481.89600 | 1473.74646 | 1477.82123 | 0.5621 | 0.5673 | 0.5647 | 1.77 | YES |
| Anagyrine (308 nm) | 1269.33288 | 1268.14722 | 1268.74005 | 0.4837 | 0.4859 | 0.4848 | 2.06 | YES |

The sensitivity was greatly improved at 308 nm; however, the limit of detection (LOD) and the LOQ were still above the typical acceptance criteria (LT0.02%, LT0.05% respectively). To combat the sensitivity issues, a high/low analytical methodology was required with a high concentration of 10 mg/mL.

Assay Repeatability

Six cytisine standards were prepared individually at the high concentration 10 mg/ml and then diluted to the working concentration of 0.2 mg/ml and injected in triplicate and assayed against the system suitability standard. Each standard was spiked with approximately 0.15% N-formylcytisine and N-methylcytisine. The assay results and impurity profile results are shown in Table 30.

TABLE 30

Repeatability of Sample Solutions

| | 1 | 2 | 3 | 4 | 5 | 6 | Mean | SD | RSD % |
|---|---|---|---|---|---|---|---|---|---|
| Cytisine | 99.90 | 99.42 | 99.87 | 99.37 | 99.50 | 99.46 | 99.59 | 0.23 | 0.23 |
| % difference | 0.31 | -0.16 | 0.28 | -0.21 | -0.09 | -0.13 | — | — | — |
| N-Formyl Cyt. | 0.154 | 0.159 | 0.160 | 0.160 | 0.157 | 0.160 | 0.16 | 0.00 | 1.55 |
| % difference | -2.9 | 0.2 | 1.2 | 1.0 | -0.5 | 1.1 | — | — | — |
| N-Methyl Cyt. | 0.137 | 0.137 | 0.137 | 0.137 | 0.138 | 0.137 | 0.14 | 0.00 | 0.13 |
| % difference | -0.1 | -0.1 | -0.1 | 0.0 | 0.2 | 0.1 | — | — | — |

The results of the assay repeatability solutions gave a mean assay of 99.59% with the accuracy ranging from 99.37% to 99.90% and a precision of 0.23% RSD. The impurities spiked at 0.15% and gave a mean of 0.16% and 0.14% for N-formylcytisine and N-methyl cytisine, respectively. The accuracy ranged from 0.15% to 0.16% for N-formylcytisine and from 0.137% to 0.138% for N-methylcytisine. The accuracy of the impurities is well within the ±20.0%.

9. Summary of the Cytisine Analytical Procedure

Based on the findings described above, an analytical procedure has been developed as described below.

Mobile Phase Preparation

Dissolve 0.62 g of boric acid in deionized water. Adjust the pH to 10.0 by adding ammonium hydroxide (35% w/w) to the solution. Filter this buffer through a 0.22 micron filter. Add 50 ml of buffer to 950 ml of acetonitrile to make Mobile Phase B. Add 50 ml of acetonitrile to the remaining 950 ml of buffer to make Mobile Phase A.

Blank/Diluent Preparation

The Blank/Diluent Solution consists of Mobile Phase A (10 mM Boric Acid Buffer pH 10.0:Acetonitrile (95:5)).

RT-ID Standard Preparation

Accurately weigh 20 mg of cytisine and 10 mg of each of the related substances of interest into a 100 ml volumetric flask. Dissolve and make up to volume in diluent.

Stock Sample Solution Preparation

Accurately weigh 100 mg of sample into a suitable container. Dissolve in 10 ml of diluent using sonication if required. Label solution as Stock Sample Solution.

Diluted Sample Solution Preparation

Accurately pipette 1 ml of Stock Sample Solution into a 50 ml volumetric flask and dilute to volume with diluent. Label as Diluted Sample Solution.

HPLC Parameters

Enumerated below in Tables 31 and 32 are the HPLC parameters used to analyze the purity of cytisine.

TABLE 31

| HPLC Parameters | |
|---|---|
| HPLC Parameters | |
| System | Agilent 1100/1200 series liquid chromatograph or equivalent |
| Column | ACE ultracore SuperC18; 150 × 4.6 mm, 2.5 μm particle size |
| Mobile Phase A | 10 mM Boric Acid Buffer pH 10.0 : Acetonitrile (95:5) |
| Mobile Phase B | 10 mM Boric Acid Buffer pH 10.0 : Acetonitrile (5:95) |
| Flow Rate | 1.0 ml/min |
| Stop Time | 27 min |
| Injection Volume | 5 μl |
| Column Temperature | 40° C. |
| Wavelength | 200 nm and 308 nm |
| Post Run Time | 5 min |

TABLE 32

| HPLC Gradient Parameters HPLC Gradient Parameters | | |
| --- | --- | --- |
| Time | % A | % B |
| 0 | 100 | 0 |
| 2 | 100 | 0 |
| 22 | 0 | 100 |
| 26.5 | 0 | 100 |
| 27 | 100 | 0 |

Chromatogram Integration and Calculation of % Impurity and % Purity

All peaks attributable to the blank solution should not be integrated in the Stock Sample chromatogram. At 308 nm all peaks should be integrated in the Stock Sample Solution. At 200 nm integrate the peaks corresponding to lupanine and angustifoline. In addition, integrate any peaks in the Stock Sample at 200 nm that have no corresponding impurity in the 308 nm Stock Sample Chromatogram.

$$\% \text{ Impurity} = \frac{PA_{impurity\,(Stock\,soln)} \times 100}{\Sigma PA_{impurity\,(Stock\,Soln)} + (50 \times PA_{Cytisine\,308\,nm\,(Dilute\,Soln)})}$$

$PA_{impurity\,(Stock\,soln)}$  Peak area of impurity from injection of Stock Sample Solution at either 200 nm or 308 nm.

$PA_{Cytisine\,308\,nm\,(Dilute\,Soln)}$  Peak area of cytisine from injection of Diluted Sample Solution at 308 nm.

Relative response factors were calculated in relation to cytisine at 308 nm. The normalization factors included below in Table 33 are then applied to the peak areas obtained from the stock sample solutions. These normalized areas are to be used in the % impurity calculation.

TABLE 33

| Normalized Areas Used in the Cytisine Purity Calculation | | | |
| --- | --- | --- | --- |
| Peak | LOQ (%) | LOD (%) | Normalization factor |
| Cytisine (308 nm) | 0.033 | 0.01 | 1.00 |
| N-Formylcytisine (308 nm) | 0.038 | 0.012 | 1.00 |
| N-Methylcytisine (308 nm) | 0.149 | 0.045 | 1.00 |
| Anagyrine (308 nm) | 0.071 | 0.021 | 2.06 |
| Lupanine (200 nm) | 1.118 | 0.335 | 1.77 |
| Angustifoline (200 nm) | 2.306 | 0.692 | 3.48 |
| Unspecified impurities | 0.033 | 0.01 | 1.00 |

10. Conclusion

In conclusion, the following example provides methodology that allows for the quantification of cytisine and related substances/impurities. The study in particular provides a gradient HPLC method with the ability to resolve cytisine and the expected related impurities at multiple wavelengths.

Unless the context indicates otherwise, it is specifically intended that the various features of the invention described herein can be used in any combination. Moreover, the disclosure also contemplates that in some embodiments any feature or combination of features set forth herein can be excluded or omitted. To illustrate, if the specification states that a complex comprises components A, B, and C, it is specifically intended that any of A, B, or C, or a combination thereof, can be omitted and disclaimed singularly or in any combination.

Para A. A chromatographic method of assessing purity of cytisine, the method comprising (a) introducing a cytisine sample to a column comprising a stationary phase including stearic acid (C18) and having a length of 150 mm, an inner diameter of 4.6 mm, and a particle size of 2.5 μm, wherein the cytisine sample comprises one or more impurities; (b) applying a first mobile phase having a pH of about 10 to the column such that cytisine and the one or more impurities are retained on said column; (c) eluting cytisine and the one or more impurities by applying a second mobile phase having a pH of about 10 to said column; (d) detecting cytisine and the one or more impurities.

Para B. The chromatographic method of Para A, wherein cytisine and the one or more impurities are directed to a mass spectrometer for detection in step (d).

Para C. The chromatographic method of Para A or B, wherein the first and second mobile phases are compatible for injection into a mass spectrometer.

Para D. The chromatographic method as in any one of Paras A-C, wherein the first and second mobile phases comprise volatile components.

Para E. The chromatographic method as in any one of Paras A-D, wherein the first and second mobile phases comprise a buffer that is compatible for injection into a mass spectrometer.

Para F. The chromatographic method as in any one of Paras A-E, wherein the first mobile phase comprises a 10 mM boric acid buffer and acetonitrile in a ratio of about 95 to about 5.

Para G. The chromatographic method as in any one of Paras A-F, wherein the second mobile phase comprises a 10 mM boric acid buffer and acetonitrile in a ratio of about 5 to about 95.

Para H. The chromatographic method as in any one of Paras A-G, wherein the one or more impurities are selected from the group consisting of N-formylcytisine, N-methylcytisine, angustifoline, lupanine, anagyrine, sparteine, and ammodendrine.

Para I. The chromatographic method of Para H, wherein cytisine is separated from each of N-formylcytisine, N-methylcytisine, angustifoline, lupanine, anagyrine, sparteine, and ammodendrine.

Para J. The chromatographic method of Para H, wherein each of N-formylcytisine, N-methylcytisine, angustifoline, lupanine, anagyrine, sparteine, and ammodendrine are separated from cytisine and each other.

Para K. The chromatographic method as in any one of Paras A-J, wherein the first mobile phase is applied to the column for at least about 2 minutes.

Para L. The chromatographic method as in any one of Para A-K, wherein the second mobile phase is applied to the column for about 20 minutes to about 24.5 minutes.

Para M. The chromatographic method as in any one of Para A-L, wherein detecting cytisine and the one or more impurities comprises UV/Vs absorbance detection at one or more wavelengths.

Para N. The chromatographic method of Para M, wherein the one or more wavelengths are 200 nm and 308 nm.

Para O. The chromatographic method of Para M, wherein cytisine is detected at a wavelength of about 308 nm.

Para P. The chromatographic method of Para M, wherein the one or more impurities are selected from the group consisting of N-formylcytisine, N-methylcytisine, and anagyrine and the one or more impurities are detected at a wavelength of 308 nm.

Para Q. The chromatographic method of Para M, wherein the one or more impurities are angustifoline, lupanine, or both and the one or more impurities are detected at a wavelength of 200 nm.

We claim:

1. A chromatographic method of assessing purity of cytisine, the method comprising:
   (a) introducing a cytisine sample to a column comprising a stationary phase including stearic acid and having a length of 150 mm, an inner diameter of 4.6 mm, and a particle size of 2.5 μm, wherein the cytisine sample comprises one or more impurities;
   (b) applying a first mobile phase having a pH of about 10 to the column such that cytisine and the one or more impurities are retained on said column;
   (c) eluting cytisine and the one or more impurities by applying a second mobile phase having a pH of about 10 to said column; and
   (d) detecting cytisine and the one or more impurities in the second mobile phase.

2. The chromatographic method of claim 1, wherein the second mobile phase comprising the cytisine and the one or more impurities is directed to a mass spectrometer for detection in step (d).

3. The chromatographic method of claim 1, wherein the first and second mobile phases are compatible for injection into a mass spectrometer.

4. The chromatographic method of claim 3, wherein the first and second mobile phases comprise volatile components.

5. The chromatographic method of claim 3, wherein the first and second mobile phases comprise a buffer that is compatible for injection into a mass spectrometer.

6. The chromatographic method of claim 1, wherein the first mobile phase comprises a 10 mM boric acid buffer and acetonitrile in a ratio of about 95 to about 5 by volume.

7. The chromatographic method of claim 1, wherein the second mobile phase comprises a 10 mM boric acid buffer and acetonitrile in a ratio of about 5 to about 95 by volume.

8. The chromatographic method of claim 1, wherein the one or more impurities are selected from the group consisting of N-formylcytisine, N-methylcytisine, angustifoline, lupanine, anagyrine, sparteine, and ammodendrine.

9. The chromatographic method of claim 8, wherein cytisine is separated from each of N-formylcytisine, N-methylcytisine, angustifoline, lupanine, anagyrine, and sparteine.

10. The chromatographic method of claim 8, wherein each of N-formylcytisine, N-methylcytisine, angustifoline, lupanine, anagyrine, sparteine, and ammodendrine are separated from cytisine and each other.

11. The chromatographic method of claim 1, wherein the first mobile phase is applied to the column for at least about 2 minutes.

12. The chromatographic method of claim 1, wherein the second mobile phase is applied to the column for about 20 minutes to about 24.5 minutes.

13. The chromatographic method of claim 1, wherein detecting cytisine and the one or more impurities in the second mobile phase comprises Ultraviolet-visible (UV-Vis) spectroscopy absorbance detection at one or more wavelengths.

14. The chromatographic method of claim 13, wherein the one or more wavelengths are 200 nm and 308 nm.

15. The chromatographic method of claim 13, wherein cytisine is detected at a wavelength of about 308 nm.

16. The chromatographic method of claim 13, wherein the one or more impurities are selected from the group consisting of N-formylcytisine, N-methylcytisine, and anagyrine and the one or more impurities are detected at a wavelength of 308 nm.

17. The chromatographic method of claim 13, wherein the one or more impurities are angustifoline, lupanine, or both and the one or more impurities are detected at a wavelength of 200 nm.

* * * * *